United States Patent
Cirik et al.

(10) Patent No.: US 12,225,508 B2
(45) Date of Patent: *Feb. 11, 2025

(54) TRANSMISSION AND RECEPTION CONFIGURATION AND SIGNALING

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Yunjung Yi, Vienna, VA (US); Hua Zhou, Vienna, VA (US); Jonghyun Park, Syosset, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,119

(22) Filed: Jun. 5, 2023

(65) Prior Publication Data
US 2024/0049192 A1 Feb. 8, 2024

Related U.S. Application Data

(63) Continuation of application No. 17/226,623, filed on Apr. 9, 2021, now Pat. No. 11,711,787.

(60) Provisional application No. 63/007,735, filed on Apr. 9, 2020.

(51) Int. Cl.
*H04W 72/044* (2023.01)
*H04W 72/1268* (2023.01)
*H04W 72/23* (2023.01)

(52) U.S. Cl.
CPC ..... *H04W 72/044* (2013.01); *H04W 72/1268* (2013.01); *H04W 72/23* (2023.01)

(58) Field of Classification Search
CPC ........... H04W 72/1268; H04W 72/044; H04W 72/23; H04W 76/19; H04W 74/0833; H04L 5/0094; H04L 5/001; H04L 5/0051; H04L 5/0053; H04L 5/0055; H04B 7/0695; H04B 7/088
See application file for complete search history.

(56) References Cited

U.S. PATENT DOCUMENTS

| | | | |
|---|---|---|---|
| 11,711,787 B2 * | 7/2023 | Cirik | H04W 72/1268 370/329 |
| 2014/0328266 A1 | 11/2014 | Yu et al. | |
| 2016/0270071 A1 * | 9/2016 | Dinan | H04L 1/1854 |
| 2016/0360422 A1 | 12/2016 | Zhang et al. | |

(Continued)

OTHER PUBLICATIONS

NTT Docomo et al: "Discussion on multi-beam enhancement", 3GPP TSG RAN WG1 #98bis; Chongqing, China; Oct. 14-20, 2019.

(Continued)

*Primary Examiner* — Maharishi V Khirodhar
*Assistant Examiner* — Kenneth P Hunt
(74) *Attorney, Agent, or Firm* — Banner & Witcoff, Ltd.

(57) ABSTRACT

One or more transmission parameters for data transmission may be determined for wireless communications. A wireless device may determine transmission parameters for data transmission based on configuration associated with control signaling. For example, the transmission parameters (e.g., transmission beam, transmission power, etc.) may be determined based on a selected spatial relation, among multiple spatial relations, corresponding to a control channel.

24 Claims, 26 Drawing Sheets

(56) References Cited

U.S. PATENT DOCUMENTS

| | | |
|---|---|---|
| 2018/0192347 A1 | 7/2018 | Shaheen |
| 2019/0174540 A1 | 6/2019 | Yoshimura et al. |
| 2020/0044797 A1 | 2/2020 | Guo |
| 2020/0154410 A1 | 5/2020 | Suzuki et al. |
| 2020/0314860 A1 | 10/2020 | Zhou et al. |
| 2021/0105726 A1 | 4/2021 | Yao et al. |
| 2021/0195627 A1 | 6/2021 | Chen et al. |
| 2021/0203397 A1 | 7/2021 | Xiong et al. |
| 2022/0095333 A1 | 3/2022 | Takeda et al. |
| 2022/0095353 A1 | 3/2022 | Liu et al. |
| 2022/0271890 A1 | 8/2022 | Grossmann et al. |
| 2022/0330239 A1 | 10/2022 | Harada et al. |

OTHER PUBLICATIONS

LG Electronics: "Feature lead summary of Enhancements on Multi-beam Operations" 3GPP TSG RAN WG1 Meeting #98; Prague, CZ; Aug. 26-30, 2019.

ZTE: "Summary 3 for AI 7.1.6.1 NR UL power control in non-CA aspects" 3GPP TSG RAN WG1 Meeting #93; Busan, Korea; May 21-25, 2018.

Sep. 2, 2021—European Search Report—EP 21167630.9.

R2-200xxxx 3GPP TSG-RAN WG2 Meeting #109 electronic, Elbonia, Feb. 24-Mar. 6, 2020, Source: Ericsson, Title: Introduction of MIMO enhancements.

R1-2001261 3GPP TSG RAN WG1 Meeting #100, e-Meeting, Feb. 24-Mar. 6, 2020, Source: LG Electronics, Title: Outcome of email thread [100e-NR-eMIMO-MB-03].

R1-2001260 3GPP TSG RAN WG1 Meeting #100, e-Meeting, Feb. 24-Mar. 6, 2020, Source: LG Electronics, Title: Outcome of email thread [100e-NR-eMIMO-MB-02].

R1-2001259 3GPP TSG RAN WG1 Meeting #100, e-Meeting, Feb. 24-Mar. 6, 2020, Source: LG Electronics, Title: Outcome of email thread [100e-NR-eMIMO-MB-01].

R1-2001174 3GPP TSG RAN WG1 Meeting #100, e-Meeting, Feb. 24-Mar. 6, 2020, Source: LG Electronics, Title: Summary of discussion topic C on Rel-16 MB1.

R1-2001173 3GPP TSG RAN WG1 Meeting #100, e-Meeting, Feb. 24-Mar. 6, 2020, Source: LG Electronics, Title: Summary of discussion topic B on Rel-16 MB1.

R1-2001172 3GPP TSG RAN WG1 Meeting #100, e-Meeting, Feb. 24-Mar. 6, 2020, Source: LG Electronics, Title: Summary of discussion topic A on Rel-16 MB1.

R1-2001161 3GPP TSG RAN WG1 Meeting #100, e-Meeting, Feb. 24-Mar. 6, 2020, Source: LG Electronics, Title: Revised Summary on Rel-16 Multi-Beam 1 maintenance.

R1-2001120 3GPP TSG RAN WG1 Meeting #100, E-Meeting, Feb. 24-Mar. 6, 2020, Source: Fraunhofer IIS, Fraunhofer HHI, Title: Enhancements on UE multi-beam operation.

R1-2001079 3GPP TSG-RAN WG1 Meeting #100-e, e-Meeting, Feb. 24-Mar. 6, 2020, Source: Ericsson, Title: On the timing for pathloss RS activation.

R1-2000989 3GPP TSG RAN WG1 Meeting #100, e-meeting, Feb. 24-Mar. 6, 2020, Source: Nokia, Nokia Shanghai Bell, Title: Maintenance of Rel-16 Beam Management.

R1-2000988 3GPP TSG RAN WG1 Meeting #100, e-Meeting, Feb. 24-Mar. 6, 2020, Source: Nokia, Nokia Shanghai Bell, Title: Maintenance of Rel-16 Multi-TRP operation.

R1-2000975 3GPP TSG RAN WG1 Meeting #100-e, Feb. 24-Mar. 6, 2020, Source: Qualcomm Incorporated, Title: Enhancements on Multi-beam Operation.

R1-2000974 3GPP TSG RAN WG1 Meeting #100-e, Feb. 24-Mar. 6, 2020, Source: Qualcomm Incorporated, Title: Multi-TRP Enhancements.

R1-2000941 3GPP TSG RAN WG1 Meeting #100-e, Online, Feb. 24-Mar. 6, 2020, Source: Ericsson, Title: Corrections for multi-TRP transmission.

R1-2000926 3GPP TSG RAN WG1 Meeting #100-e, e-Meeting, Feb. 24-Mar. 6, 2020, Source: NTT Docomo, Inc., Title: Remaining issues on multi-beam operation.

R1-2000925 3GPP TSG RAN WG1 Meeting #100-e, e-Meeting, Feb. 24-Mar. 6, 2020, Source: NTT Docomo, Inc., Title: Remaining issues on multi-TRP/panel transmission.

R1-2000865 3GPP TSG RAN WG1 Meeting #100, e-Meeting, Feb. 24-Mar. 6, 2020, Source: OPPO, Title: Summary #1 of Multi-TRP/Panel Transmission.

R1-2000860 3GPP TSG RAN WG1 Meeting #100-e, e-Meeting, Feb. 24-Mar. 6, 2020, Source: Apple Inc., Title: Remaining Issues on Multi-beam operation.

R1-2000859 3GPP TSG RAN WG1 Meeting #100-e, e-Meeting, Feb. 24-Mar. 6, 2020, Source: Apple Inc., Title: Remaining Issues for Multi-TRP Enhancement.

R1-2000812 3GPP TSG RAN WG1 Meeting #100-e, e-Meeting, Feb. 24-Mar. 6, 2020, Source: FUTUREWEI, Title: TP on Multi-TRP/Panel Transmission.

R1-2000773 3GPP TSG RAN WG1 Meeting #100, e-Meeting, Feb. 24-Mar. 6, 2020, Source: ETRI, Title: UCI enhancements.

R1-2000755 3GPP TSG RAN WG1 Meeting #100, e-Meeting, Feb. 24-Mar. 6, 2020, Source: CMCC, Title: Maintenance for multi-beam operation.

R1-2000754 3GPP TSG RAN WG1 Meeting #100, e-Meeting, Feb. 24-Mar. 6, 2020, Source: CMCC, Title: Maintenance for multi-TRP/panel transmission.

R1-2000740 3GPP TSG RAN WG1 Meeting #100-E, e-Meeting, Feb. 24-Mar. 6, 2020, Source: Intel Corporation, Title: Corrections to multi-beam operation.

R1-2000681 3GPP TSG RAN WG1 Meeting #100, e-Meeting, Feb. 24-Mar. 6, 2020, Source: LG Electronics, Title: Summary on Rel-16 Multi-Beam 1 maintenance.

R1-2000680 3GPP TSG RAN WG1 Meeting #100, e-Meeting, Feb. 24-Mar. 6, 2020, Source: LG Electronics, Title: Text proposals on multi beam operation.

R1-2000679 3GPP TSG RAN WG1 Meeting #100, e-Meeting, Feb. 24-Mar. 6, 2020, Source: LG Electronics, Title: Text proposals on enhancements on multi-TRP/panel transmission.

R1-2000634 3GPP TSG RAN WG1 Meeting #100-e, e-Meeting, Feb. 24-Mar. 6, 2020, Source: Samsung, Title: On Rel. 16 support for multi-beam operation.

R1-2000633 3GPP TSG RAN WG1 Meeting #100-e, e-Meeting, Feb. 24-Mar. 6, 2020, Source: Samsung, Title: On Rel. 16 multi-TRP/panel transmission.

R1-2000596 3GPP TSG RAN WG1 Meeting #100, e-Meeting, Feb. 24-Mar. 6, 2020, Source: Lenovo, Motorola Mobility, Title: Remaining issues on SCell beam failure recovery.

R1-2000595 3GPP TSG RAN WG1 Meeting #100, e-Meeting, Feb. 24-Mar. 6, 2020, Source: Lenovo, Motorola Mobility, Title: Remaining issues on multi-TRP/panel transmission.

R1-2000535 3GPP TSG RAN WG1 Meeting #100, e-Meeting, Feb. 24-Mar. 6, 2020, Source: CATT, Title: Remaining issues on multi-TRP/panel transmission.

R1-2000458 3GPP TSG RAN WG1 Meeting #100, e-Meeting, Feb. 24-Mar. 6, 2020, Source: OPPO, Title: Remaining Issues on Multi-beam Operation Enhancement.

R1-2000457 3GPP TSG RAN WG1 Meeting #100, e-Meeting, Feb. 24-Mar. 6, 2020, Source: OPPO, Title: Text proposals for enhancements on Multi-TRP and panel Transmission.

R1-2000334 3GPP TSG RAN WG1 Meeting #100, e-Meeting, Feb. 24-Mar. 6, 2020, Source: vivo, Title: Discussion on remaining issues on Multi-Beam and text proposals.

R1-2000333 3GPP TSG RAN WG1 Meeting #100, e-Meeting, Feb. 24-Mar. 6, 2020, Source: vivo, Title: Discussion on remaining issues on M-TRP and text proposals.

R1-2000240 3GPP TSG RAN WG1 Meeting #100, e-Meeting, Feb. 24-Mar. 6, 2020, Source: ZTE, Title: Maintenance of enhancements on multi-beam operation.

R1-2000239 3GPP TSG RAN WG1 Meeting #100-e, e-Meeting, Feb. 24-Mar. 6, 2020, Source: ZTE, Title: Maintenance of enhancements on multi-TRP transmission.

(56) References Cited

OTHER PUBLICATIONS

R1-2000204 3GPP TSG RAN WG1 Meeting #100-e, e-Meeting, Feb. 24-Mar. 6, 2020, Source: Huawei, HiSilicon, Title: Remaining issues on multi-TRP in R16.
R1-2000203 3GPP TSG RAN WG1 Meeting #100-e, Feb. 24-Mar. 6, 2020, Source: Huawei, HiSilicon, Title: Remaining issues on multi-beam enhancements in R16.
R2-200xxxx 3GPP TSG-RAN WG2 #109e, Athens, Greece, Feb. 24-Mar. 6, 2020, Source: Samsung, Title: Offline Discussion 112: Beam Management Enhancements.
R2-200xxxx 3GPP TSG-RAN WG2 #109e, Elbonia, Feb. 24-Mar. 6, 2020, Source: Samsung, Title: MAC Running CR for NR eMIMO.
R2-200xxxx 3GPP TSG-RAN WG2 #109 electronic, Feb. 24-Mar. 6, 2020, Source: OPPO, Title: [AT109e][121] [EMIMO] DL MAC CE design (Oppo).
3GPP TS 38.331 V15.8.0 (Dec. 2019) 3rd Generation Partnership Project; Technical Specification Group Radio Access Network; NR; Radio Resource Control (RRC) protocol specification (Release 15).
3GPP TS 38.321 V15.8.0 (Dec. 2019), Technical Specification, 3rd Generation Partnership Project; Technical Specification Group Radio Access Network; NR; Medium Access Control (MAC) protocol specification (Release 15).
3GPP TS 38.214 V16.0.0 (Dec. 2019) 3rd Generation Partnership Project; Technical Specification Group Radio Access Network; NR; Physical layer procedures for data (Release 16).
3GPP TS 38.213 V16.0.0 (Dec. 2019) 3rd Generation Partnership Project; Technical Specification Group Radio Access Network; NR; Physical layer procedures for control (Release 16).
R1-2000739 3GPP TSG RAN WG1 Meeting #100-E, Feb. 24-Mar. 6, 2020, Source: Intel Corporation, Title: Correction to multi TRP operation.

* cited by examiner

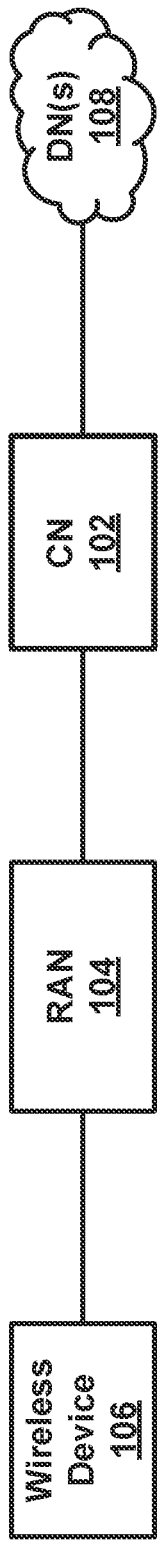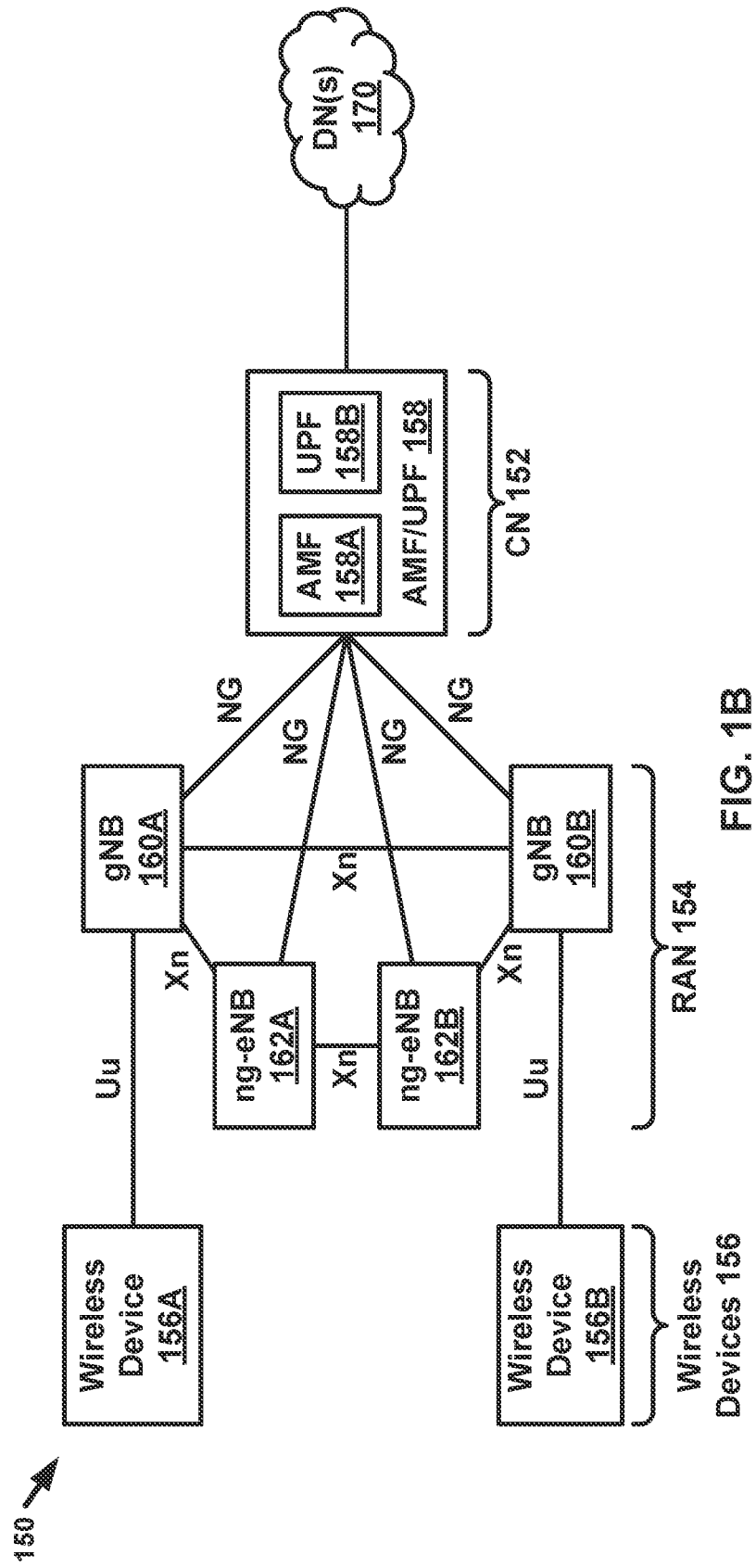

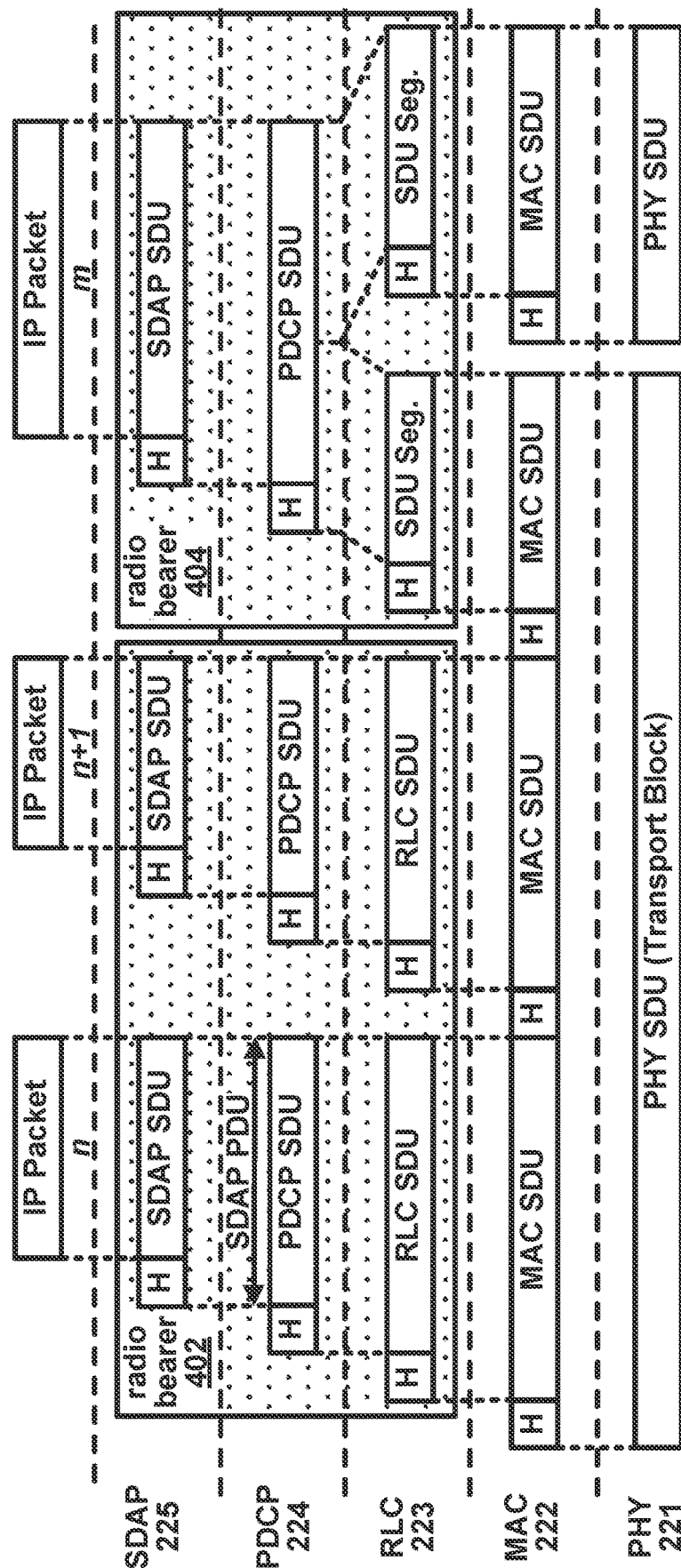
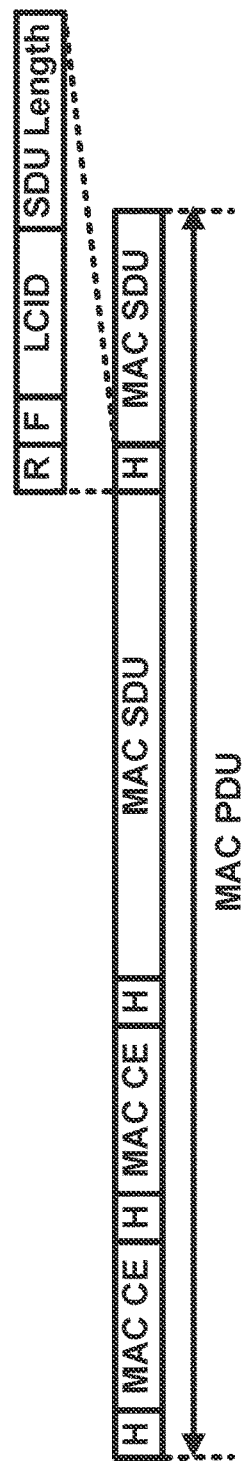
FIG. 4A
FIG. 4B

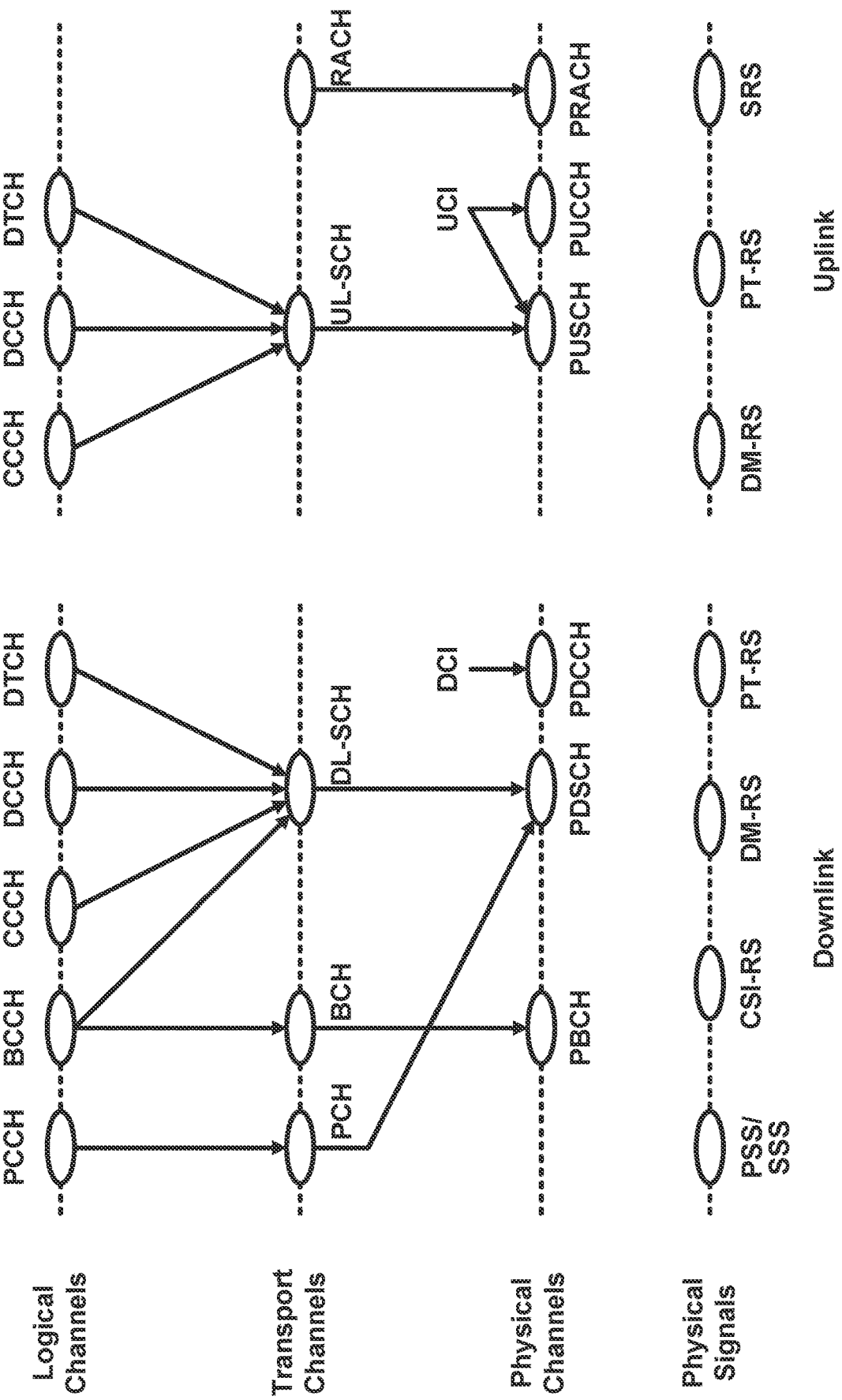

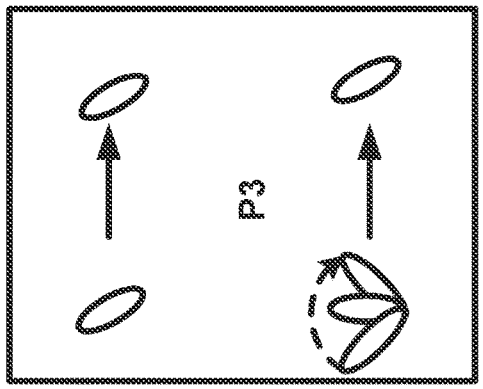
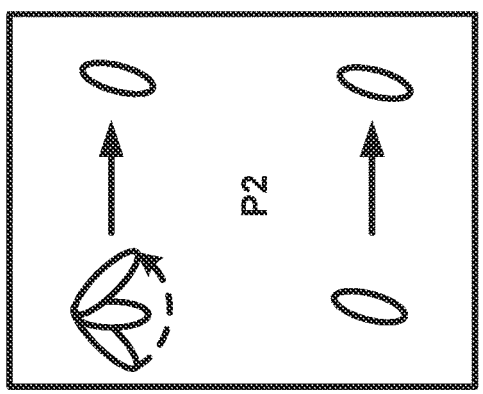
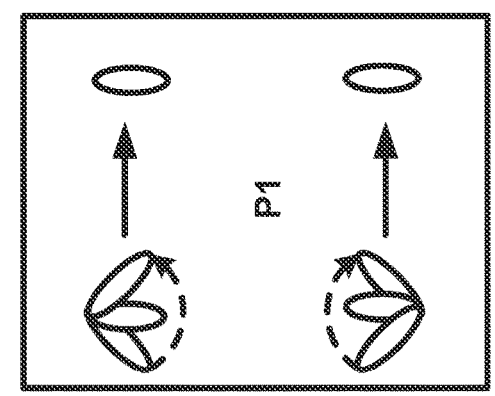
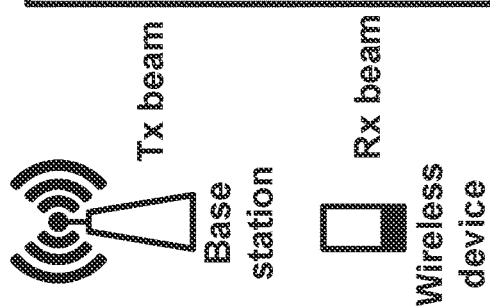
FIG. 12A
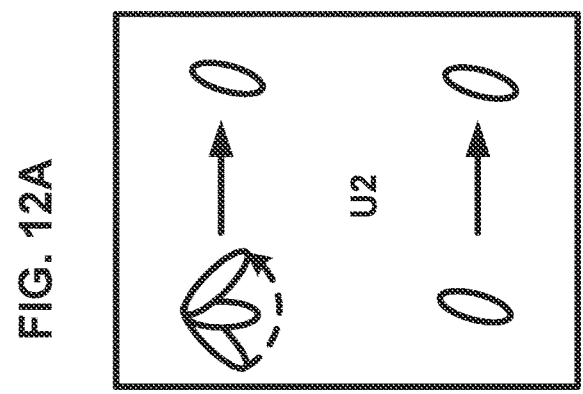
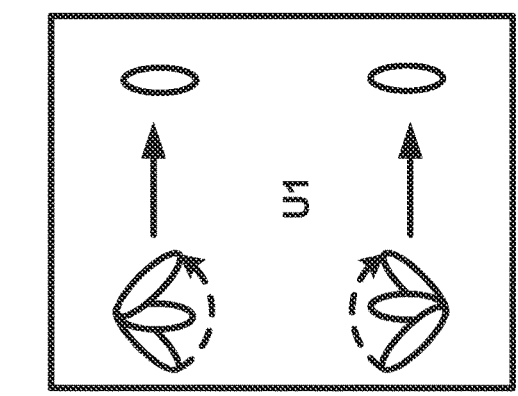
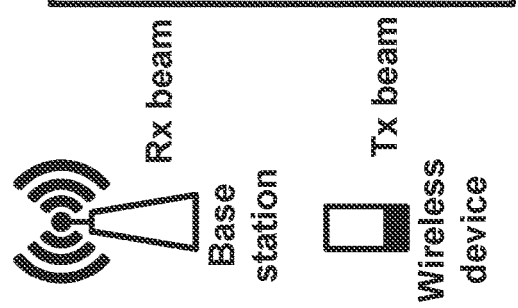
FIG. 12B

TRANSMISSION AND RECEPTION CONFIGURATION AND SIGNALING

CROSS-REFERENCE TO RELATED APPLICATIONS

This application is a continuation of U.S. patent application Ser. No. 17/226,623, filed Apr. 9, 2021, which claims the benefit of U.S. Provisional Application No. 63/007,735, filed Apr. 9, 2020. Each of the above-referenced applications is hereby incorporated by reference in its entirety.

BACKGROUND

A wireless device sends signals to and/or receives signals from a base station. The wireless device determines various transmission parameters for sending/receiving signals.

SUMMARY

The following summary presents a simplified summary of certain features. The summary is not an extensive overview and is not intended to identify key or critical elements.

Communication between devices may require configuration of the devices. Transmission and/or reception configuration and/or associated signaling may be used to synchronize/align a wireless device and a base station. Uplink transmission and/or downlink reception may use one or more configurations that may be based on control signaling. For example, a base station may determine transmission parameters (e.g., spatial filter and/or a transmission power) for transmission/reception by a wireless device. The transmission parameters may be based on one or more conditions that may be determined by the base station. A wireless device may determine one or more transmission and/or reception configurations based on a reference signal indicated by a base station. The reference signal may be determined based on one or more indicators, for example, if a configuration associated with uplink control signaling indicates multiple reference signals. The reference signal may be from a same resource pool via which the wireless device receives a downlink control signal. Selection of reference signals based on one or more indicators and/or resource pools may result in advantages such as increased efficiency of resource usage, reduced latency, and/or reduced retransmissions.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 4A shows an example downlink data flow for a user plane configuration.

FIG. 4B shows an example format of a Medium Access Control (MAC) subheader in a MAC Protocol Data Unit (PDU).

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

DETAILED DESCRIPTION

Figure 2A:
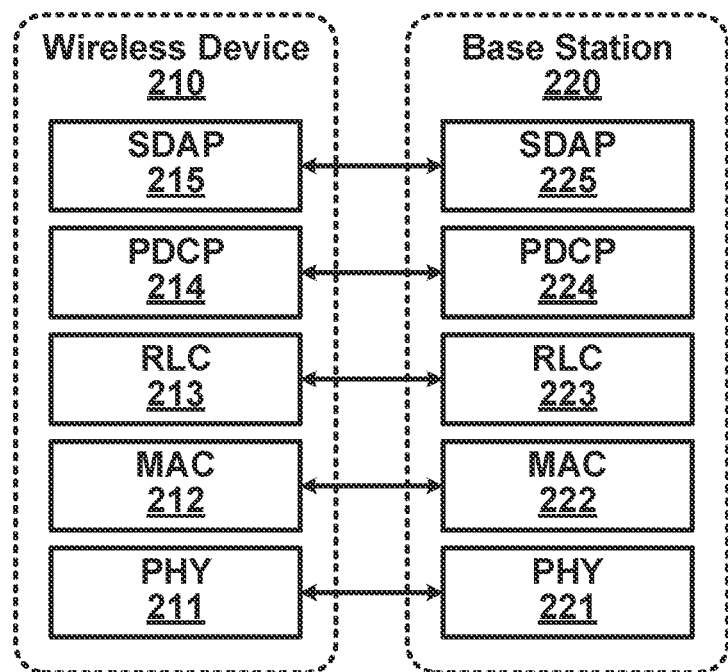
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to transmission and/or reception configuration and signaling for wireless communication.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
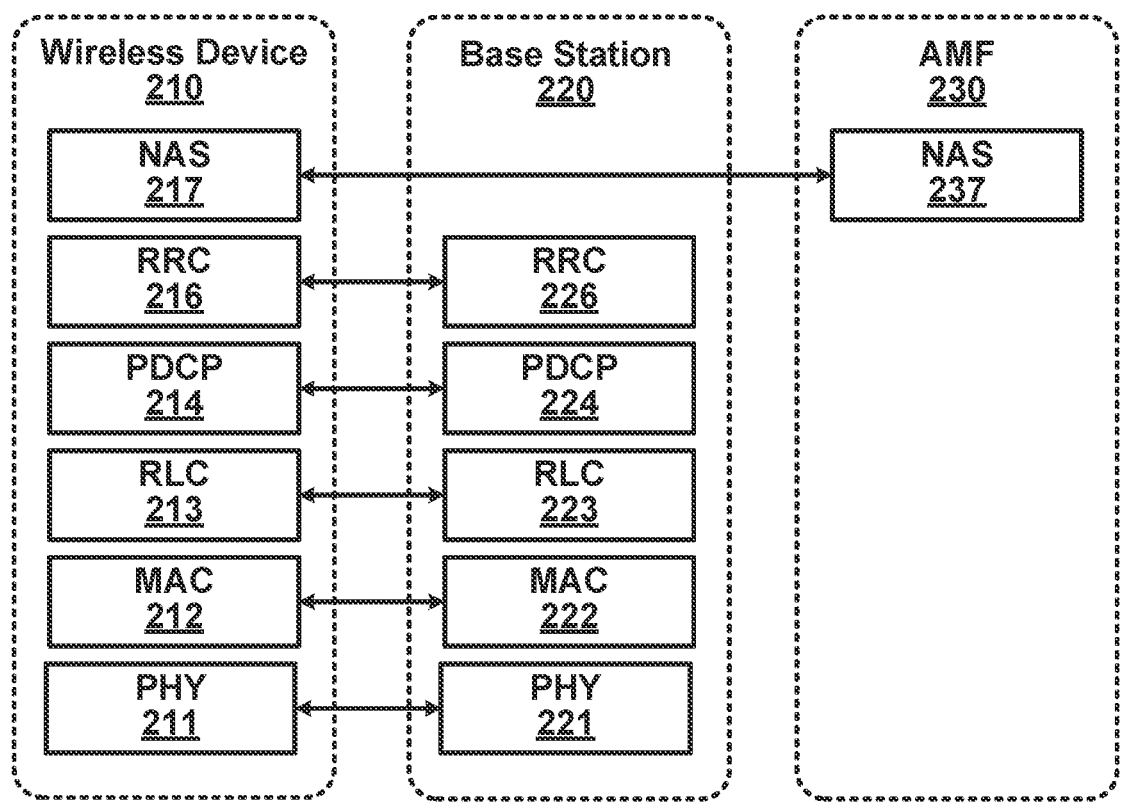
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (SOI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
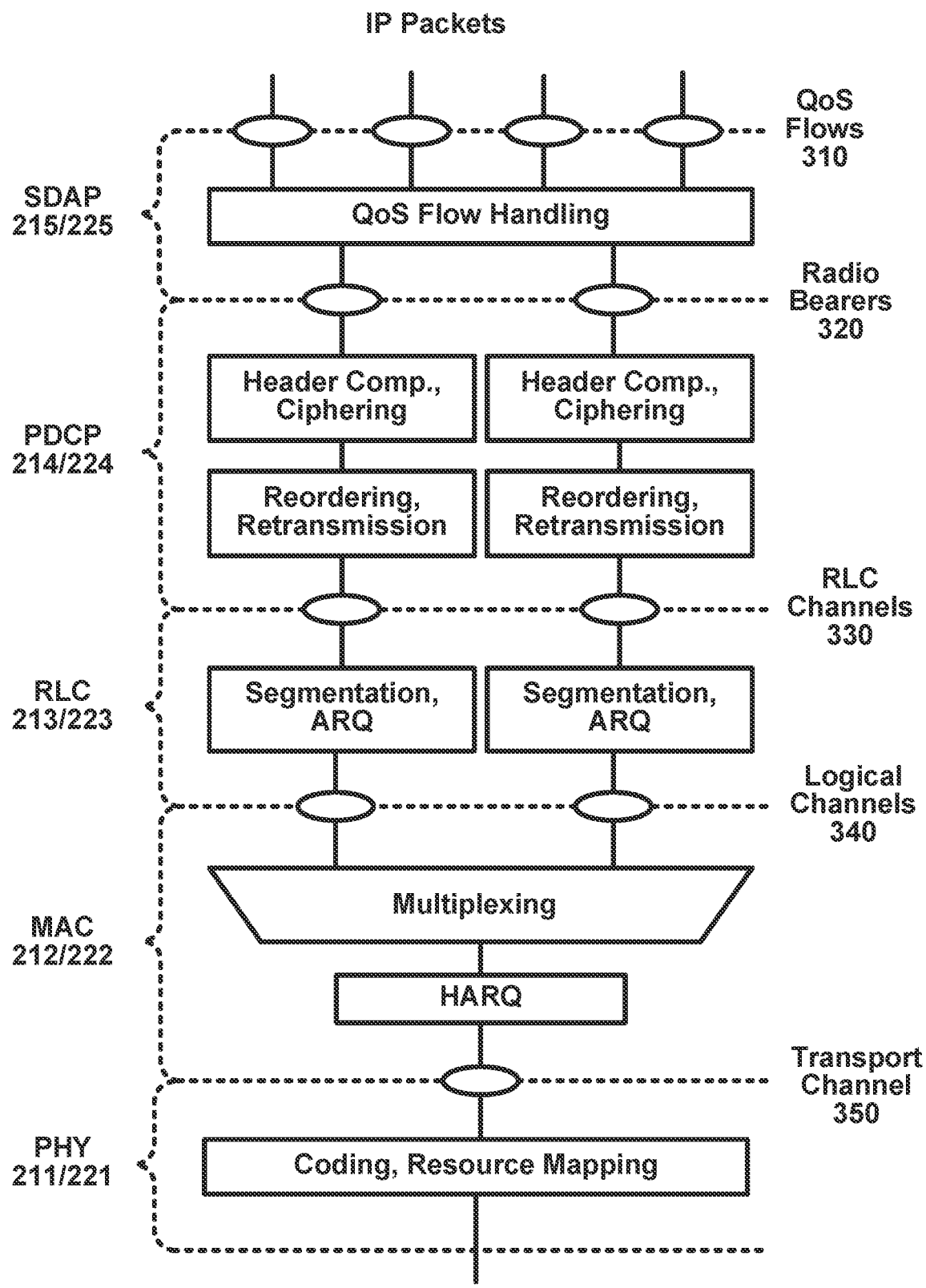
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
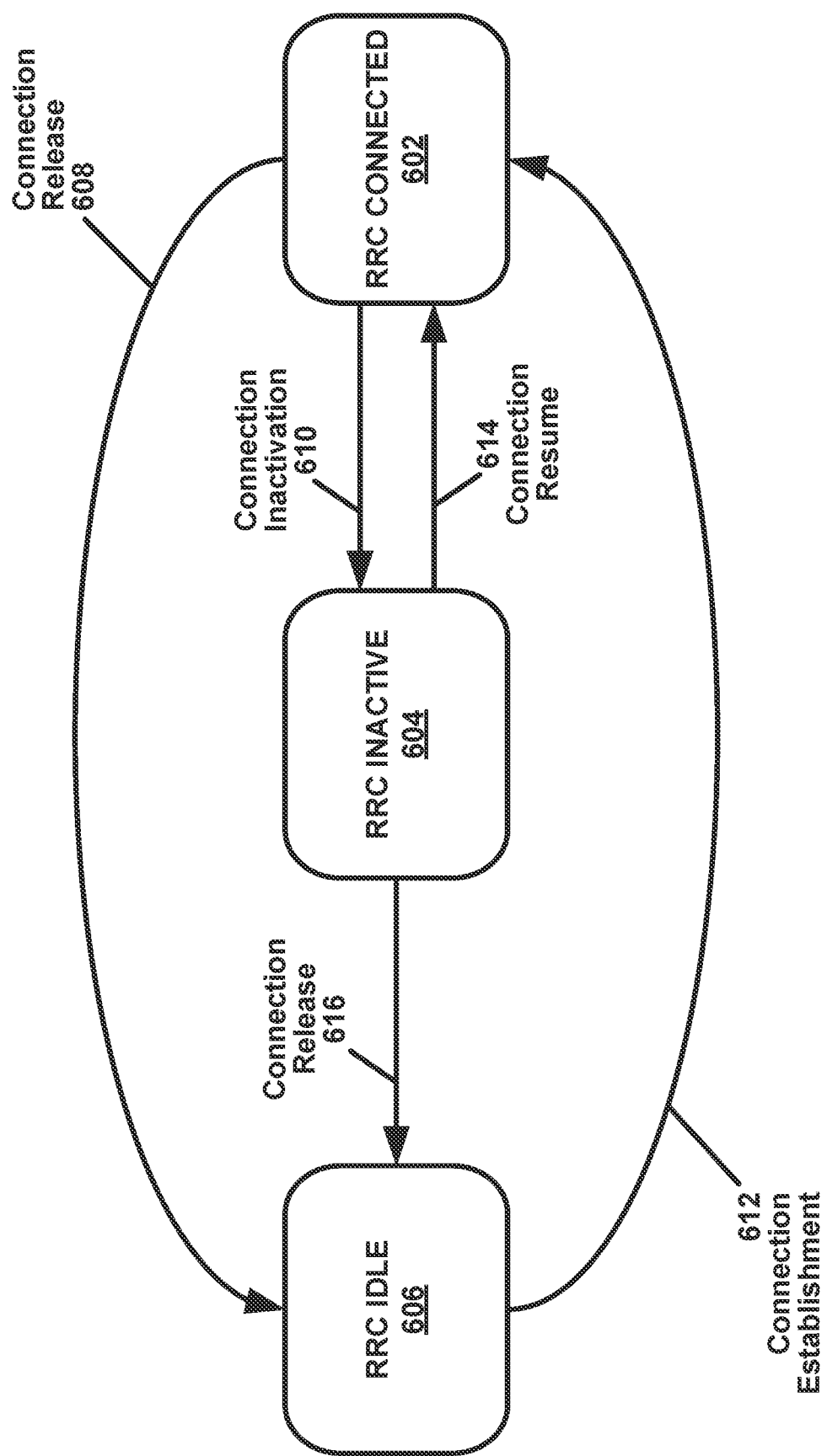
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
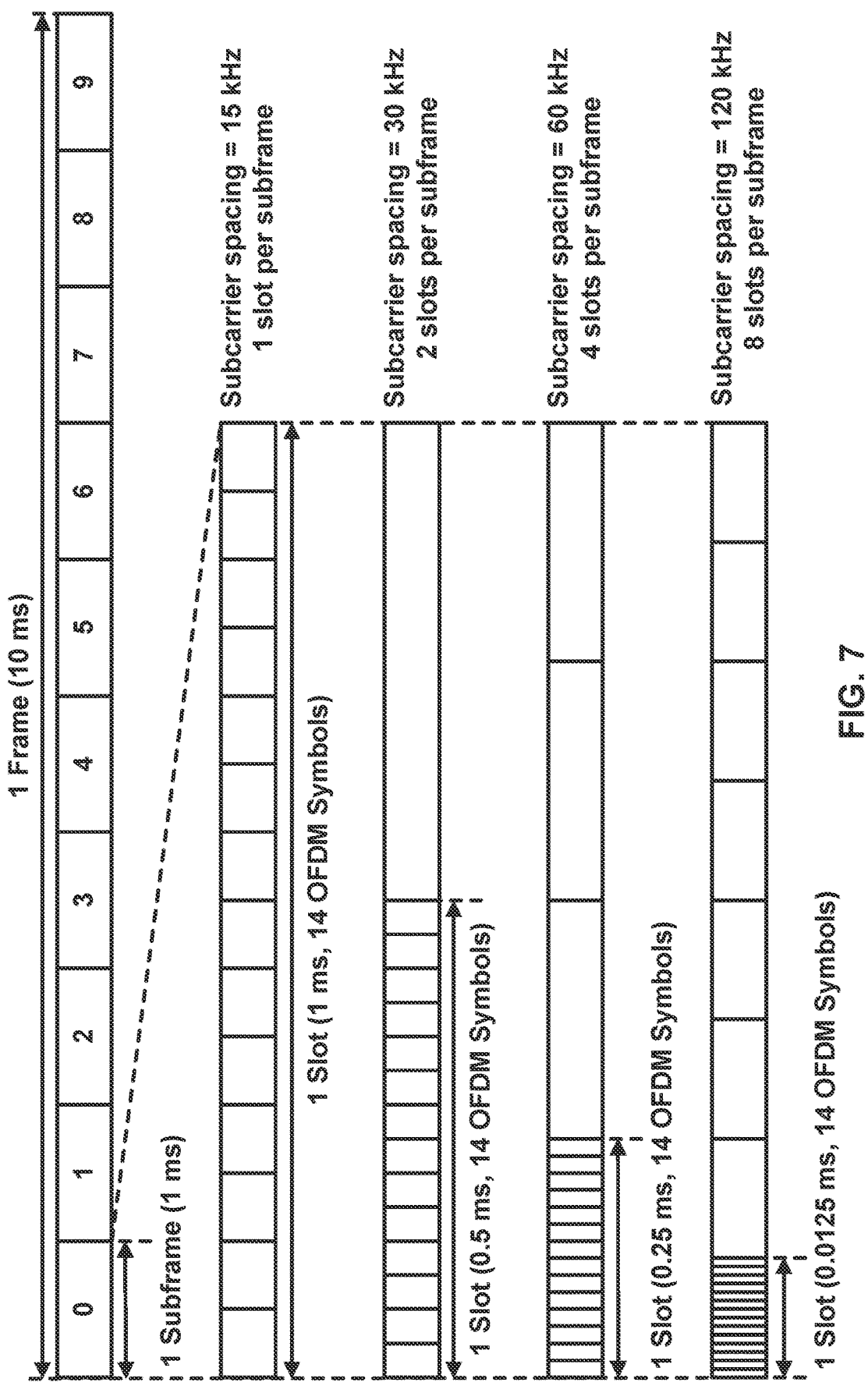
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
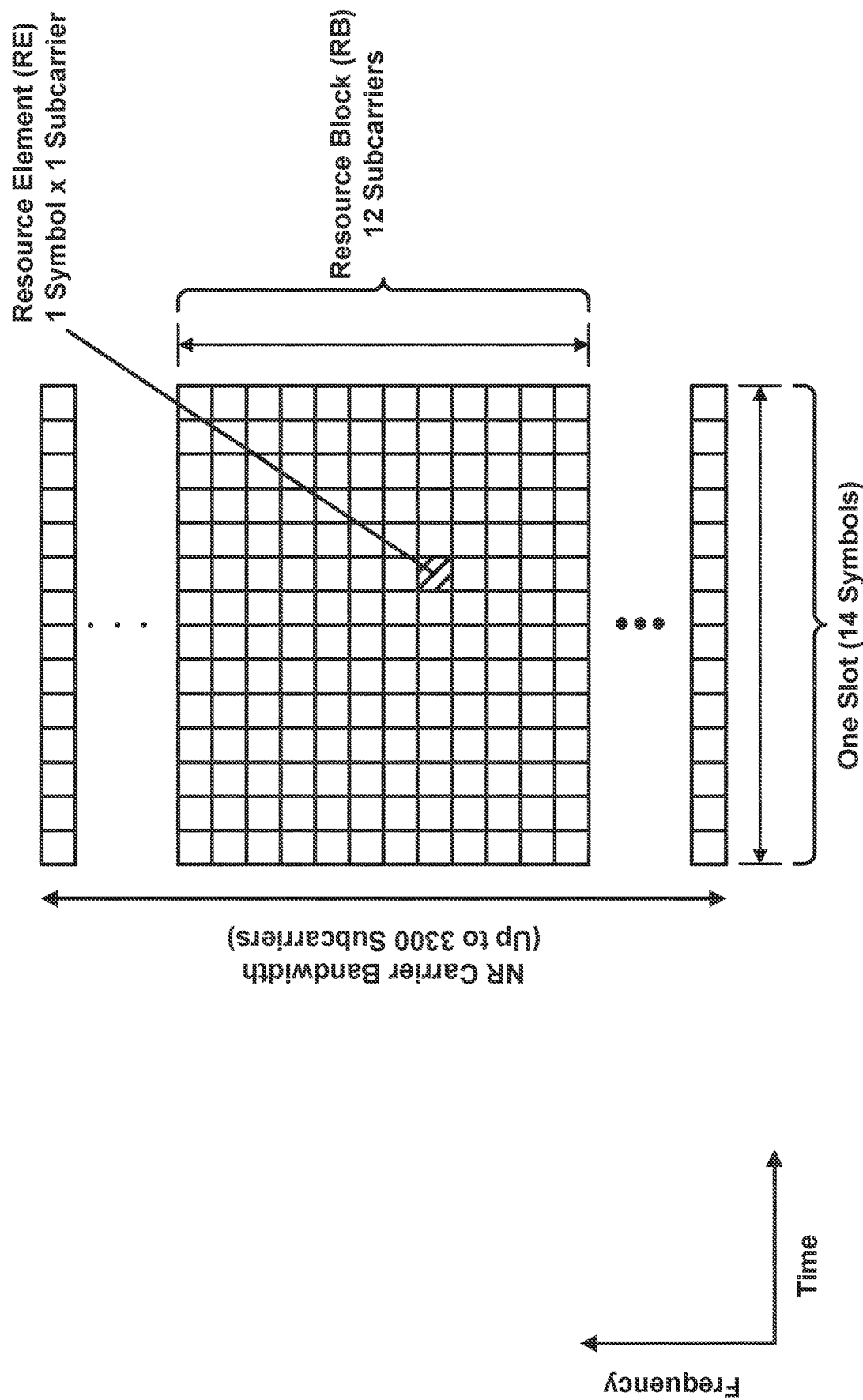
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
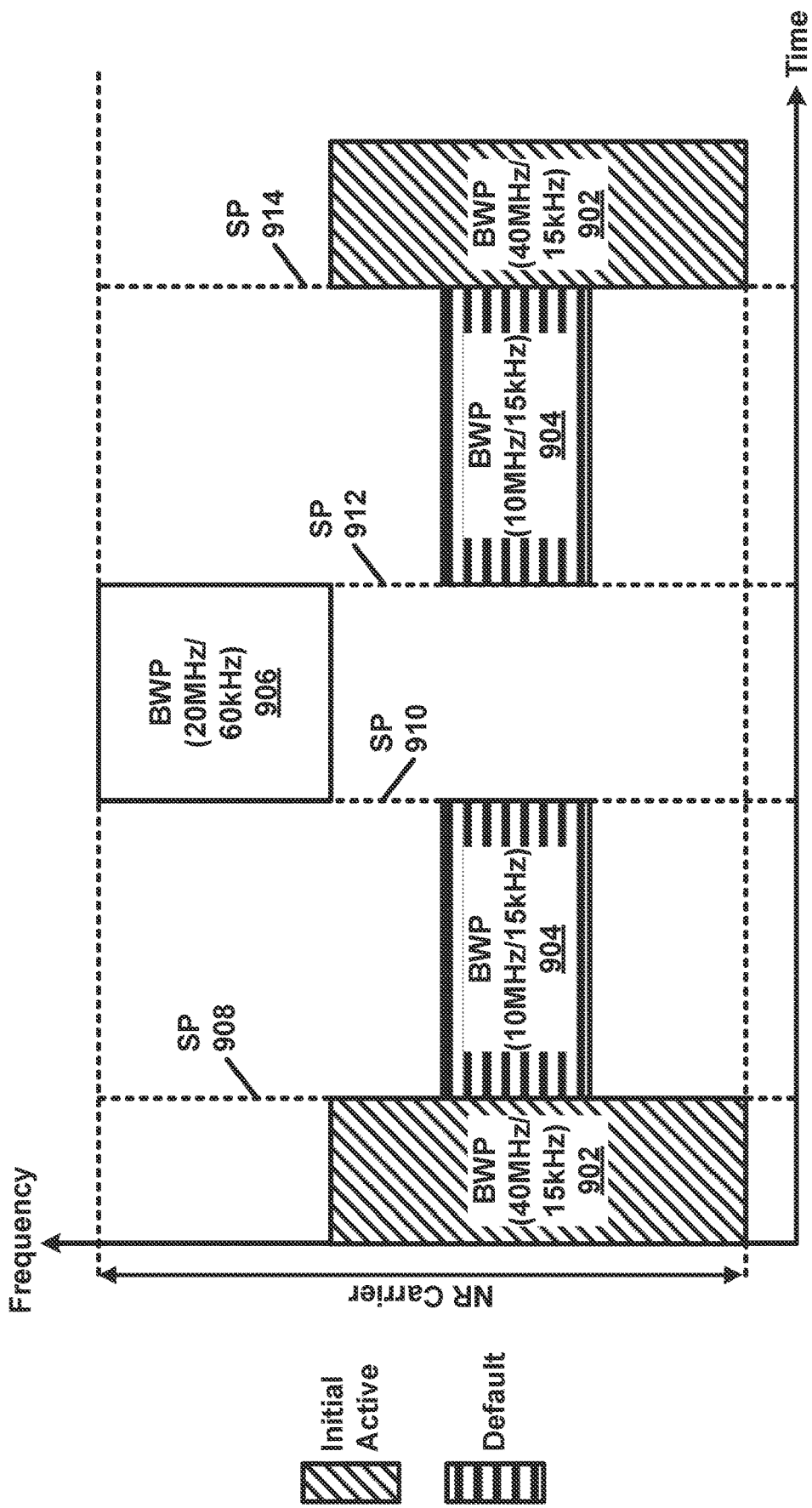
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
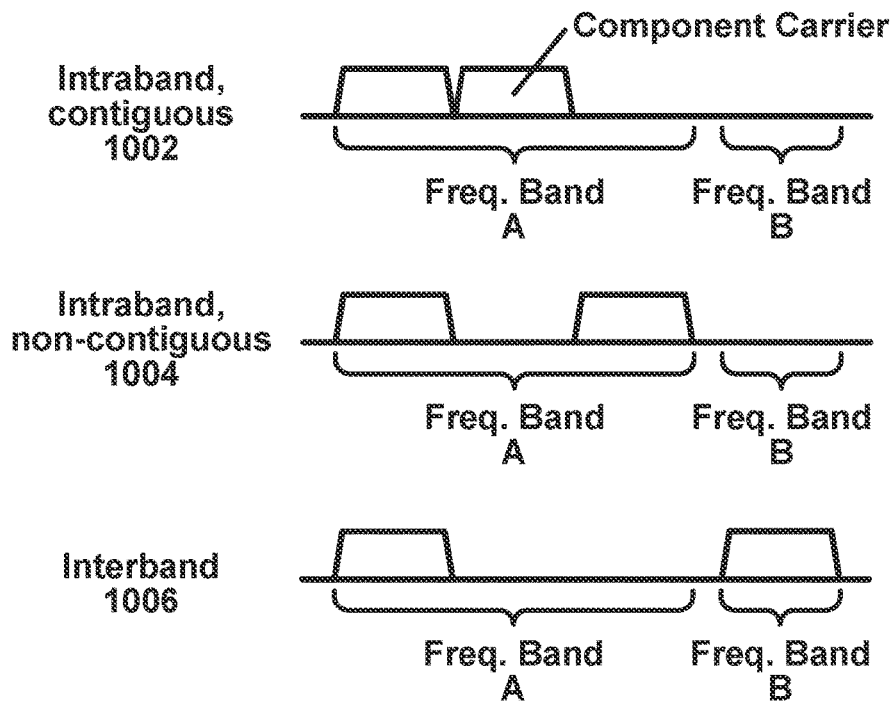
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
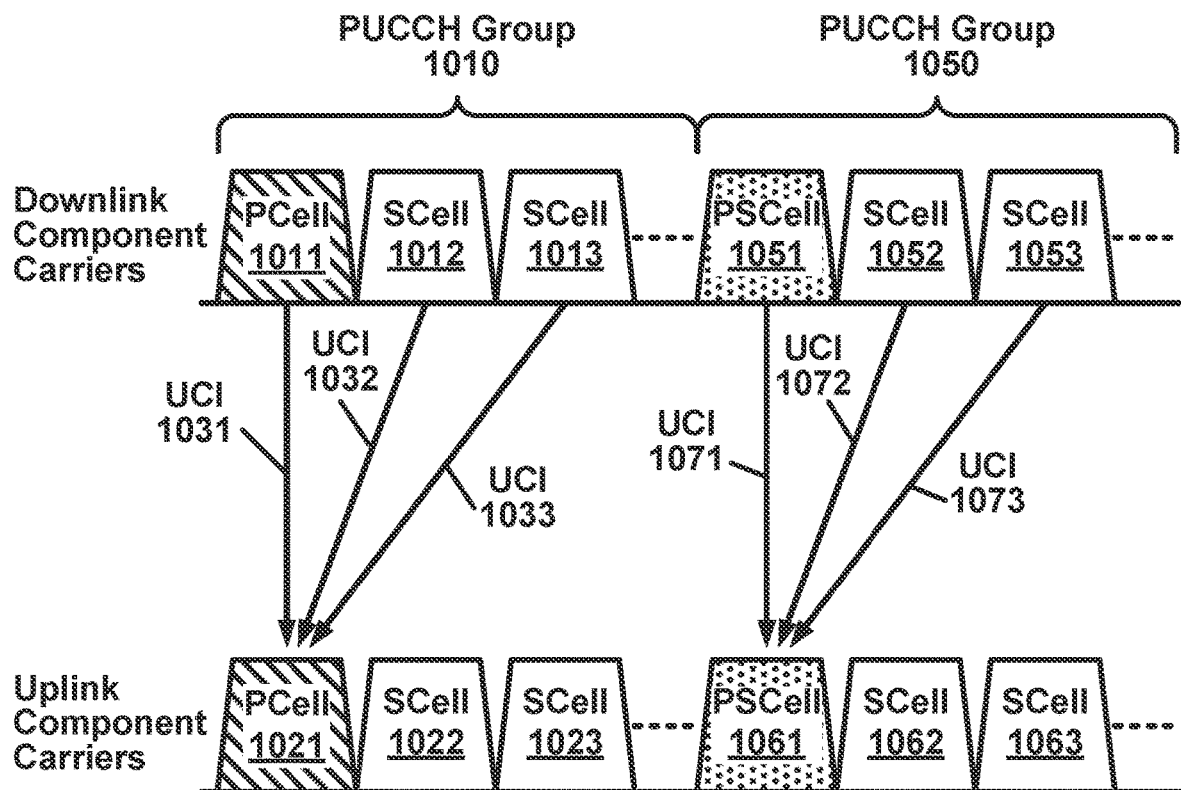
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
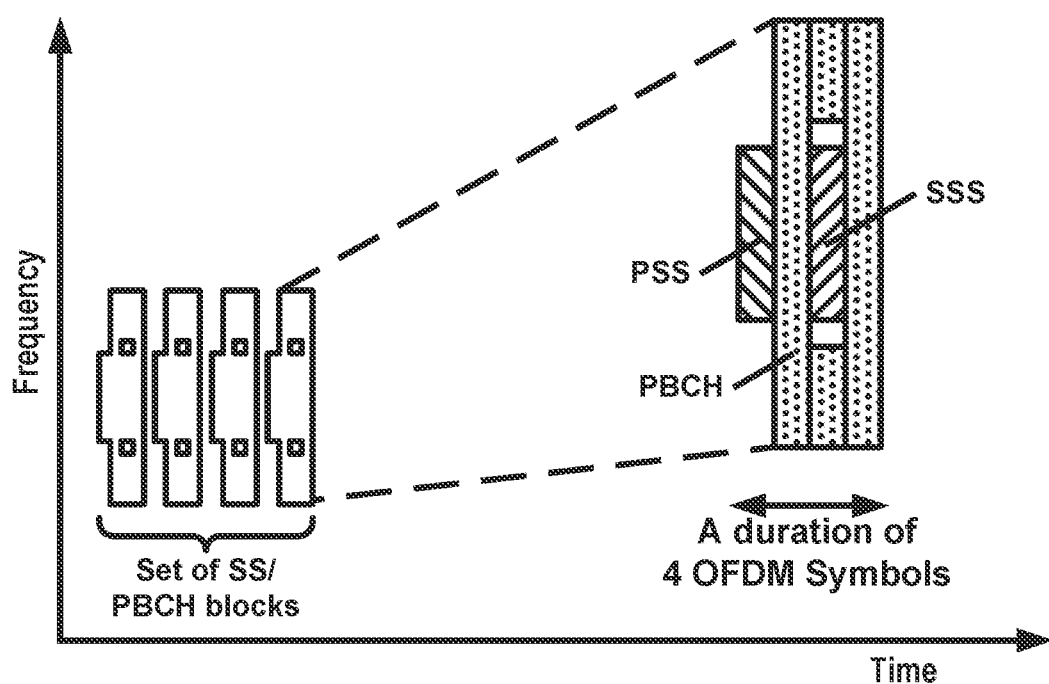
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB 1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
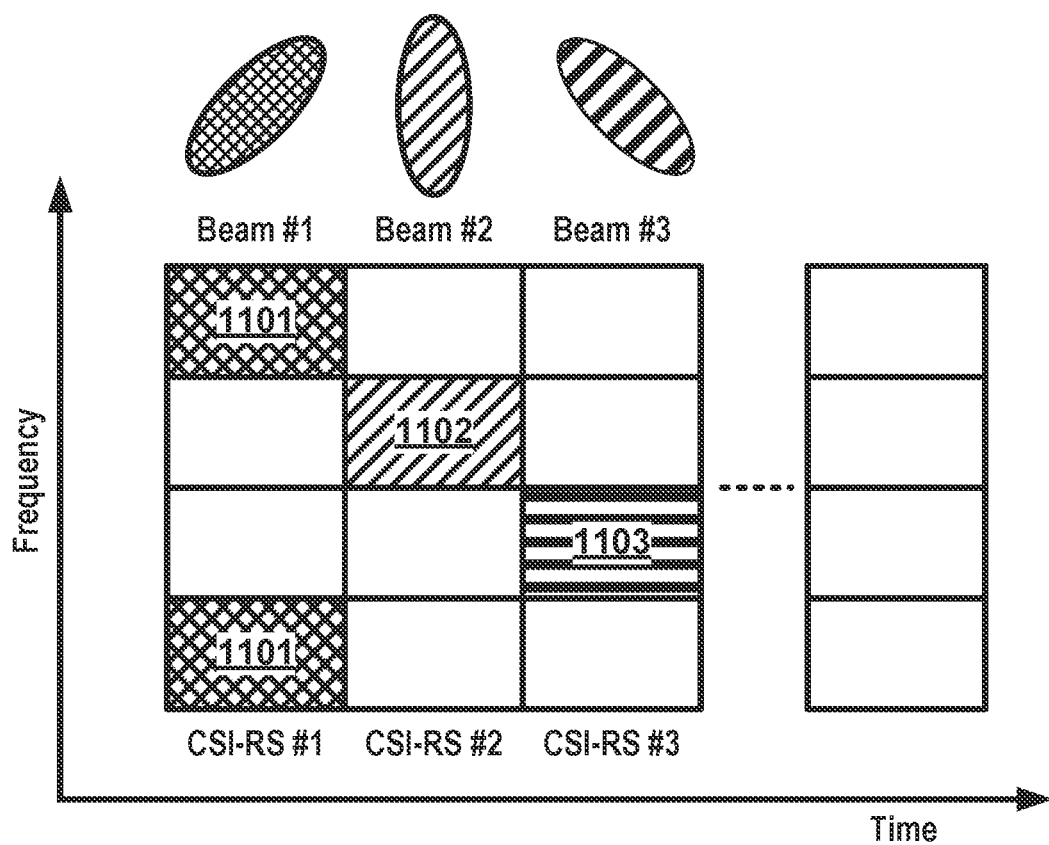
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCJ states to the wireless device (e.g., via RRC signaling, a MAC CE, and/or DCI). The wireless device may receive a downlink transmission with an Rx beam determined based on the one or more TCJ states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counterclockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counterclockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
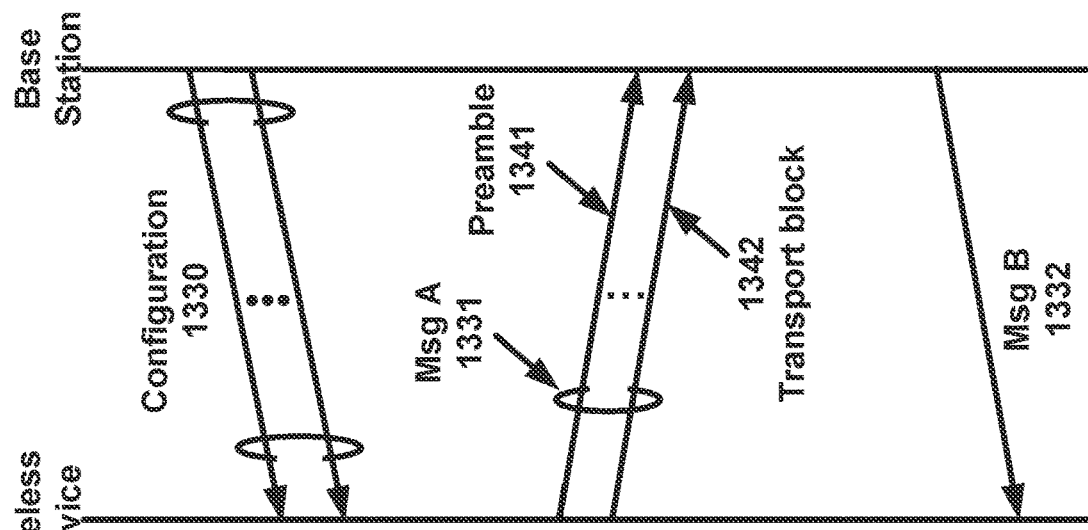
FIG. 13C shows an example two-step random access procedure.
Figure 13B:
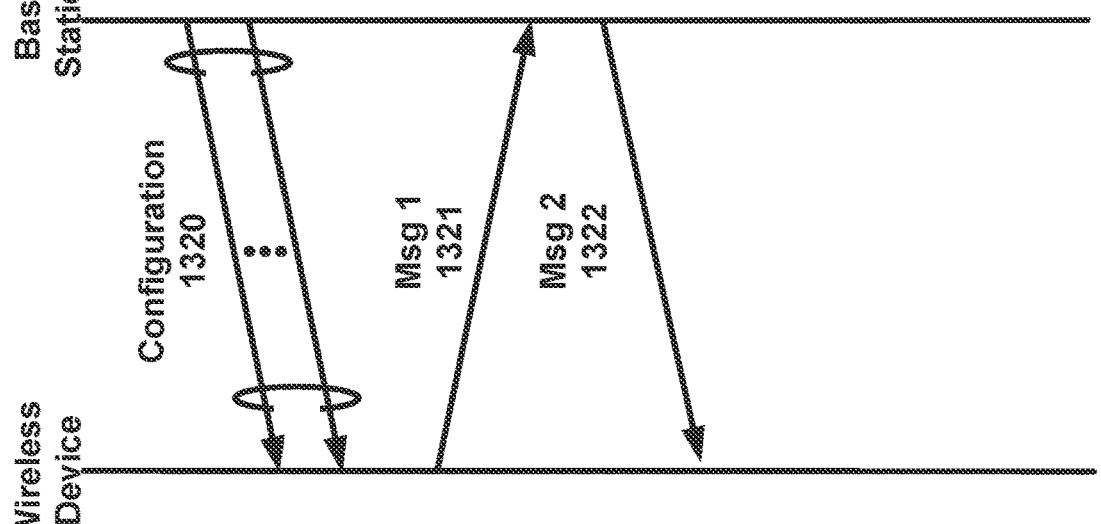
FIG. 13B shows an example two-step random access procedure.
Figure 13A:
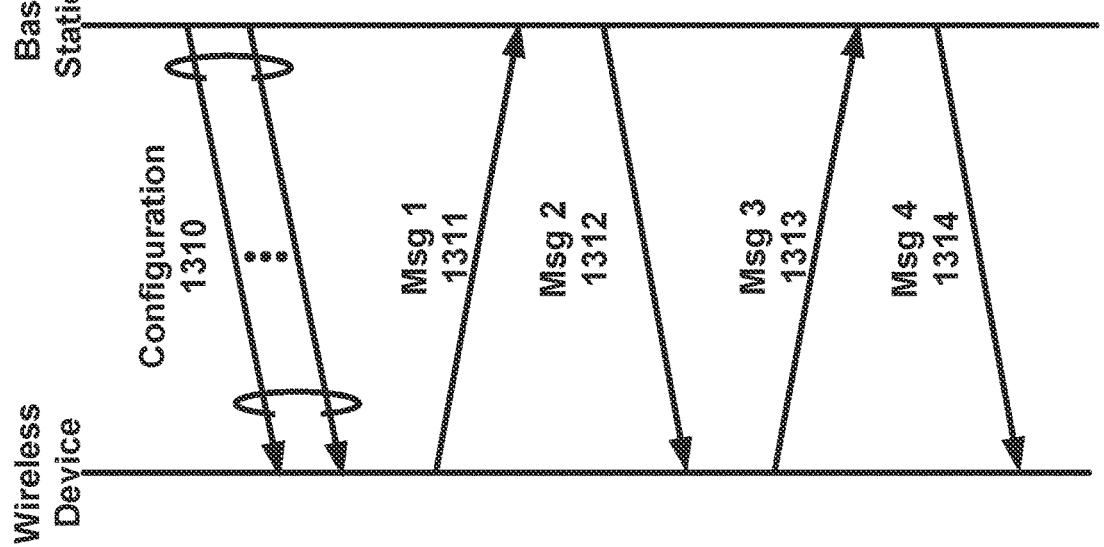
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
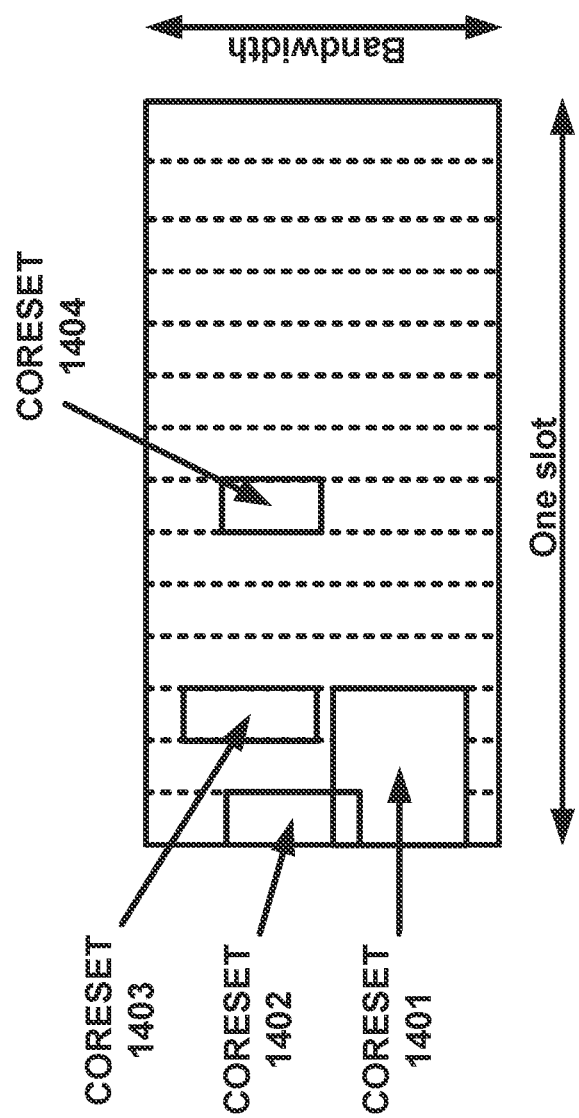
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
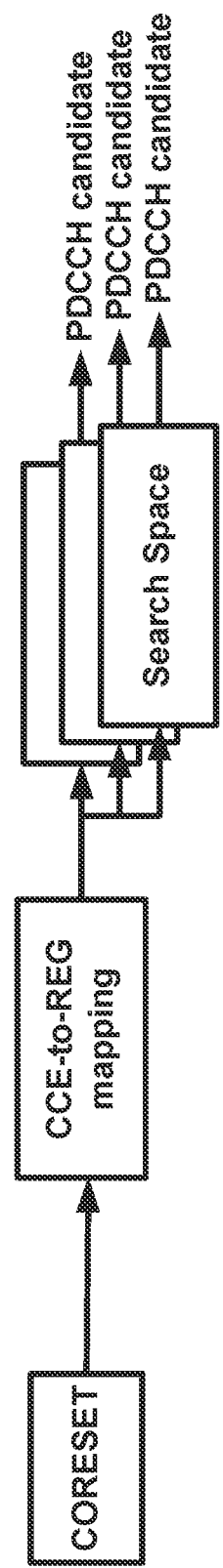
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
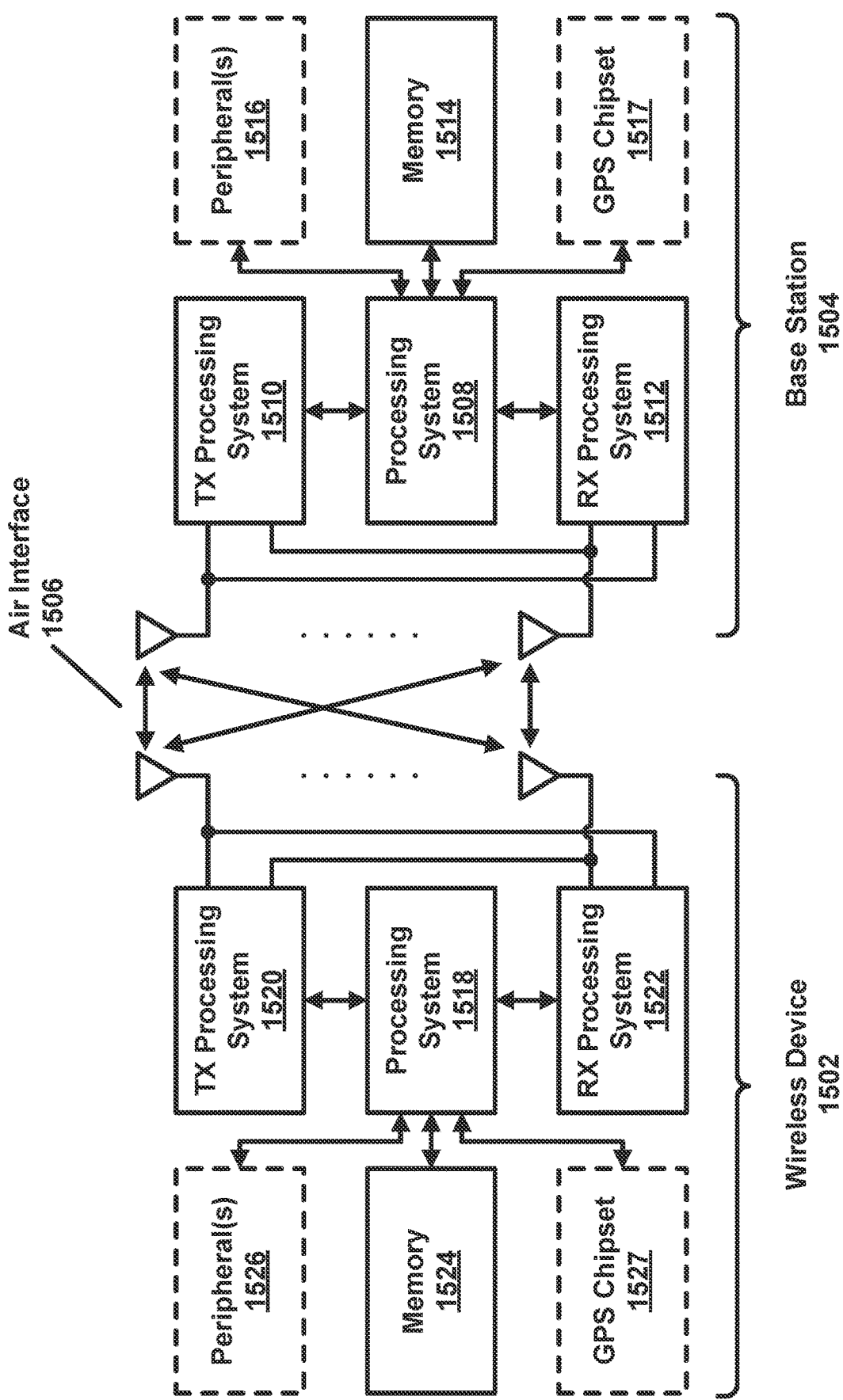
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
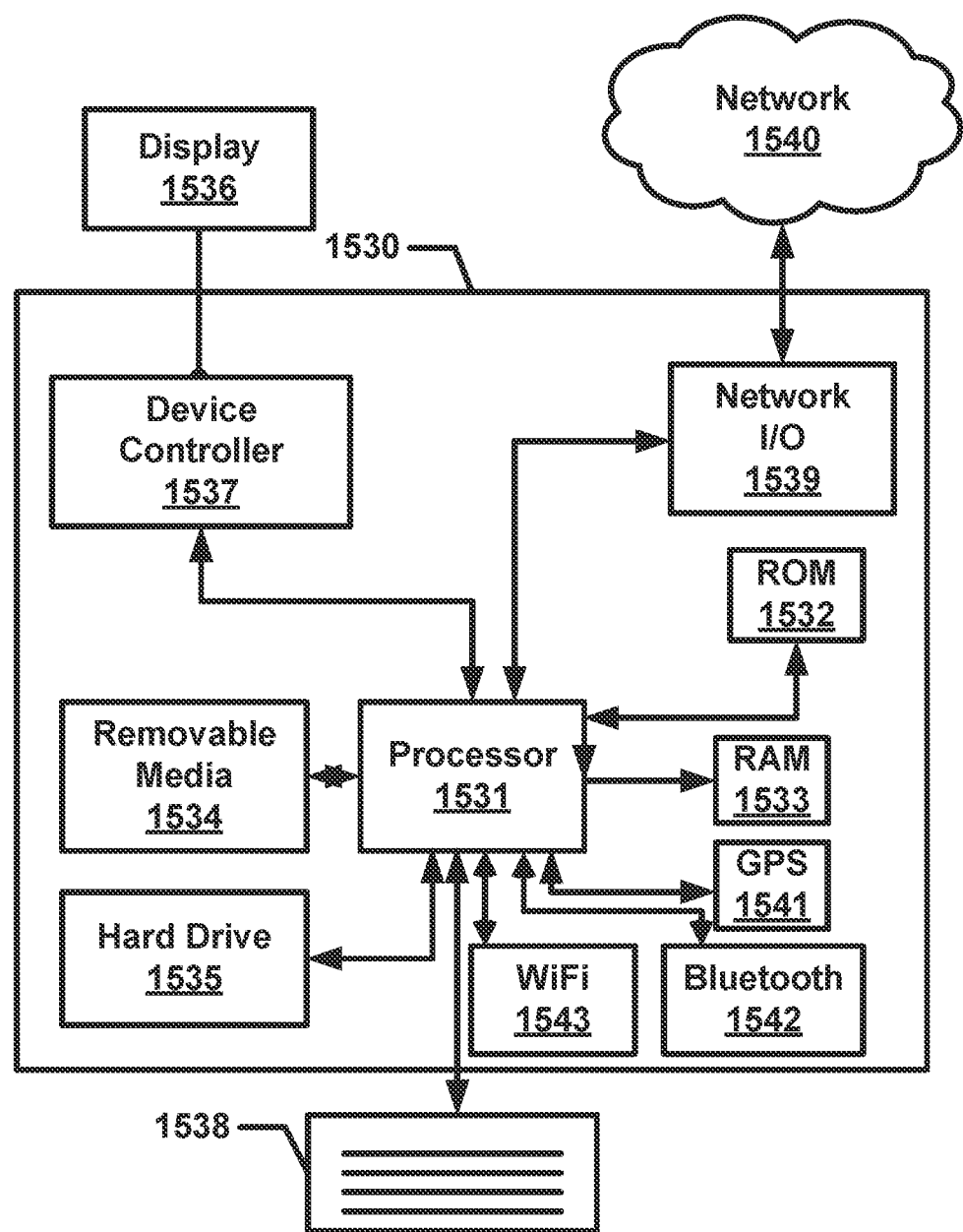
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
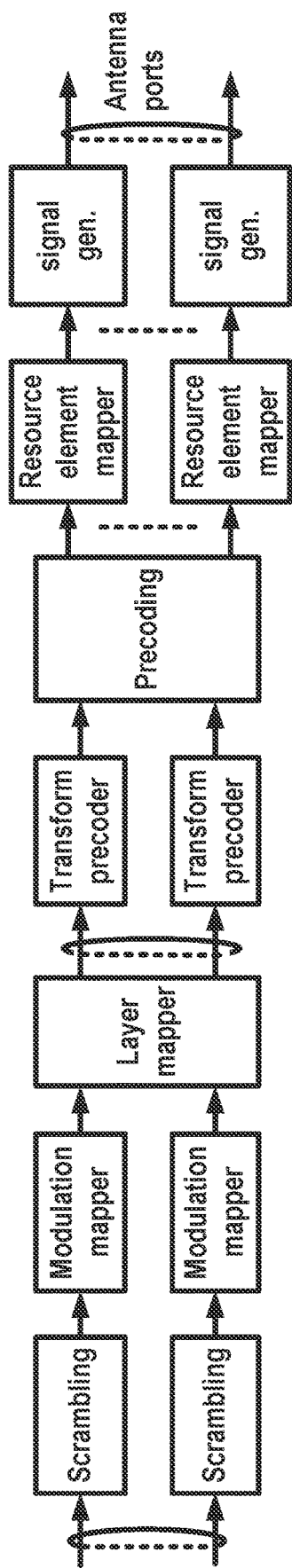
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
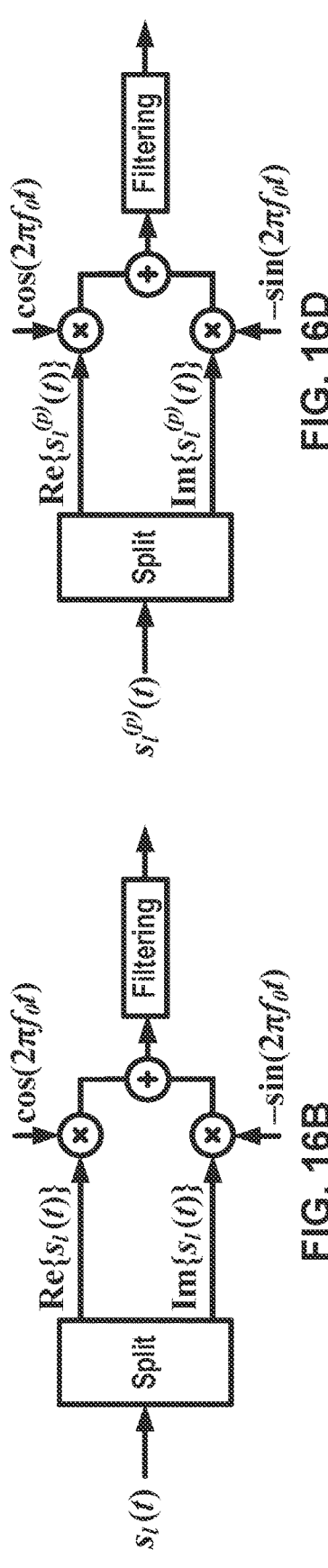

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16C:
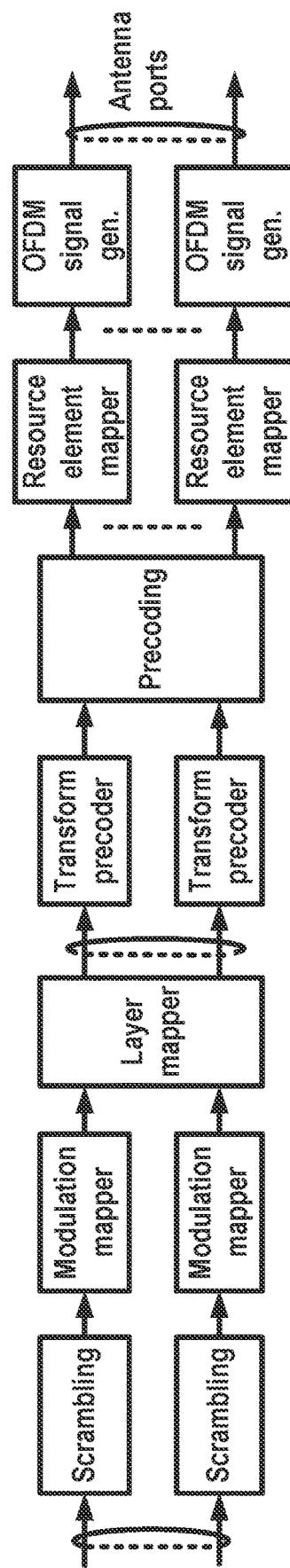

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

Figure 16D:
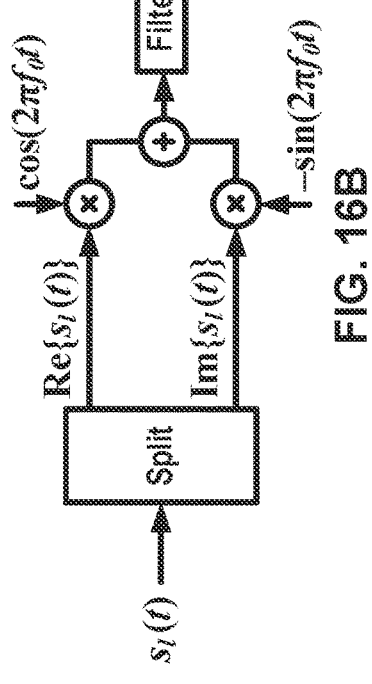

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless communication between a device (e.g., a wireless device) and another device (e.g., a base station) may require configuration of one or more of the devices. Although various examples herein may describe operations of and/or communications between wireless device(s) and base station(s), one skilled in the art may recognize that the operations and/or communications may be applied to any other communication devices. Transmission and/or reception configuration and/or associated signaling may be used to synchronize/align a wireless device and a base station. A base station may determine one or more configuration parameters for a wireless device. A wireless device may determine and/or receive (e.g., from a base station) one or more configuration parameters. The one or more configuration parameters may be for a cell and/or for a plurality of cells. The one or more configuration parameters may indicate a plurality of CORESETs. The one or more configuration parameters may indicate the plurality of CORESETs for an active downlink BWP of the cell (and/or for any other wireless resource/frequency/band/etc. for operation within the cell). The active downlink BWP/resource may comprise the plurality of CORESETs. The one or more configuration parameters may indicate a plurality of CORESET indicators/indexes for the plurality of CORESETs. The one or more configuration parameters may (or may not) indicate at least one uplink resource (e.g., a PUCCH resource) for an active uplink BWP of the cell.

The wireless device may receive DCI scheduling transmission of an uplink transmission (e.g., at least one transport block, a PUSCH transmission, etc.). The DCI may comprise an indication of a spatial relation (e.g., spatial domain filter, spatial domain transmission filter, beam, etc.) for the uplink transmission. The wireless device may use the indicated spatial relation to determine one or more transmission parameters (e.g., a transmission beam and/or a transmission power) for the uplink transmission. The spatial relation may indicate/correspond to a reference signal. The wireless device may use the reference signal to determine a transmission beam and/or a transmission power for the uplink transmission.

The DCI may correspond to a DCI format (e.g., DCI format 0_0) that may not indicate a spatial relation for the uplink transmission. The wireless device may determine that the one or more configuration parameters does not indicate at least one uplink resource (e.g., a PUCCH resource) for an active uplink BWP of the cell. The one or more configuration parameters may indicate one or more uplink resources (e.g., PUCCH resources) for an active uplink BWP of the cell. The wireless device may determine that the one or more uplink resources are not configured (e.g. via the one or more configuration parameters or an activation command such as MAC CE command), with a spatial relation for an uplink transmission.

A wireless device may receive DCI (e.g., corresponding to DCI format 0_0) scheduling uplink transmission (e.g., at least one transport block, a PUSCH transmission, etc.) via an active BWP/resource of a cell. The active uplink BWP may not be configured with any uplink resources (e.g., PUCCH resources), or none of configured uplink resources in the active uplink BWP may be configured/activated with a spatial relation (e.g., transmitting beam information). The wireless device may determine, for transmission of at least one transport block, a default transmission power and/or a default transmitting beam (e.g., default spatial domain transmission filter), for example, if the active BWP is not configured with any uplink resource. The wireless device may determine, for transmission of the at least one transport block, a default transmission power and/or a default transmitting beam, for example, if the active BWP is configured with one or more uplink resources but none of the uplink resources are configured with a spatial relation. The wireless device may send/transmit the at least one transport block using the default transmission power and/or via the default transmitting beam. The wireless device may determine the default transmission power and/or the default spatial domain transmission filter based on a TCI state of a CORESET with a lowest CORESET indicator/index, among CORESET indicators/indexes associated with a plurality of CORESETs, in the active downlink BWP/resource of the cell.

The wireless device may select/determine a CORESET, among a plurality of CORESETs, for transmission of at least one transport block. Reference herein to a transport block or the transport block may refer to any quantity of transport blocks, such as at least one transport block or a plurality of transport blocks. The wireless device may select/determine a CORESET, among a plurality of CORESETs, for transmission of the transport block, for example, based on determining that the one or more configuration parameters does not indicate at least one uplink resource. A CORESET indicator/index of the CORESET may be lowest among the plurality of CORESET indicators/indexes of the plurality of CORESETs. The wireless device may select/determine a CORESET, among the plurality of CORESETs, for transmission of the transport block, for example, if the configured uplink resources are not configured/activated with spatial relations. A CORESET indicator/index of the CORESET may be lowest among the plurality of CORESET indicators/indexes of the plurality of CORESETs.

The wireless device may send/transmit at least one transport block using a spatial filter (e.g., spatial domain transmission filter, a transmission beam, etc.) that may be determined based on a TCI state of the (selected/determined) CORESET. The wireless device may send/transmit the at least one transport block using a transmission power that may be determined based on a TCI state of the (selected/determined) CORESET. For example, the wireless device may determine the transmission power based on a pathloss reference signal associated with/indicated by the TCI state of the (selected/determined) CORESET.

A wireless device may determine one or more transmission parameters (e.g., a default transmission power and/or a default transmitting beam) based on a selected/determined CORESET. The wireless device may determine one or more transmission parameters (e.g., a default transmission power and/or a default transmitting beam) based on a selected CORESET, for example, based on one or more conditions/ considerations described herein. For example, the wireless device may receive DCI (e.g., corresponding to DCI format 0_0) scheduling a transport block (e.g., PUSCH transmission) via an active uplink bandwidth (BWP) of a cell. The wireless device may determine, for transmission of the transport block, a default transmission power and/or a default spatial domain transmission filter (e.g., transmitting beam), for example, if the active uplink BWP is not configured with any PUCCH resource, or if none of the PUCCH resources in the active uplink BWP is configured/activated with a spatial relation (e.g., transmitting beam information). The wireless device may send/transmit the transport block using the default transmission power and the default spatial domain transmission filter. The wireless device may determine the default transmission power and/or the default spatial domain transmission filter based on TCI state of a CORESET with the lowest CORESET indicator/index in the active downlink BWP of the cell.

Selecting a CORESET based on a lowest CORESET indicator/index may result in inefficient/unsuccessful communications, such as for communications associated with multiple TRPs/devices. For example, a first TRP may send DCI (e.g., corresponding to DCI format 0_0) scheduling a transport block, but the CORESET with the lowest CORESET indicator/index may correspond to a second TRP different from the first TRP. Selecting the CORESET with the lowest CORESET indicator/index may result in the wireless device sending a transmission associated with the first TRP (e.g., based on the DCI from the first TRP) using one or more transmission parameters determined based a CORESET associated with the second TRP. The CORESET associated with the second TRP may not be appropriate for transmission of transport block(s) to the first TRP, for example, if the two TRPs are located at different locations/positions and/or are be subject to different channel conditions.

A wireless device may be served by (e.g., send messages to and/or receive messages from) multiple TRPs (e.g., a first TRP and a second TRP). The first TRP may send/transmit DCI via a CORESET corresponding to a first CORESET pool (e.g., comprising one or more first CORESETs of a plurality of CORESETs). The second TRP may send/transmit DCI via CORESET corresponding to a second CORESET pool (e.g., comprising one or more second CORESETs of the plurality of CORESETs). The wireless device may receive, from the first TRP and via a first CORESET in the first CORESET pool (e.g., indicated by a first CORESET pool indicator/index and/or TRP indicator/index), DCI scheduling transmission (e.g., of at least one transport block). The one or more configuration parameters may (or may not) indicate one or more uplink resources (e.g., PUCCH resources) for an active uplink BWP of the cell. The wireless device may determine that the one or more configuration parameters does not indicate at least one uplink resource (e.g., PUCCH resource) for the active uplink BWP of the cell. The one or more configuration parameters may indicate one or more uplink resources (e.g., PUCCH resources) for an active uplink BWP/resource of the cell. The wireless device may determine that the one or more uplink resources are not provided/configured (e.g. via the one or more configuration parameters or an activation command such as a MAC CE command) with one or more spatial relations. The wireless device may select a CORESET with a CORESET index that is lowest among the plurality of CORESET indexes of a plurality of CORESETs (e.g., in the first CORESET pool and the second CORESET pool). The CORESET with the lowest CORESET index may be a CORESET in the second CORESET pool associated with the second TRP. The wireless device may use different beams (e.g., corresponding to different directions, different widths, etc.) for the first TRP and the second TRP because the first TRP and the second TRP may be located in different locations/positions. Transmitting transport block(s) scheduled by the first TRP (e.g., via DCI from the first TRP) using transmission parameters that are determined based on the CORESET associated with the second TRP may lead to undesirable results such as coverage loss, reduced data rate, and/or increased interference to other cells/wireless devices.

One or more CORESET pools (e.g., a first CORESET pool and/or the second CORESET pool) may be indicated by respective CORESET pool indicators/indexes. A wireless device may use a CORESET pool indicator/index of a CORESET, via which the wireless device receives DCI (e.g., corresponding to DCI format 0_0), to determine if an uplink transmission (e.g., at least one transport block), based on the DCI, is for a first TRP or a second TRP (or any other TRP/device). The wireless device may determine that the uplink transmission is to be sent to the first TRP, for example, if the wireless device receives, via a CORESET associated with a CORESET pool indicator/index that is equal to a first value (e.g., zero, or any other first value), DCI scheduling the uplink transmission. The wireless device may determine that the uplink transmissions is to be sent to the second TRP, for example, if the wireless device receives, via a CORESET with a CORESET pool indicator/index that is equal to a second value (e.g., one, or any other second value), DCI scheduling the uplink transmission.

Various examples herein describe determination of transmission parameters (e.g., a transmission power and/or transmission beam) to be used for an uplink transmission, for example, if the wireless device is served by multiple TRPs (or any transmission/reception device). The wireless device may receive control information (e.g., DCI), via a CORESET associated with a CORESET pool, scheduling an uplink transmission. The wireless device may determine/select a CORESET, in the same CORESET pool, for determining one or more transmission parameters to be used for the uplink transmission. A CORESET pool indicator/index may be used to determine a CORESET that may be used for determining the one or more transmission parameters.

A base station may send, to the wireless device, one or more configuration parameters. The one or more configuration parameters may indicate a first CORESET pool indicator/index for the first CORESET via which the wireless device may receive DCI. The wireless device may determine/select a CORESET, among a plurality of CORESETs, in a CORESET pool with a CORESET pool indicator/index that is the same as (or equal to) the first CORESET pool indicator/index. The wireless device may select a CORESET, among the plurality of CORESETs in the CORESET pool, with a CORESET indicator/index that is lowest among a plurality of CORESET indicators/indexes of the plurality of CORESETs in the CORESET pool. The wireless device may determine the transmission parameters (e.g., a transmission power and/or a transmission beam) based on the selected CORESET, for example, based on receiving the DCI.

A wireless device may receive, via a first CORESET associated with a CORESET pool indicator/index, DCI (e.g., corresponding to DCI format 0_0). The DCI may schedule transmission of a transport block (e.g., PUSCH transmission) via an active uplink BWP of a cell. The wireless device may determine, for transmission of the transport block, a default transmission power and a default transmission beam, for example, if the active uplink BWP is not configured with any PUCCH resource, or if none of the PUCCH resources in the active uplink BWP is configured/activated with a spatial relation. The wireless device may determine the default transmission power and the default transmission beam based on a TCI state of a second CORESET with a lowest CORESET indicator/index in the active downlink BWP of the cell, and a CORESET pool indicator/index that is the same as the CORESET pool indicator/index of the first coreset. Various examples herein may provide advantages such as improved coverage, improved data rate, and/or reduced interference to other cells/wireless devices.

A wireless device may receive (e.g., from a base station) one or more configuration parameters for a cell. The wireless device may receive DCI scheduling an uplink transmission (e.g., a transport block, a PUSCH transmission). The DCI may correspond to a DCI format (e.g., DCI format 0_0) that may not indicate a spatial relation for the uplink transmission. The one or more configuration parameters may indicate one or more uplink resources (e.g., PUCCH resources) for an active uplink BWP of the cell. The one or more configuration parameters may indicate one or more uplink resource indicators/indexes for the one or more uplink resources.

A wireless device may select/determine an uplink resource, among one or more uplink resources, for uplink transmission of at least one transport block. An uplink resource indicator/index of the uplink resource may be lowest among the one or more uplink resource indicators/indexes of the one or more uplink resources. The wireless device may send/transmit the uplink transmission (e.g., the at least one transport block) via an uplink beam (e.g., using a spatial domain transmission filter) that may be determined based on a spatial relation associated with the (selected/determined) uplink resource. The wireless device may send/transmit the uplink transmission based on (e.g., using) a transmission power that is determined based on the spatial relation associated with the (selected/determined) uplink resource. For example, the wireless device may determine the transmission power based on a pathloss reference signal associated with/indicated by the spatial relation. The wireless device may receive an activation command indicating the spatial relation for the (selected/determined) uplink resource. The one or more configuration parameters may indicate the spatial relation for the (selected/determined) uplink resource.

A wireless device may be served by (e.g., send messages to and/or receive messages from) multiple TRPs (e.g., a first TRP and a second TRP, and/or any other quantity of any TRP/device). An uplink resource, of one or more uplink resources, may indicate/be associated with at least two spatial relations, for example, if the wireless device is served by multiple TRPs/devices. A first spatial relation of the at least two spatial relations may provide/indicate a first transmission beam for transmission (e.g., via the uplink resource) for/to the first TRP. A second spatial relation of the at least two spatial relations may provide/indicate a second transmission beam for transmission (e.g., via the uplink resource) for/to the second TRP. The wireless device may repeat an uplink transmission, to the two TRPs, using the first and the second transmission beams. Transmission repetition may be used to increase reliability and robustness of the uplink transmission.

A wireless device may receive DCI scheduling an uplink transmission (e.g., a transport block, a PUSCH transmission, etc.). The DCI may correspond to a DCI format (e.g., DCI format 0_0) that may not indicate a spatial relation for the uplink transmission. The wireless device may determine/select an uplink resource, among one or more uplink resources (e.g., one or more PUCCH resources) for the uplink transmission, for example, based on the DCI not indicating the spatial relation for the uplink transmission. The wireless devices may select an uplink resource with an uplink resource indicator/index that may be the lowest among one or more uplink resource indicators/indexes of the one or more uplink resources. The wireless device may determine one or more transmission parameters (e.g., uplink beam and/or transmission power) based on spatial relation associated with the uplink resource.

In at least some wireless communications (e.g., using 3GPP Release 17, earlier/later 3GPP releases or generations, LTE access technology, and/or other access technology), an uplink resource (e.g., PUCCH resource) may be configured with multiple (e.g., two or more) spatial relations. The multiple spatial relations may be to support repetition transmission to multiple receivers (e.g., multiple TRPs). For example, an uplink resource may indicate (e.g., may be associated with) at least two spatial relations (e.g., at least two transmission beams). A wireless device may receive an activation command indicating the at least two spatial relations for the uplink resource. The one or more configuration parameters may indicate the at least two spatial relations for the uplink resource. The wireless device may repeat an uplink transmission (e.g., a PUCCH transmission) using the multiple spatial relations.

A wireless device may select an uplink resource. The wireless device may select the uplink resource, for example, based on the DCI not indicating the spatial relation for the uplink transmission. The selected uplink resource may be configured with multiple spatial relations. Configuring multiple spatial relations for the uplink resource may result in misalignment between the base station and the wireless device. For example, a wireless device may select/determine a first spatial relation of the at least two spatial relations for the uplink transmission and the base station may select/determine a second spatial relation of the at least two spatial relations for receiving the uplink transmission. A wireless device may send an uplink transmission using a transmission beam based on the first spatial relation and the base station may receive the uplink transmission using a transmission beam based on the second spatial relation. A wireless device may determine a transmission power based on a spatial relation associated with a first TRP which may not be sufficient for accurate reception at a second TRP. The second spatial relation may be different from the first spatial relation. Selection/determination of different spatial relations at the base station and the wireless device may result in coverage loss, reduced data rate, and/or increased interference to other cells/wireless devices.

Various examples herein describe selection of a spatial relation for an uplink transmission. A wireless device may select/determine a spatial relation for an uplink transmission, for example, if the wireless device is configured with uplink resources that are associated with multiple spatial relations. A wireless device may use indicators associated with spatial relations to select/determine a spatial relation for the uplink transmission. The wireless device may select/determine a spatial relation (e.g., a selected spatial relation) among at least two spatial relations associated with an uplink resource. The selected spatial relation may be indicated/identified by a spatial relation indicator/index that is lowest among at least two spatial relation indicators/indexes of the at least two spatial relations. One or more configuration parameters may indicate the at least two spatial relation indicators/indexes for the at least two spatial relations. The selected spatial relation may be a first spatial relation (e.g., corresponding to a first element or member) in a set (or vector) comprising the at least two spatial relations. The one or more configuration parameters may indicate one or more uplink resource indicators/indexes for one or more uplink resources. The wireless device may select an uplink resource, among one or more uplink resources, with an uplink resource indicator/index that is lowest among the one or more uplink resource indicators/indexes of the one or more uplink resources, and which indicates/is associated with a single (or one or only one) spatial relation.

The wireless device may determine transmission parameters (e.g., transmission beam/spatial transmission filter and/or a transmission power) based on a default spatial relation among the two spatial relations. The wireless device may determine transmission parameters (e.g., transmission beam/spatial transmission filter and/or a transmission power) based on a default spatial relation among the two spatial relations, for example, if the wireless device receives DCI (e.g., corresponding to DCI format 0_0) scheduling an uplink transmission (e.g., via an active uplink BWP of a cell), and if the uplink resource with the lowest uplink resource index/indicator in an active uplink BWP of the cell is configured/activated with two spatial relations. The default spatial relation may be a first spatial relation among the two spatial relations. The first spatial relation may correspond to a first element (e.g., position) in a set/vector comprising the two spatial relations. The default spatial relation may be a spatial relation with a lowest (or highest) spatial relation index among the two spatial relations.

The wireless device may determine transmission parameters based on a spatial relation of a selected uplink resource, for example, if the wireless device receives DCI (e.g., corresponding to DCI format 0_0) scheduling an uplink transmission (e.g., via an active uplink BWP of a cell). The selected uplink resource may be an uplink resource with a lowest resource indicator/index among resource indicators/indices of uplink resources (e.g., in the active uplink BWP of the cell) that are activated/configured with a single corresponding spatial relation. The base station may configure the uplink resource with the lowest resource indicator/index in the active uplink BWP of the cell with a single spatial relation. Various examples as described herein may provide advantages such as reduced coverage loss, increased data rate, and/or reduced interference to other cells/wireless devices.

Figure 17:
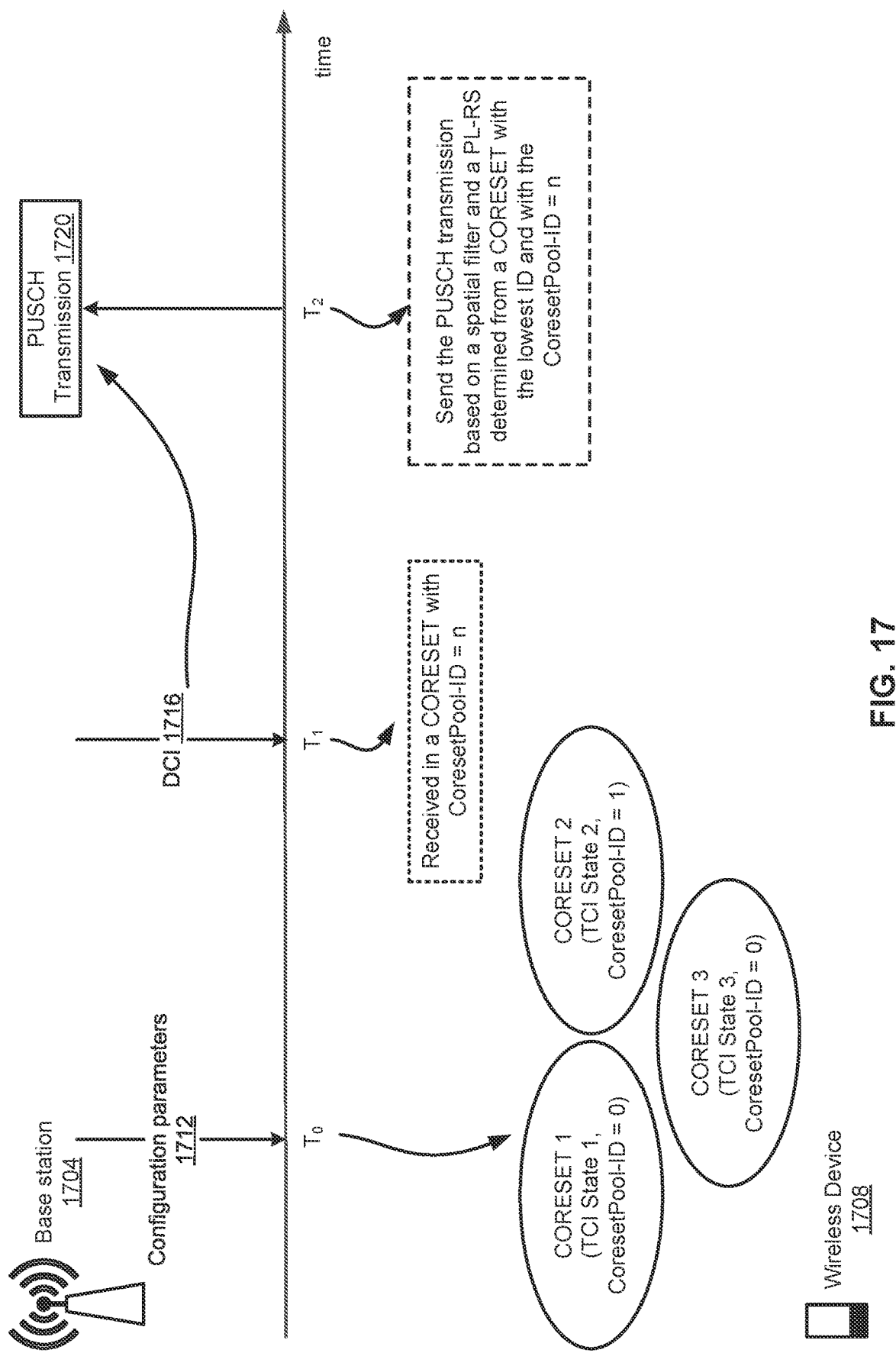
FIG. 17 shows an example beam management based on CORESET selection.

FIG. 17 shows an example beam management. A wireless device 1708 may determine one or more transmission parameters (e.g., a transmission beam and/or uplink transmission power). The wireless device 1708 may determine the one or more transmission parameters based on a selected/determined CORESET. The wireless device 1708 may determine the one or more transmission parameters associated with a selected/determined CORESET, for example, based on one or more considerations. The wireless device 1708 may use a CORESET pool indicator to determine the selected CORESET.

The wireless device 1708 may receive (e.g., at or after time T0) one or more messages. The wireless device 1708 may receive the one or more messages from a base station 1704. The one or more messages may comprise one or more configuration parameters 1712. The one or more configuration parameters may comprise RRC configuration parameter(s). The one or more configuration parameters may comprise RRC reconfiguration parameter(s). The one or more configuration parameters may correspond to a cell. At least one configuration parameter of the one or more configuration parameters may correspond to the cell. The cell may be a primary cell (e.g., PCell). The cell may be a secondary cell (e.g., SCell). The cell may be a secondary cell configured with PUCCH (e.g., e.g., PUCCH SCell). The cell may be an unlicensed cell (e.g., operating in an unlicensed band). The cell may be a licensed cell (e.g., operating in a licensed band). The cell may operate in a first frequency range (e.g., FR1). The FR1 may comprise frequency bands below 6 GHz (e.g., or any other frequency bands). The cell may operate in a second frequency range (e.g., FR2). The FR2 may comprise frequency bands from 24 GHz to 52.6 GHz (e.g., or any other frequency bands). The cell may be a scheduling cell. The wireless device 1708 may be in an RRC connected mode. The wireless device 1708 may be in an RRC idle mode. The wireless device 1708 may be in an RRC inactive mode.

The cell may comprise/accommodate a plurality of BWPs and/or any other wireless resources (e.g., frequency, band, etc.). The plurality of BWPs may comprise one or more uplink BWPs comprising an uplink BWP of the cell. The plurality of BWPs may comprise one or more downlink BWPs comprising a downlink BWP of the cell. A BWP of the plurality of BWPs may be in an active state or an inactive state. The wireless device may monitor a downlink channel/signal (e.g., PDCCH, DCI, CSI-RS, PDSCH) on/for/via a downlink BWP of the one or more downlink BWPs, for example, if the downlink BWP is in an active state. The wireless device 1708 may receive a PDSCH transmission via the downlink BWP, for example, if the downlink BWP is in the active state. The wireless device 1708 may not monitor a downlink channel/signal (e.g., PDCCH, DCI, CSI-RS, PDSCH) on/for/via a downlink BWP of the one or more downlink BWPs, for example, if the downlink BWP is in an inactive state. The wireless device 1708 may stop monitoring a downlink channel/signal (e.g., PDCCH, DCI, CSI-RS, PDSCH) on/for/via a downlink BWP of the one or more downlink BWPs, for example, if the downlink BWP of the one or more downlink BWPs is in an inactive state. The wireless device 1708 may not receive a PDSCH transmission on/via the downlink BWP, for example, if the downlink BWP is in the inactive state. The wireless device 1708 may stop receiving a PDSCH transmission on/for/via a downlink BWP of the one or more downlink BWPs, for example, if the downlink BWP of the one or more downlink BWPs is in an inactive state.

The wireless device 1708 may send/transmit an uplink signal (e.g., PUCCH transmission, preamble transmission, PUSCH transmission, PRACH transmission, SRS transmission, etc.). The wireless device 1708 may send/transmit an uplink signal on/via an uplink BWP of the one or more uplink BWPs, for example, if the uplink BWP is in an active state. The wireless device 1708 may not send/transmit an uplink signal (e.g., PUCCH transmission, preamble transmission, PUSCH transmission, PRACH transmission, SRS transmission, etc.) on/via the uplink BWP, for example, if the uplink BWP is in an inactive state.

The wireless device 1708 may activate the downlink BWP of the one or more downlink BWPs of the cell. The activating the downlink BWP may comprise that the wireless device sets (or switches to) the downlink BWP as an active downlink BWP of the cell. The activating the downlink BWP may comprise that the wireless device 1708 sets the downlink BWP in the active state. The activating the downlink BWP may comprise switching the downlink BWP from the inactive state to the active state.

The wireless device 1708 may activate an uplink BWP of the one or more uplink BWPs of the cell. The activating the uplink BWP may comprise that the wireless device sets (or switches to) the uplink BWP as an active uplink BWP of the cell. The activating the uplink BWP may comprise that the wireless device 1708 sets the uplink BWP in the active state. The activating the uplink BWP may comprise switching the uplink BWP from the inactive state to the active state.

The one or more configuration parameters 1712 may be for the downlink BWP of the cell (e.g., the active downlink BWP of the cell). At least one configuration parameter of the one or more configuration parameters 1712 may be for the downlink BWP of the cell (e.g., the active downlink BWP of the cell). The one or more configuration parameters 1712 may be for the uplink BWP of the cell (e.g., the active uplink BWP of the cell). At least one configuration parameter of the one or more configuration parameters 1712 may be for the uplink BWP of the cell (e.g., the active uplink BWP of the cell).

The one or more configuration parameters 1712 may indicate a plurality of CORESETs (e.g., CORESET 1, CORESET 2, CORESET 3) for the cell. The one or more configuration parameters 1712 may indicate the plurality of CORESETs for the (active) downlink BWP of the cell. The (active) downlink BWP of the cell may comprise the plurality of CORESETs.

The one or more configuration parameters 1712 may indicate a plurality of CORESET indicators/indexes (e.g., provided by a higher layer parameter ControlResourceSetId) for the plurality of CORESETs. Each CORESET of the plurality of CORESETs may be identified/indicated by a respective CORESET indicator/index of the plurality of CORESET indexes. A first CORESET (e.g., CORESET 1) of the plurality of CORESETs may be identified/indicated by a first CORESET index of the plurality of CORESET indexes. A second CORESET (e.g., CORESET 2) of the plurality of CORESETs may be identified/indicated by a second CORESET index of the plurality of CORESET indexes. A third CORESET (e.g., CORESET 3) of the plurality of CORESETs may be identified/indicated by a third CORESET index of the plurality of CORESET indexes.

The one or more configuration parameters 1712 may indicate one or more CORESET pool indicators/indexes (e.g., provided by a higher layer parameter CoresetPoolIndex) for the plurality of CORESETs. A CORESET (e.g., each CORESET) of the plurality of CORESETs may comprise/be associated with (or be configured/indicated by the one or more configuration parameters 1712) a respective CORESET pool indicator/index of the one or more CORESET pool indicators/indexes (e.g., 0, 1, or any other value). The one or more configuration parameters 1712 may indicate, for each CORESET of the plurality of CORESETs, a respective CORESET pool indicator/index of the one or more CORESET pool indicators/indexes. The one or more configuration parameters 1712 may indicate a first CORESET pool index (e.g., CoresetPool-ID=0) for the first CORESET (CORESET 1), a second CORESET pool index (e.g., CoresetPool-ID=1) for the second CORESET (CORESET 2), and the first CORESET pool index (e.g., CoresetPool-ID=0) for the third CORESET (CORESET 3). The one or more CORESET pool indexes may comprise the first CORESET pool index and the second CORESET pool index.

The one or more configuration parameters 1712 may indicate the first CORESET pool index, of the one or more CORESET pool indexes, for the first CORESET (e.g., CORESET 1) of the plurality of CORESETs. The one or more configuration parameters 1712 may indicate the first CORESET pool index, of the one or more CORESET pool indexes, for the third CORESET (e.g., CORESET 3) of the plurality of CORESETs. A first CORESET pool may comprise one or more CORESETs (e.g., CORESET 1 and CORESET 3) with a CORESET pool index that is equal to the first CORESET pool index (e.g., CoresetPool-ID=0). The one or more CORESETs may comprise the first CORESET and the third CORESET. The one or more configuration parameters 1712 may indicate the first CORESET pool index for each CORESET of the one or more CORESETs in the first CORESET pool.

The one or more configuration parameters 1712 may indicate the second CORESET pool index, of the one or more CORESET pool indexes, for a second CORESET (e.g., CORESET 2) of the plurality of CORESETs. A second CORESET pool may comprise one or more CORESETs (CORESET 2) with a CORESET pool index that is equal to the second CORESET pool index (e.g., CoresetPool-ID=1). The one or more CORESETs may comprise the second CORESET. The one or more configuration parameters 1712 may indicate the second CORESET pool index for each CORESET of the one or more CORESETs in the second CORESET pool.

The one or more configuration parameters 1712 may not indicate a CORESET pool indicator/index for a CORESET of the plurality of CORESETs. The wireless device 1708 may determine a default value for the CORESET pool index for the CORESET, for example, based on the one or more configuration parameters not indicating the CORESET pool index for the CORESET. The default value may be equal to zero (e.g., CoresetPool-ID=0) or any other value indicating a default CORESET pool index. The default value may be equal to the first CORESET pool index (e.g., zero, or any other value). The first CORESET pool may comprise the CORESET based on the default value for the CORESET pool index of the CORESET being equal to the first CORESET pool index. The default value may be equal to one (e.g., CoresetPool-ID=1) or any other value indicating a default CORESET pool index. The second CORESET pool may comprise the CORESET based on the default value for the CORESET pool index of the CORESET being equal to the second CORESET pool index.

A first CORESET pool index of a first CORESET (e.g., CORESET 1) and a second CORESET pool index of a second CORESET (e.g., CORESET 3) may be the same. The plurality of CORESETs may comprise the first CORESET and the second CORESET. The one or more CORESET pool indexes may comprise the first CORESET pool index and the second CORESET pool index. The wireless device 1708 may group the first CORESET and the second CORESET in the same CORESET pool (e.g., corresponding to CoresetPool-ID=0), for example, if the first CORESET pool index of the first CORESET and the second CORESET pool index of the second CORESET are the same. The first CORESET pool comprising the first CORESET and the second CORESET pool comprising the second CORESET may be the same, for example, if the first CORESET pool index of the first CORESET and the second CORESET pool index of the second CORESET are the same.

A first CORESET pool index of a first CORESET (e.g., CORESET 1) and a second CORESET pool index of a second CORESET (e.g., CORESET 2) may be different. The plurality of CORESETs may comprise the first CORESET and the second CORESET. The one or more CORESET pool indexes may comprise the first CORESET pool index and the second CORESET pool index. The wireless device 1708 may group the first CORESET and the second CORESET in different CORESET pools, for example, based on the first CORESET pool index of the first CORESET and the second CORESET pool index of the second CORESET being different. The wireless device 1708 may group the first CORESET in a first CORESET pool (e.g., corresponding to CoresetPool-ID=0). The wireless device 1708 may group the second CORESET in a second CORESET pool (e.g., corresponding to CoresetPool-ID=1) that is different from the first CORESET pool, for example, if the first CORESET pool index and the second CORESET pool index are different. The first CORESET pool and the second CORESET pool may be different, for example, if the first CORESET pool index of the first CORESET and the second CORESET pool index of the second CORESET are different.

A plurality of TRPs (and/or a plurality of any transmission/reception device) may be configured to communicate with (e.g., send/transmit data to or receive data from) the wireless device 1708. The plurality of TRPs may comprise a first TRP and a second TRP. Any quantity of TRPs (or any other transmission/reception device) may be used. The first TRP may send/transmit a downlink signal/channel (e.g., PDSCH, PDCCH, DCI, SS/PBCH block, CSI-RS) via a first CORESET associated with a first CORESET pool index that is associated with (e.g., is indicated by, corresponds to, is equal to) a first value (e.g., zero or any other value indicating the first CORESET pool index). A first CORESET pool corresponding to the first CORESET pool index may comprise the first CORESET. The first TRP may not send/transmit a downlink signal/channel (e.g., PDSCH, PDCCH, DCI, SS/PBCH block, CSI-RS) via a second CORESET associated with a second CORESET pool index (e.g., one or any other value indicating the second CORESET pool index) that is different from the first value (e.g., zero or any other value indicating the first CORESET pool index). A second CORESET pool, different from the first CORESET pool, may correspond to the second CORESET pool index and may comprise the second CORESET. The second TRP may send/transmit a downlink signal/channel (e.g., PDSCH, PDCCH, DCI, SS/PBCH block, CSI-RS) via a second CORESET associated with a second CORESET pool index that is associated with (e.g., is indicated by, corresponds to, is equal to) a second value (e.g., one or any other value indicating the second CORESET pool index). A second CORESET pool corresponding to the second CORESET pool index may comprise the second CORESET. The second TRP may not send/transmit a downlink signal/channel (e.g., PDSCH, PDCCH, DCI, SS/PBCH block, CSI-RS) via a first CORESET associated with a first CORESET pool index (e.g., zero or any other value indicating the first CORESET pool index) that is different from the second value (e.g., one or any other value indicating the second CORESET pool index). A first CORESET pool, different from the second CORESET pool, may correspond to the first CORESET pool index and may comprise the first CORESET. The plurality of CORESETs may comprise the first CORESET and the second CORESET. The one or more CORESET pool indexes may comprise the first CORESET pool index and the second CORESET pool index.

A plurality of TRPs may be configured to communicate with (e.g., send/transmit data and/or control information to or receive data and/or control information from) the wireless device 1708. The plurality of TRPs may comprise a first TRP and a second TRP. The first TRP may send/transmit a downlink signal/channel (e.g., PDSCH, PDCCH, DCI, SS/PBCH block, CSI-RS) via a first CORESET of a first CORESET pool. The first TRP may not send/transmit a downlink signal/channel (e.g., PDSCH, PDCCH, DCI, SS/PBCH block, CSI-RS) via a second CORESET in a second CORESET pool that is different from the first CORESET pool. The second TRP may send/transmit a downlink signal/channel (e.g., PDSCH, PDCCH, DCI, SS/PBCH block, CSI-RS) via a second CORESET in a second CORESET pool. The second TRP may not send/transmit a downlink signal/channel (e.g., PDSCH, PDCCH, DCI, SS/PBCH block, CSI-RS) via a first CORESET of a first CORESET pool that is different from the second CORESET pool. The plurality of CORESETs may comprise the first CORESET and the second CORESET.

The one or more configuration parameters 1712 may indicate at least two CORESET pool indexes (e.g., 0 and 1, or any other values) (e.g., for a higher layer parameter, CORESETPoolIndex). The one or more configuration parameters 1712 may comprise the higher layer parameter (e.g., CORESETPoolIndex) with (or set to) the at least two CORESET pool indexes. The at least two CORESET pool indexes may comprise a first CORESET pool index (e.g., 0, or any other first value) for one or more first CORESETs of the plurality of CORESETs. The at least two CORESET pool indexes may comprise a second CORESET pool index (e.g., 1, or any other second value), different from the first CORESET pool index, for one or more second CORESETs of the plurality of CORESETs.

The one or more first CORESETs may comprise one or more third CORESETs, of the plurality of CORESETs, without a value for the higher layer parameter (e.g., CORESETPoolIndex). For example, the one or more third CORESETs may not be configured with a CORESET pool index. The one or more configuration parameters 1712 may not comprise the higher layer parameter (e.g., CORESETPoolIndex) for the one or more third CORESETs.

The wireless device 1708 may monitor downlink control channels for DCI. The wireless device 1708 may monitor downlink control channels (e.g., for DCI) in/via the plurality of CORESETs, for example, based on one or more TCI states. The wireless device 1708 may monitor downlink control channels, for DCI, in each CORESET of the plurality of CORESETs based on a respective TCI state of the one or more TCI states. The wireless device 1708 may monitor downlink control channels for DCI, in/via the first CORESET (e.g., CORESET 1), based on a first TCI state (e.g., TCI state 1) of the one or more TCI states. The wireless device 1708 may monitor downlink control channels for DCI, in/via the second CORESET (e.g., CORESET 2) based on a second TCI state (e.g., TCI state 2) of the one or more TCI states. The wireless device 1708 may monitor downlink control channels for DCI, in/via the third CORESET (e.g., CORESET 3) based on a third TCI state (e.g., TCI state 3) of the one or more TCI states.

Monitoring downlink control channels for DCI, in/via a CORESET based on a TCI state may comprise that one or more DM-RS antenna ports of the downlink control channels (e.g., PDCCH) in the CORESET are quasi co-located with a reference signal indicated by the TCI state. The one or more TCI states may comprise the TCI state. The plurality of CORESETs may comprise the CORESET.

Monitoring downlink control channels for DCI, in/via a CORESET based on a TCI state may comprise that one or more DM-RS antenna ports of the downlink control channels (e.g., PDCCH) in the CORESET are quasi co-located with a reference signal indicated by the TCI state with respect to a QCL type (e.g., QCL TypeD, QCL TypeA, QCL TypeB, etc.) indicated by the TCI state. The one or more TCI states may comprise the TCI state. The plurality of CORESETs may comprise the CORESET.

A TCI state may comprise/indicate a QCL assumption (e.g., property, structure) of a CORESET. The QCL assumption of the CORESET may indicate at least one of: channel characteristics, Doppler shift, Doppler spread, average delay, delay spread, and/or spatial receive filter for the CORESET. The one or more TCI states may comprise the TCI state. The plurality of CORESETs may comprise the CORESET.

The one or more configuration parameters 1712 may indicate the one or more TCI states for the plurality of CORESETs. The one or more configuration parameters 1712 may indicate, for each CORESET of the plurality of CORESETs, a respective TCI state of the one or more TCI states. The one or more configuration parameters 1712 may indicate the first TCI state (e.g., TCI state 1) for the first CORESET (e.g., CORESET 1). The one or more configuration parameters 1712 may indicate the second TCI state (e.g., TCI state 2) for the second CORESET (e.g., CORESET 2). The one or more configuration parameters 1712 may indicate the third TCI state (e.g., TCI state 3) for the third CORESET (CORESET 3).

The wireless device 1708 may receive one or more activation commands (e.g., TCI state indication for wireless device-specific PDCCH MAC CE) activating (e.g., selecting, indicating) the one or more TCI states for the plurality of CORESETs. Each activation command of the one or more activation commands may activate (e.g., select, indicate) a respective TCI state of the one or more TCI states for a CORESET of the plurality of CORESETs. A first activation command of the one or more activation commands may activate (e.g., select, indicate) the first TCI state (e.g., TCI state 1) for the first CORESET (e.g., CORESET 1). A second activation command of the one or more activation commands may activate (e.g., select, indicate) the second TCI state (e.g., TCI state 2) for the second CORESET (e.g., CORESET 2). A third activation command of the one or more activation commands may activate (e.g., select, indicate) the third TCI state (e.g., TCI state 3) for the third CORESET (e.g., CORESET 3). Any quantity of activation commands may activate (e.g., select, indicate) any quantity of TCI states.

The one or more configuration parameters 1712 may indicate one or more TCI state indicators/indexes (e.g., provided by a higher layer parameter TCI-StateId) for the one or more TCI states. A TCI state (e.g., each TCI state) of the one or more TCI states may be identified/indicated by a respective TCI state indicator/index of the one or more TCI state indicators/indexes. The first TCI state (e.g., TCI state 1) may be identified/indicated by a first TCI state index of the one or more TCI state indexes. The second TCI state (e.g., TCI state 2) may be identified/indicated by a second TCI state index of the one or more TCI state indexes. The third TCI state (e.g., TCI state 2) may be identified/indicated by a third TCI state index of the one or more TCI state indexes.

The one or more configuration parameters 1712 may indicate a plurality of TCI states (e.g., provided by a higher layer parameter tci-StatesPDCCH-ToAddList). The one or more configuration parameters 1712, for example, may indicate the plurality of TCI states for the plurality of CORESETs. The plurality of TCI states, for example, may comprise the one or more TCI states.

The one or more configuration parameters 1712 may comprise an enabling parameter (e.g., enableDefaultBeamPlForPUSCH0_0, enableDefaultBeamPlForPUCCH, enableDefaultBeamPlForSRS). The enabling parameter may be set to enabled or disabled. The one or more configuration parameters 1712 may indicate that the enabling parameter is enabled. A value of the enabling parameter may indicate that the enabling parameter is enabled. The enabling parameter may be for the cell. The enabling parameter may enable determination/selection of a default spatial relation for an uplink channel/signal (e.g., PUCCH, SRS, PUSCH, etc.). The enabling parameter may enable determination/selection of a default path loss reference signal for the uplink channel/signal (e.g., PUCCH, SRS, PUSCH, etc.). The wireless device 1708 may determine/select a default spatial relation and/or a default path loss reference signal for transmission of the uplink channel/signal based on the one or more configuration parameters comprising the enabling parameter. The wireless device 1708 determining the default spatial relation and/or the default path loss reference signal may comprise the wireless device 1708 selecting a CORESET of the plurality of CORESETs. The wireless device 1708 may determine/select the default spatial relation and/or the default path loss reference signal based on receiving DCI (e.g., corresponding to DCI format 0_0) scheduling transmission of an uplink signal (e.g., transport block, a PUSCH transmission). The DCI may or may not indicate a spatial relation. The wireless device 1708 may determine/select the default spatial relation and/or the default path loss reference signal based on determining that an uplink resource (e.g., a PUCCH resource) for transmission of the uplink signal is not provided/associated with a spatial relation. The wireless device 1708 may determine/select the default spatial relation and/or the default path loss reference signal based on determining that an uplink resource for transmission of the uplink channel/signal is not provided/associated with at least one path loss reference reference signal (RS). The one or more uplink resources, for example, may comprise the uplink resource. The uplink resource not being provided with the spatial relation may comprise that the one or more configuration parameters 1712 do not indicate the spatial relation for the uplink resource. The uplink resource not being provided with the spatial relation may comprise that the wireless device 1708 does not receive an activation command (e.g., a MAC CE) indicating the spatial relation for the uplink resource. The uplink resource not being provided with the spatial relation may comprise that the wireless device 1708 receives DCI (e.g., corresponding to DCI format 0_0) scheduling transmission of an uplink signal (e.g., a PUSCH transmission, a transport block) via the uplink resource. The DCI may not comprise a field indicating the spatial relation. The field may be a sounding reference signal resource indicator (SRI) field. The uplink resource not being provided with the at least one path loss reference RS may comprise that the one or more configuration parameters 1712 do not indicate the at least one path loss reference RS for the uplink resource. The uplink resource not being provided with the at least one path loss reference RS may comprise that the wireless device 1708 does not receive an activation command (e.g., a MAC CE) indicating the at least one path loss reference RS for the uplink resource.

The wireless device 1708 may receive (e.g., at or after time T1) DCI 1716 (e.g., corresponding to DCI format 0_0). The DCI 1716 may schedule transmission of a transport block (e.g., a PUSCH transmission). The DCI 1716 may schedule transmission of the transport block (e.g., PUSCH transmission 1720). The DCI 1716 may schedule transmission of the transport block via the (active) uplink BWP. The DCI 1716 may not indicate a spatial relation for the transmission of the transport block. The DCI 1716 may not comprise a field (e.g., an SRI field) indicating the spatial relation.

The wireless device 1708 may receive the DCI 1716 via a CORESET of the plurality of CORESETs. The one or more configuration parameters 1712 may indicate, for the CORESET, a first CORESET pool indicator/index (e.g., CoresetPool-ID=n) of the one or more CORESET pool indicators/indexes.

The wireless device 1708 may determine (e.g., compute or calculate) a transmission power for transmission of the transport block. The determining the transmission power may comprise determining a downlink path loss estimate for a transmitted signal. The wireless device 1708 may use the downlink path loss estimate to determine the transmission power for transmission of the transport block. The transmission power may be based on (e.g., comprise) the downlink path loss estimate.

The wireless device 1708 may (e.g., at or after time T2) send/transmit the transport block to the base station 1704. The wireless device 1708 may send the transport block based on (e.g., using) the determined transmission power. The wireless device 1708 may send/transmit the transport block using the transmission power based on the determining the transmission power. The wireless device 1708 may send/transmit, via the (active) uplink BWP of the cell, the transport block based on the determined transmission power.

The wireless device 1708 may determine the transmission power and/or a spatial domain transmission filter (e.g., a transmission beam) based on a selected CORESET of the plurality of CORESETs. The selected CORESET of the plurality of CORESETs may be indicated/identified by a selected CORESET indicator/index of the plurality of CORESET indicators/indexes. The selected CORESET index may be lowest (or highest) among the plurality of CORESET indexes. The selected CORESET may be identified/indicated by a selected CORESET index that is lowest (or highest) among the plurality of CORESET indexes of the plurality of CORESETs.

The wireless device 1708 may determine the transmission power based on a reference signal (e.g., pathloss reference RS) indicated by a TCI state of the selected CORESET among the plurality of CORESETs. The wireless device 1708 may determine the transmission power based on the reference signal indicated by the TCI state of the selected CORESET, for example, based on the selected CORESET index of the selected CORESET being lowest (or highest) among the plurality of CORESET indexes of the plurality of CORESETs.

The wireless device 1708 may determine the transmission power based on the reference signal of the TCI state of the selected CORESET, for example, if the one or more configuration parameters 1712 comprise the enabling parameter. The enabling parameter may be set to enabled. The one or more configuration parameters 1712 may indicate that the enabling parameter is set to enabled.

The wireless device 1708 may determine the transmission power based on the reference signal of the TCI state of the selected CORESET, for example, if the DCI 1716 does not indicate the spatial relation for transmission of the transport block. The wireless device 1708 may determine the transmission power based on the reference signal of the TCI state of the selected CORESET, for example, if the DCI 1716 corresponds to the DCI format 0_0.

The determining the transmission power based on the reference signal may comprise determining a downlink path loss estimate for the transmission power based on the reference signal. The downlink path loss estimate may be based on layer 1-RSRP (L1-RSRP) or a higher filtered RSRP of the reference signal. The wireless device 1708 may use the downlink path loss estimate to determine the transmission power for transmission of the transport block. The transmission power may comprise the downlink path loss estimate. The wireless device 1708 may determine a higher filtered RSRP (e.g., layer 3-RSRP (L3-RSRP)) value of the reference signal for determining the downlink path loss estimate (or a path loss measurement). The wireless device 1708 may determine the higher filtered RSRP for transmission of the transport block.

The wireless device 1708 may determine a spatial domain transmission filter (e.g., a transmission beam) for transmission of the transport block. The wireless device 1708 may (e.g., at or after time T2) send/transmit the transport block using the spatial domain transmission filter (e.g., via the transmission beam). The wireless device 1708 may send/transmit the transport block using the spatial domain transmission filter based on the determining the spatial domain transmission filter. The wireless device 1708 may send/transmit, via the (active) uplink BWP of the cell, the transport block using the spatial domain transmission filter.

The wireless device 1708 may determine the spatial domain transmission filter, for example, based on a reference signal indicated by a TCI state of a selected CORESET among the plurality of CORESETs. The wireless device 1708 may determine the spatial domain transmission filter based on the reference signal indicated by the TCI state of the selected CORESET, for example, based on the selected CORESET indicator/index of the selected CORESET being lowest (or highest) among the plurality of CORESET indicators/indexes of the plurality of CORESETs.

The wireless device 1708 may determine the spatial domain transmission filter based on the reference signal of the TCI state of the selected CORESET, for example, if the one or more configuration parameters 1712 comprise the enabling parameter. The enabling parameter may be set to enabled. The one or more configuration parameters 1712 may indicate that the enabling parameter is set to enabled.

The wireless device 1708 may determine the spatial domain transmission filter based on the reference signal of the TCI state of the selected CORESET, for example, if the DCI 1716 does not indicate the spatial relation for transmission of the transport block. The wireless device 1708 may determine the spatial domain transmission filter based on the reference signal of the TCI state of the selected CORESET, for example, if the DCI 1716 corresponds to the DCI format 0_0.

The selected CORESET of the plurality of CORESETs may be indicated by/associated with a selected CORESET pool indicator/index of the one or more CORESET pool indicators/indexes. The selected CORESET pool index may be the same as (or equal to, or substantially the same as) a CORESET pool index (e.g., CoresetPool-ID=n) of the CORESET via which the wireless device 1708 receives the DCI 1716. The selected CORESET pool index and the CORESET pool index may be equal (or substantially equal). The selected CORESET may be the first CORESET (e.g., CORESET 1) with the first CORESET pool index (e.g., CoresetPool-ID=0), for example, if the wireless device 1708 receives the DCI 1716 via a CORESET with the first CORESET pool index (e.g., CoresetPool-ID=0). The selected CORESET may be the third CORESET (e.g., CORESET 3) with the first CORESET pool index (e.g., CoresetPool-ID=0), for example, if the wireless device 1708 receives the DCI 1716 via a CORESET with the first CORESET pool index (e.g., CoresetPool-ID=0). The selected CORESET may be the second CORESET (e.g., CORESET 2) with the second CORESET pool index (e.g., CoresetPool-ID=1), for example, if the wireless device 1708 receives the DCI 1716 via a CORESET with the second CORESET pool index (e.g., CoresetPool-ID=1).

The wireless device 1708 may determine the transmission power based on the reference signal indicated by the TCI state of the selected CORESET, for example, based on the selected CORESET pool index of the selected CORESET being the same as (or equal to, or substantially equal to) a CORESET pool index (e.g., CoresetPool-ID=n) of the CORESET via which the wireless device 1708 receives the DCI 1716. The wireless device 1708 may determine the spatial domain transmission filter based on the reference signal indicated by the TCI state of the selected CORESET, for example, based on the selected CORESET pool index of the selected CORESET being the same as (or equal to, or substantially equal to) a CORESET pool index (e.g., CoresetPool-ID=n) of the CORESET via which the wireless device 1708 receives the DCI 1716.

A CORESET pool index of the CORESET via which the wireless device 1708 receives the DCI 1716 may be equal to zero (or any other value). The wireless device 1708 may select/determine the selected CORESET among the first CORESET (CORESET 1) and the third CORESET (CORESET 3) based on the first CORESET and the third CORESET being indicated with the CORESET pool index that is equal to zero (e.g., equal to the CORESET pool index of the CORESET via which the wireless device 1708 receives the DCI 1716). The wireless device 1708 may select/determine the first CORESET (CORESET 1) among the first CORESET and the third CORESET, for example, based the first CORESET index of the first CORESET being lower than the third CORESET index of the third CORESET. The wireless device 1708 may select/determine the third CORESET (CORESET 3) among the first CORESET and the third CORESET, for example, based the third CORESET index of the third CORESET being lower than the first CORESET index of the first CORESET.

A CORESET pool index of the CORESET via which the wireless device 1708 receives the DCI 1716 may be equal to one (or any other value). The wireless device may select/determine the second CORESET (CORESET 2) as the selected CORESET based on the second CORESET being indicated with the CORESET pool index that is equal to one (e.g., or equal to the CORESET pool index of the CORESET via which the wireless device 1708 receives the DCI 1716).

The wireless device 1708 may determine the transmission power based on the reference signal indicated by the TCI state of the selected CORESET, for example, based on the selecting/determining the selected CORESET. The wireless device 1708 may determine the spatial domain transmission filter based on the reference signal indicated by the TCI state of the selected CORESET, for example, based on the selecting/determining the selected CORESET.

The one or more configuration parameters 1712 may indicate one or more uplink resources. The one or more configuration parameters 1712 may indicate the one or more uplink resources for the cell. The one or more uplink resources may be on (or indicated for/associated with) the cell. The cell may comprise the one or more uplink resources. The one or more configuration parameters 1712 may indicate the one or more uplink resources for the (active) uplink BWP of the cell. The one or more uplink resources may be on (or indicated for/associated with) the (active) uplink BWP of the cell. The (active) uplink BWP of the cell may comprise the one or more uplink resources.

The one or more uplink resources may comprise one or more PUCCH resources. The one or more uplink resources may comprise one or more SRS resources. The one or more configuration parameters 1712 may indicate one or more SRS resource sets comprising an SRS resource set. The SRS resource set may comprise the one or more SRS resources. The one or more uplink resources may or may not be provided with spatial relation(s) (e.g., PUCCH-SpatialRelationInfo, spatialRelationInfo) (e.g., via the one or more configuration parameters 1712).

The one or more configuration parameters 1712 may or may not indicate spatial relation(s) for the one or more uplink resources. The one or more configuration parameters 1712 may or may not indicate spatial relation(s) for the (active) uplink BWP. The one or more configuration parameters 1712 may or may not indicate a respective spatial relation for each uplink resource of the one or more uplink resources. The one or more configuration parameters 1712 may or may not indicate a spatial relation for each uplink resource of the one or more uplink resources. The one or more uplink resources not being provided with the spatial relation(s) may comprise that the one or more configuration parameters 1712 do not indicate the spatial relation(s) for the one or more uplink resources. The one or more uplink resources not being provided with the spatial relation(s) may comprise that the one or more configuration parameters 1712 do not indicate a respective spatial relation for each uplink resource of the one or more uplink resources.

The wireless device 1708 may or may not receive at least one activation command (e.g., aperiodic/semi-persistent SRS activation/deactivation MAC CE, PUCCH spatial relation activation/deactivation MAC CE) indicating spatial relation(s) for the one or more uplink resources. The wireless device 1708 may or may not receive at least one activation command indicating spatial relation(s) for each uplink resource of the one or more uplink resources. The wireless device 1708 may or may not receive at least one activation command indicating a respective spatial relation for each uplink resource of the one or more uplink resources. The wireless device may or may not receive a respective activation command indicating a spatial relation for each uplink resource of the one or more uplink resources. The wireless device may or may not receive an activation command indicating a spatial relation for at least one uplink resource of the one or more uplink resources. The one or more uplink resources not being provided with the spatial relation(s) may comprise not receiving the at least one activation command indicating the spatial relation(s) for the one or more uplink resources. The one or more uplink resources not being provided with the spatial relation(s) may comprise not receiving the at least one activation command indicating a respective spatial relation for each uplink resource of the one or more uplink resources.

The wireless device 1708 may determine the transmission power based on the reference signal of the TCI state of the selected CORESET, for example, based on (e.g., in response to the one or more uplink resources not being provided with the spatial relation(s) (e.g., PUCCH-SpatialRelationInfo, spatialRelationInfo). The wireless device 1708 may determine the transmission power based on the reference signal of the TCI state of the selected CORESET, for example, based on (e.g., in response to) the one or more configuration parameters 1712 not indicating, for the one or more uplink resources, the spatial relation (e.g., PUCCH-SpatialRelationInfo, spatialRelationInfo).

The wireless device 1708 may determine the transmission power based on the reference signal of the TCI state of the selected CORESET, for example, based on (e.g., in response to) not receiving the at least one activation command (e.g., aperiodic/semi-persistent SRS activation/deactivation MAC CE, PUCCH spatial relation activation/deactivation MAC CE) indicating the spatial relation(s) for the one or more uplink resources. The wireless device 1708 may determine the transmission power based on the reference signal of the TCI state of the selected CORESET, for example, based on (e.g., in response to) not receiving the at least one activation command indicating a respective spatial relation for each uplink resource of the one or more uplink resources.

The wireless device 1708 may determine a spatial filter (e.g., a spatial domain transmission filter) based on the reference signal of the TCI state of the selected CORESET, for example, based on (e.g., in response to) the one or more uplink resources not being provided with the spatial relation (e.g., PUCCH-SpatialRelationInfo, spatialRelationInfo). The wireless device 1708 may determine the spatial filter based on the reference signal of the TCI state of the selected CORESET, for example, based on (e.g., in response to) the one or more configuration parameters 1712 not indicating, for the one or more uplink resources, the spatial relation(s) (e.g., PUCCH-SpatialRelationInfo, spatialRelationInfo).

The wireless device 1708 may determine the spatial filter based on the reference signal of the TCI state of the selected CORESET, for example, based on (e.g., in response to) not receiving the at least one activation command (e.g., aperiodic/semi-persistent SRS activation/deactivation MAC CE, PUCCH spatial relation activation/deactivation MAC CE) indicating the spatial relation for the one or more uplink resources. The wireless device 1708 may determine the spatial filter based on the reference signal of the TCI state of the selected CORESET, for example, based on (e.g., in response to) not receiving the at least one activation command indicating a respective spatial relation for each uplink resource of the one or more uplink resources.

The one or more configuration parameters 1712 may or may not indicate at least one uplink resource. The at least one uplink resource, for example, may comprise at least one PUCCH resource. The at least one uplink resource, for example, may comprise at least one PUSCH resource. The at least one uplink resource, for example, may comprise at least one SRS resource. The one or more configuration parameters 1712 may or may not indicate the at least one uplink resource for the cell. The cell may or may not comprise the at least one uplink resource (e.g., a PUCCH resource). The one or more configuration parameters 1712 may or may not indicate the at least one uplink resource for the (active) uplink BWP of the cell. The (active) uplink BWP of the cell may not comprise the at least one uplink resource (e.g., PUCCH resource).

The wireless device 1708 may determine the transmission power based on the reference signal of the TCI state of the selected CORESET, for example, based on (e.g., in response to) the one or more configuration parameters 1712 not indicating the at least one uplink resource (e.g., for the (active) uplink BWP). The at least one uplink resource may be at least one PUCCH resource. The wireless device 1708 may determine the spatial domain transmission filter based on the reference signal of the TCI state of the selected CORESET, for example, based on (e.g., in response to) the one or more configuration parameters not indicating the at least one uplink resource (e.g., for the (active) uplink BWP). The at least one uplink resource may be at least one PUCCH resource.

The reference signal may be periodic. The reference signal may be periodic with a periodicity (e.g., 2 slots, 5 slots, 10 slots, 2 symbols, 5 symbols, or any other quantity of symbols or slots). The wireless device may measure RSRP (e.g., L1-RSRP, L3-RSRP, or RSRP corresponding to any other layer) of the reference signal periodically, for example, based on the reference signal being periodic.

The TCI state may indicate the reference signal (e.g., CSI-RS, SS/PBCH block, SRS, DM-RS). The TCI state may comprise a reference signal indicator/index (e.g., provided by a higher layer parameter referenceSignal, ssb-index, csi-RS-Index, NZP-CSI-RS-ResourceId) indicating/identifying the reference signal. The one or more configuration parameters 1712 may indicate the reference signal indicator/index for the reference signal. The TCI state may indicate a QCL type for the reference signal. The QCL type may be QCL-TypeD (or any other QCL type).

The reference signal may be a downlink reference signal. The downlink reference signal may comprise a SS/PBCH block. The downlink reference signal may comprise a CSI-RS (e.g., a periodic CSI-RS, a semi-persistent CSI-RS, an aperiodic CSI-RS). The downlink reference signal may comprise a DM-RS (e.g., of PDCCH, PDSCH, etc.). The wireless device 1708 may use a spatial filter (e.g., a spatial domain receiving filter) to receive the downlink reference signal. The wireless device 1708 may send/transmit the transport block with (e.g., using) a spatial domain transmission filter that is same as a spatial domain receiving filter, for example, based on the reference signal being the downlink reference signal. As described herein, a spatial filter may refer to one or both of a spatial domain transmission filter and/or a spatial domain receiving filter (and/or a spatial domain transmission filter for reception, spatial Tx filter, spatial Rx filter, etc.). The wireless device may send/transmit the transport block with (e.g., using) the spatial domain receiving filter, for example, based on the reference signal being the downlink reference signal. The wireless device may transmit the transport block based on the spatial domain receiving filter, for example, based on the reference signal being the downlink reference signal.

The reference signal may be an uplink reference signal (e.g., a periodic SRS, a semi-persistent SRS, an aperiodic SRS, a DM-RS). The wireless device may use a spatial domain transmission filter to send/transmit the uplink reference signal. The wireless device may send/transmit the transport block with (e.g., using) a spatial domain transmission filter that is same as the spatial domain transmission filter used to send/transmit the uplink reference signal. The wireless device may send/transmit the transport block based on the spatial domain transmission filter used to transmit the uplink reference signal, for example, based on the reference signal being the uplink reference signal.

Figure 18:
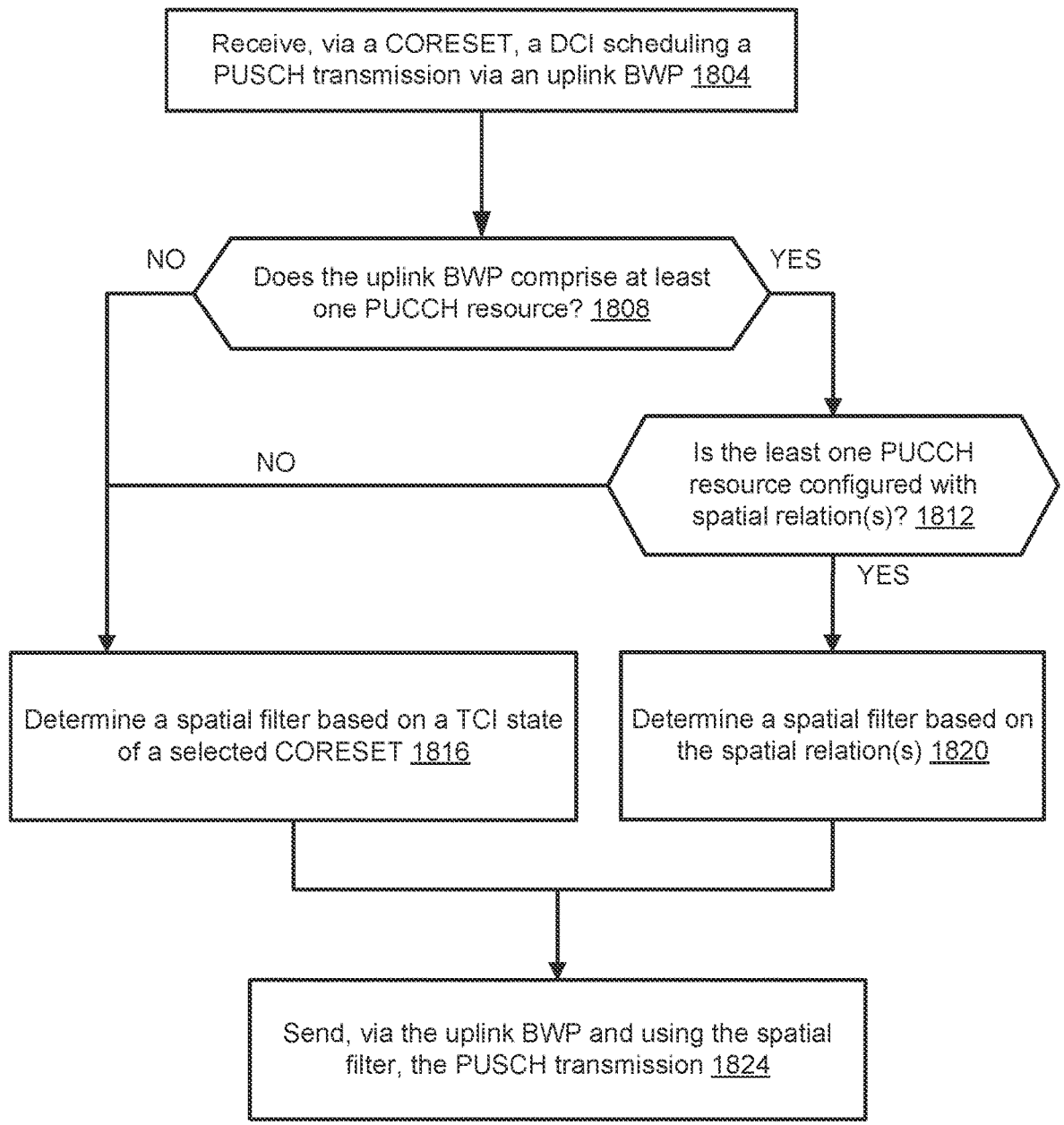
FIG. 18 shows an example method of beam management.

FIG. 18 shows an example method of beam management. A wireless device (or any other device) may perform the example method 1800. The wireless device may receive one or more messages. The one or more messages may comprise one or more configuration parameters for a cell. The one or more configuration parameters may indicate a plurality of CORESETs.

At step 1804, the wireless device may receive, via a CORESET of the plurality of CORESETs, DCI. The DCI may schedule transmission of a transport block (e.g., a PUSCH transmission). The DCI may schedule the transmission of the transport block via an uplink BWP of the cell. The uplink BWP may be an active uplink BWP of the cell. The one or more configuration parameters may indicate a first CORESET pool indicator/index for the CORESET. The DCI may correspond to a DCI format 0_0 (e.g., or any other DCI format that does not indicate a spatial relation/transmission beam for the transmission of the transport block).

The one or more configuration parameters may or may not indicate at least one uplink resource (e.g., PUCCH resource) for the uplink BWP. At step 1808, the wireless device may determine whether the uplink BWP is configured with at least one uplink resource. At step 1816, the wireless device may determine, for transmission of the transport block, a spatial filter (e.g., a spatial domain transmission filter) based on a reference signal indicated by a TCI state of a selected CORESET among the plurality of CORESETs, for example, if the uplink BWP is not configured with at least one uplink resource (e.g., the one or more configuration parameters do not indicate the at least one uplink resource). The wireless device may determine, for transmission of the transport block, a transmission power based on a reference signal indicated by a TCI state of a selected CORESET among the plurality of CORESETs, for example, if the uplink BWP is not configured with at least one uplink resource (e.g., the one or more configuration parameters do not indicate the at least one uplink resource).

The one or more configuration parameters may comprise an enabling parameter (e.g., enableDefaultBeamPlForPUSCH0_0). The enabling parameter may be set to enabled. The wireless device may determine the spatial domain transmission filter based on the reference signal indicated by the TCI state of the selected CORESET among the plurality of CORESETs, for example, based on the one or more configuration parameters comprising the enabling parameter (e.g., enableDefaultBeamPlForPUSCH0_0) that is set to enabled. The wireless device may determine the transmission power based on the reference signal indicated by the TCI state of the selected CORESET among the plurality of CORESETs, for example, based on the one or more configuration parameters comprising the enabling parameter (e.g., enableDefaultBeamPlForPUSCH0_0) that is set to enabled.

The one or more configuration parameters may indicate a lowest CORESET indicator/index among a plurality of CORESET indicators/indexes of the plurality of CORESETs. The one or more configuration parameters may indicate the plurality of CORESET indicators/indexes for the plurality of CORESETs. A selected CORESET indicator/index of the selected CORESET may be the lowest among the plurality of CORESET indicators/indexes of the plurality of CORESETs.

The wireless device may determine the spatial domain transmission filter based on the reference signal indicated by the TCI state of the selected CORESET among the plurality of CORESETs, for example, based on the selected CORESET index of the selected CORESET being the lowest among the plurality of CORESET indexes of the plurality of CORESETs. The wireless device may determine the transmission power based on the reference signal indicated by the TCI state of the selected CORESET among the plurality of CORESETs, for example, based on the selected CORESET index of the selected CORESET being lowest among the plurality of CORESET indexes of the plurality of CORESETs.

The one or more configuration parameters may indicate, for the selected CORESET, a CORESET pool indicator/index that is the same as (or equal to) the first CORESET pool indicator/index of the CORESET via which the wireless device receives the DCI. The wireless device may determine the spatial domain transmission filter based on the reference signal indicated by the TCI state of the selected CORESET among the plurality of CORESETs, for example, based on the selected CORESET having a CORESET pool indicator/index that is the same as (or equal to) the first CORESET pool indicator/index.

The wireless device may determine the spatial domain transmission filter based on the reference signal indicated by the TCI state of the selected CORESET, for example, based on the selected CORESET having the lowest CORESET indicator/index among a plurality of CORESET indicators/indexes of a plurality of CORESETs with the first CORESET pool indicator/index.

At step 1812, the wireless device may determine whether the at least one uplink resource is configured with spatial relation(s) (e.g., transmission beams), for example, if the uplink BWP is configured with at least one uplink resource (e.g., the one or more configuration parameters indicate the at least one uplink resource). At step 1820, the wireless device may determine a spatial domain transmission filter based on the spatial relation(s), for example, if the at least one uplink resource is configured with spatial relation(s). Further details associated with steps 1812 and 1820 are described with reference to FIGS. 20-25. The wireless device may determine a spatial domain transmission filter as described with reference to step 1816, for example, if the at least one uplink resource is not configured with spatial relation(s). At step 1824, the wireless device may send/transmit, via the uplink BWP, the transport block using the spatial domain transmission filter.

The wireless device may determine the transmission power based on the reference signal indicated by the TCI state of the selected CORESET among the plurality of CORESETs, for example, based on the selected CORESET having a CORESET pool indicator/index that is the same as (or equal to) the first CORESET pool indicator/index. At step 1824, the wireless device may send/transmit, via the uplink BWP, the transport block based on the determined transmission power. The transmitting the transport block via the uplink BWP may comprise transmitting the transport block via an uplink resource of the uplink BWP. The uplink resource may be a PUSCH resource or a PUCCH resource.

The selected CORESET and the CORESET via which the wireless device receives the DCI may be the same. For example, with reference to FIG. 17, CORESET 1 may be the selected CORESET and the CORESET, or CORESET 3 may be the selected CORESET and the CORESET. The selected CORESET and the CORESET via which the wireless device receives the DCI may be different. For example, with reference to FIG. 17, CORESET 1 may be the CORESET and CORESET 3 may be the selected CORESET; or CORESET 3 may be the CORESET and CORESET 1 may be the selected CORESET).

The reference signal may be periodic, semi-persistent, or aperiodic. The TCI state may indicate a QCL type for the reference signal. The QCL type may be QCL TypeD (or any other QCL type).

Figure 19:
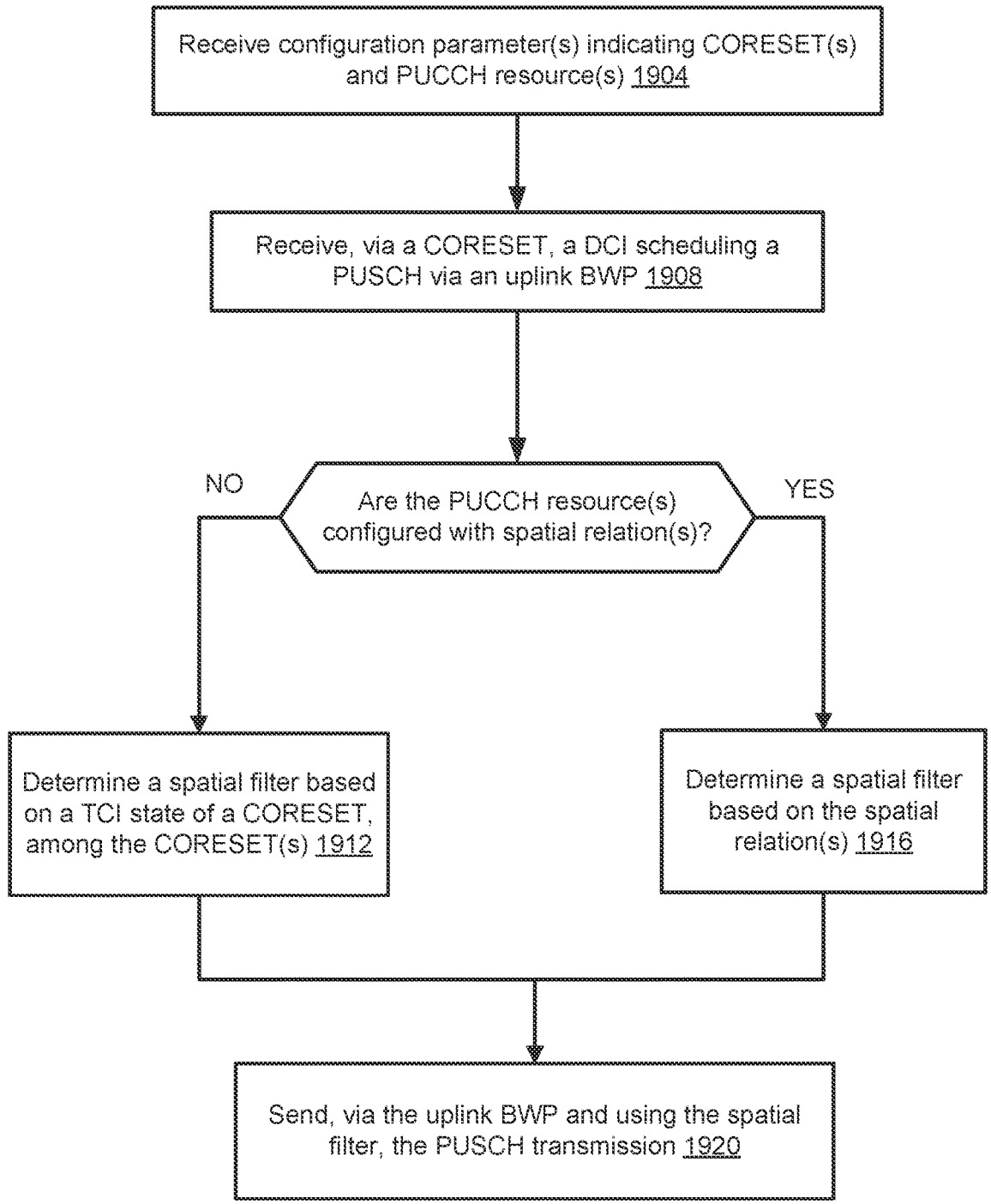
FIG. 19 shows an example method of beam management.

FIG. 19 shows an example method of beam management. The example method 1900 may be performed by a wireless device (or any other device). The wireless device may receive one or more messages. The one or more messages may comprise one or more configuration parameters for a cell. The one or more configuration parameters may indicate a plurality of CORESETs. The one or more configuration parameters may indicate one or more uplink resources (e.g., PUCCH resources) for the uplink BWP.

At step 1908, the wireless device may receive, via a CORESET of the plurality of CORESETs, DCI. The DCI may schedule transmission of a transport block (e.g., a PUSCH transmission). The DCI may schedule the transmission of the transport block via an uplink BWP of the cell.

The uplink BWP may be an active uplink BWP of the cell. The one or more configuration parameters may indicate a first CORESET pool indicator/index for the CORESET. The DCI may correspond to a DCI format 0_0 (e.g., or any other DCI format that does not indicate a spatial relation/transmission beam for the transmission of the transport block).

The one or more uplink resources may or may not be provided/configured with spatial relation(s). An uplink resource (e.g., each uplink resource) of the one or more uplink resources may or may not be provided/configured with a respective spatial relation. For example, the one or more configuration parameters may or may not indicate spatial relation(s) for the one or more uplink resources. For example, the wireless device may or may not receive at least one activation command indicating the spatial relation(s) for the one or more uplink resources.

At step 1912, the wireless device may determine, for transmission of the transport block, a spatial filter (e.g., a spatial domain transmission filter) based on a reference signal indicated by a TCI state of a selected CORESET among the plurality of CORESETs, for example, based on the one or more uplink resources not being configured (e.g., by the one or more configuration parameters, or the at least one activation command) with the spatial relation(s). The wireless device may determine, for transmission of the transport block, a transmission power based on a reference signal indicated by a TCI state of a selected CORESET among the plurality of CORESETs, for example, based on the one or more uplink resources not being configured (e.g., by the one or more configuration parameters, or the at least one activation command) with the spatial relation(s).

The one or more configuration parameters may comprise an indication. The indication may be an enabling parameter (e.g., enableDefaultBeamPlForPUSCH0_0) that is set to enabled. The wireless device may determine the spatial domain transmission filter based on the reference signal indicated by the TCI state of the selected CORESET among the plurality of CORESETs, for example, based on the one or more configuration parameters comprising the indication. The wireless device may determine the transmission power based on the reference signal indicated by the TCI state of the selected CORESET among the plurality of CORESETs, for example, based on the indication.

The one or more configuration parameters may indicate a lowest CORESET indicator/index among a plurality of CORESET indicators/indexes of the plurality of CORESETs. The one or more configuration parameters may indicate the plurality of CORESET indicators/indexes for the plurality of CORESETs. A selected CORESET indicator/index of the selected CORESET may be lowest among the plurality of CORESET indicators/indexes of the plurality of CORESETs.

The wireless device may determine the spatial domain transmission filter based on the reference signal indicated by the TCI state of the selected CORESET among the plurality of CORESETs, for example, based on the selected CORESET indicator/index of the selected CORESET being lowest among the plurality of CORESET indicators/indexes of the plurality of CORESETs. The wireless device may determine the transmission power based on the reference signal indicated by the TCI state of the selected CORESET among the plurality of CORESETs, for example, based on the selected CORESET indicator/index of the selected CORESET being lowest among the plurality of CORESET indicators/indexes of the plurality of CORESETs.

The one or more configuration parameters may indicate, for the selected CORESET, a CORESET pool indicator/index that is the same as (or equal to) the first CORESET pool indicator/index of the CORESET via which the wireless device receives the DCI. The wireless device may determine the spatial domain transmission filter based on the reference signal indicated by the TCI state of the selected CORESET among the plurality of CORESETs, for example, based on the selected CORESET having a CORESET pool indicator/index that is the same as (or equal to) the first CORESET pool indicator/index. The wireless device may determine the spatial domain transmission filter based on the reference signal indicated by the TCI state of the selected CORESET, for example, based on the selected CORESET having the lowest CORESET indicator/index among a plurality of CORESET indicators/indexes of a plurality of CORESETs with the first CORESET pool indicator/index.

At step 1916, the wireless device may determine a spatial domain transmission filter based on the spatial relation(s), for example, if at least one uplink resource is configured with spatial relation(s). Further details associated with step 1916 are described with reference to FIGS. 20-25. At step 1920, the wireless device may send/transmit, via the uplink BWP and using the spatial domain transmission filter, the transport block.

The wireless device may determine the transmission power based on the reference signal indicated by the TCI state of the selected CORESET among the plurality of CORESETs, for example, based on the selected CORESET having a CORESET pool indicator/index that is the same as (or equal to) the first CORESET pool indicator/index. At step 1920, the wireless device may send/transmit, via the uplink BWP, the transport block based on the determined transmission power. The sending/transmitting the transport block via the uplink BWP may comprise sending/transmitting the transport block via an uplink resource of the uplink BWP. The uplink resource may be a PUSCH resource or a PUCCH resource.

The selected CORESET and the CORESET via which the wireless device receives the DCI may be the same. For example, with reference to FIG. 17, CORESET 1 may be the selected CORESET and the CORESET, or CORESET 3 may be the selected CORESET and the CORESET. The selected CORESET and the CORESET that the wireless device receives the DCI may be different. For example, with reference to FIG. 17, CORESET 1 may be the CORESET and CORESET 3 may be the selected CORESET; or CORESET 3 may be the CORESET and CORESET 1 may be the selected CORESET.

The reference signal may be periodic, semi-persistent, or aperiodic. The TCI state may indicate a QCL type for the reference signal. The QCL may be QCL TypeD (or any other QCL type).

Figure 20:
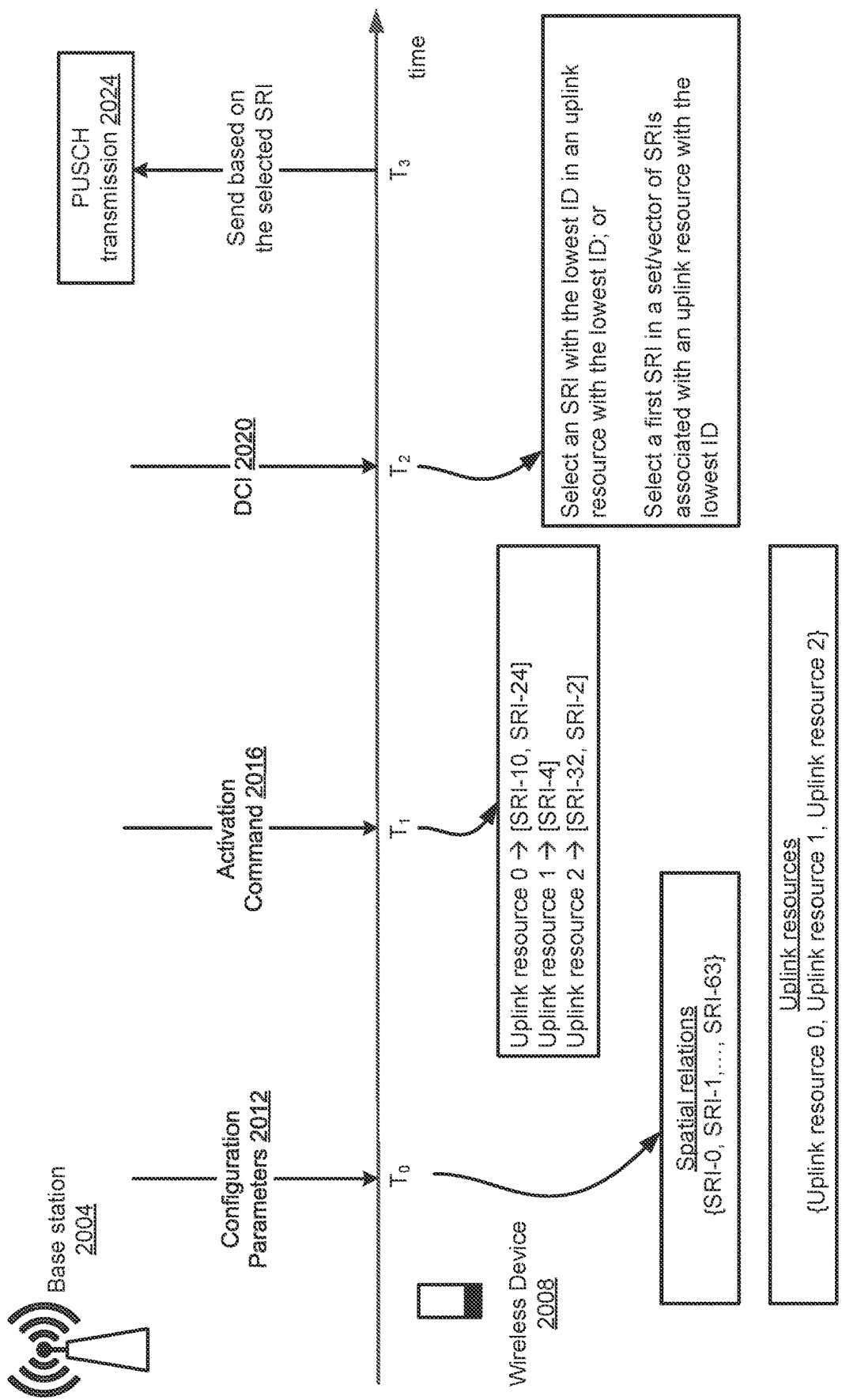
FIG. 20 shows an example beam management based on spatial relation selection.

FIG. 20 shows an example of beam management. A wireless device 2008 may determine transmission parameters (e.g., a transmission beam and/or transmission power) based on a selected/determined spatial relation. The wireless device 2008 may select, for an uplink transmission, a spatial relation corresponding to a lowest indicator/index in an uplink resource corresponding to a lowest resource indicator/index. The uplink transmission may be a PUSCH transmission. The uplink resource may be a PUCCH resource or an SRS resource.

Figure 22:
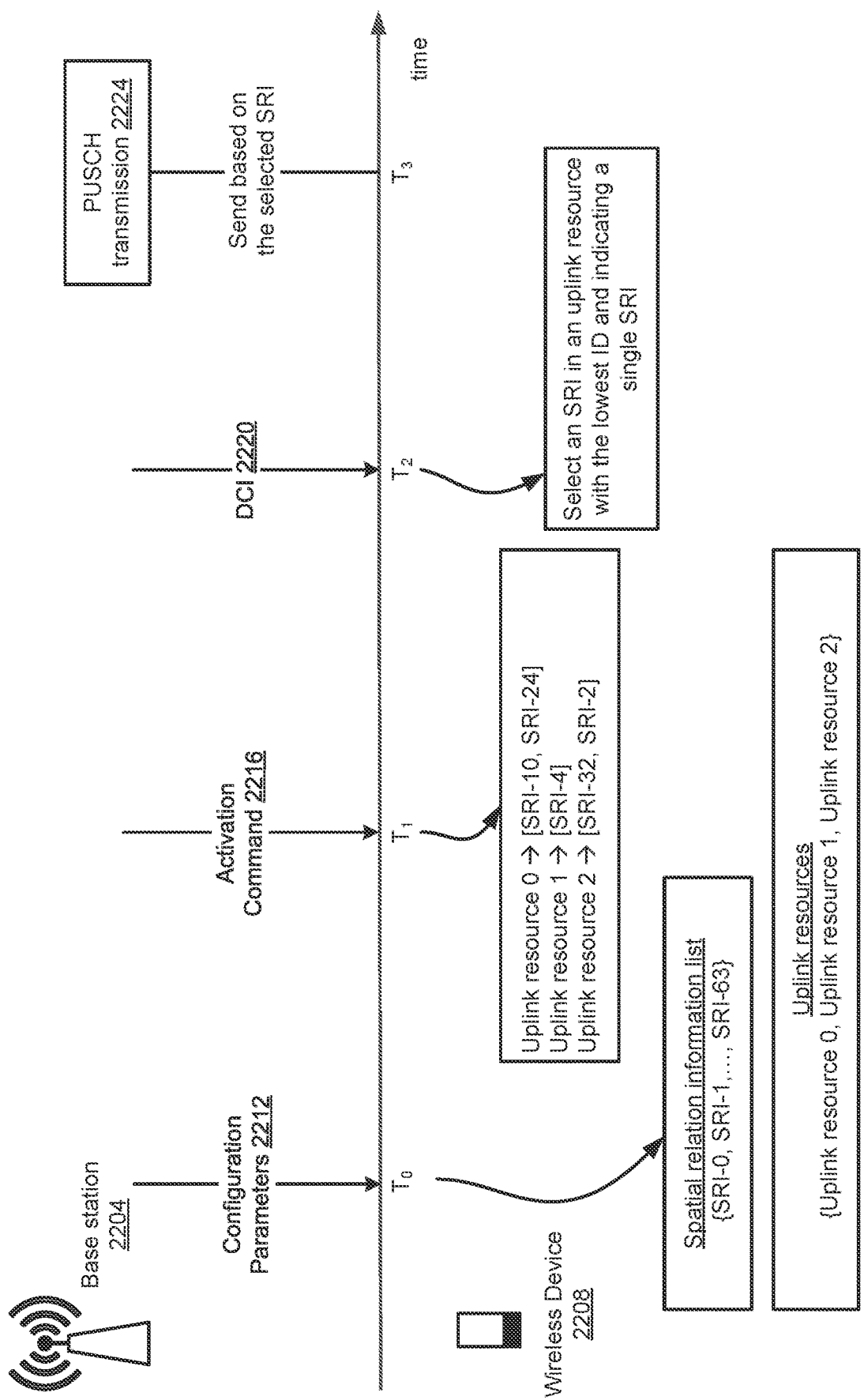
FIG. 22 shows an example beam management based on spatial relation selection.

FIG. 22 shows an example of beam management. A wireless device 2208 may determine transmission parameters (e.g., a transmission beam and/or transmission power) based on a selected spatial relation. The wireless device 2208 may select, for an uplink transmission, a spatial relation associated with an uplink resource among a plurality of uplink resources. The plurality of uplink resources may each indicate a single corresponding beam. The wireless device may select/determine the uplink resource with a lowest resource indicator/index among a plurality of indicators/indexes of the plurality of uplink resources. The uplink transmission may be a PUSCH transmission. The uplink resource may be a PUCCH resource or an SRS resource.

Figure 24:
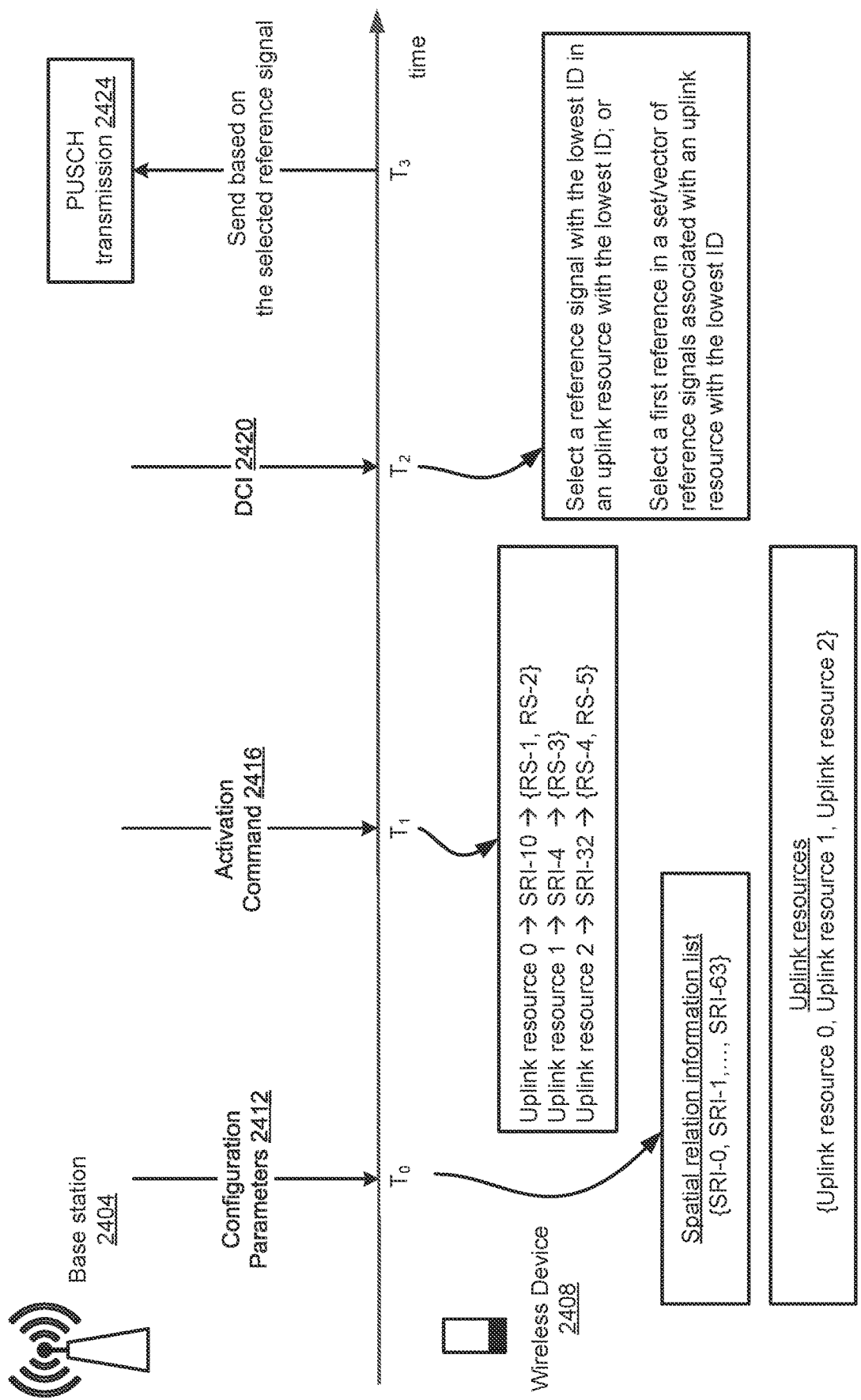
FIG. 24 shows an example beam management based on reference signal selection.

FIG. 24 shows another example of beam management. A wireless device 2408 may determine transmission parameters (e.g., a transmission beam and/or transmission power) based on a selected spatial relation. The wireless device 2408 may select, for an uplink transmission, a reference signal corresponding to a lowest reference signal indicator/index in an uplink resource corresponding to a lowest resource indicator/index. The uplink transmission may be a PUSCH transmission. The uplink resource may be a PUCCH resource or an SRS resource.

A wireless device (e.g., the wireless device 2008, 2208, or 2408) may receive (e.g., at or after time T0) one or more messages. The wireless device may receive the one or more messages from a base station (e.g., a base station 2004, 2204, or 2404). The one or more messages may comprise one or more configuration parameters (e.g., configuration parameters 2012, 2212, or 2412). The one or more configuration parameters may be RRC configuration parameter(s). The one or more configuration parameters may be RRC reconfiguration parameter(s).

The one or more configuration parameters may be for a cell. At least one configuration parameter of the one or more configuration parameters may be for a cell. The cell may be a primary cell (PCell), a secondary cell (SCell), or a secondary cell configured with PUCCH (e.g., PUCCH SCell). The cell may be an unlicensed cell (e.g., operating in an unlicensed band). The cell may be a licensed cell (e.g., operating in a licensed band). The cell may operate in a first frequency range (e.g., FR1). The FR1 may comprise frequency bands below 6 GHz (e.g., or any other frequency bands). The cell may operate in a second frequency range (e.g., FR2). The FR2 may comprise frequency bands from 24 GHz to 52.6 GHz (e.g., or any other frequency bands).

The cell may be a scheduling cell. The wireless device may be in an RRC connected mode. The wireless device may be in an RRC idle mode. The wireless device may be in an RRC inactive mode.

The cell may comprise a plurality of BWPs. The plurality of BWPs may comprise one or more uplink BWPs. The one or more uplink BWPs may comprise an uplink BWP of the cell. The plurality of BWPs may comprise one or more downlink BWPs. The one or more downlink BWPs may comprise a downlink BWP of the cell. The wireless device may activate the downlink BWP of the one or more downlink BWPs of the cell. The wireless device may activate the uplink BWP of the one or more uplink BWPs of the cell.

The one or more configuration parameters may be for the (active) downlink BWP of the cell. At least one configuration parameter of the one or more configuration parameters may be for the downlink BWP of the cell. The one or more configuration parameters may be for the (active) uplink BWP of the cell. At least one configuration parameter of the one or more configuration parameters may be for the uplink BWP of the cell.

The one or more configuration parameters may indicate one or more uplink resources (e.g., uplink resource 0, uplink resource 1, uplink resource 2 as shown in FIG. 20, FIG. 22 and FIG. 24) for the cell. The one or more configuration parameters may indicate the one or more uplink resources for the (active) uplink BWP of the cell. The (active) uplink BWP of the cell may comprise the one or more uplink resources.

The one or more uplink resources may comprise one or more PUCCH resources. The one or more uplink resources may comprise one or more SRS resources. The one or more configuration parameters may indicate one or more SRS resource sets comprising an SRS resource set. The SRS resource set may comprise the one or more SRS resources.

The one or more configuration parameters may indicate one or more uplink resource indicators/indexes (e.g., provided by a higher layer parameter pucch-ResourceId) for the one or more uplink resources. Each uplink resource of the one or more uplink resources may be identified/indicated by a respective uplink resource indicator/index of the one or more uplink resource indicators/indexes. For example, a first uplink resource (e.g., uplink resource 0 in FIG. 20, FIG. 22 and FIG. 24) of the one or more uplink resources may be identified/indicated by a first uplink resource index of the one or more uplink resource indexes. A second uplink resource (e.g., uplink resource 1 in FIG. 20, FIG. 22 and FIG. 24) of the one or more uplink resources may be identified/indicated by a second uplink resource index of the one or more uplink resource indexes. A third uplink resource (e.g., uplink resource 2 in FIG. 20, FIG. 22 and FIG. 24) of the one or more uplink resources may be identified/indicated by a third uplink resource index of the one or more uplink resource indexes.

The one or more configuration parameters may indicate a plurality of spatial relations (e.g., SRI-0, SRI-1, . . . , SRI-63 in FIG. 20, FIG. 22 and FIG. 24, provided by a higher layer parameter spatialRelationInfoToAddModList) for the cell. The one or more configuration parameters may indicate the plurality of spatial relations for the (active) uplink BWP of the cell. The (active) uplink BWP of the cell may comprise the plurality of spatial relations.

The one or more configuration parameters may indicate a plurality of spatial relation indicators/indexes (e.g., provided by a higher layer parameter pucch-SpatialRelationInfoId) for the plurality of spatial relations. Each spatial relation of the plurality of spatial relations may be identified/indicated by a respective spatial relation indicator/index of the plurality of spatial relation indicators/indexes. For example, a first spatial relation (e.g., SRI-0 in FIG. 20, FIG. 22 and FIG. 24) of the plurality of spatial relations may be identified/indicated by a first spatial relation indicator/index of the plurality of spatial relation indicators/indexes. A second spatial relation (e.g., SRI-1 in FIG. 20, FIG. 22 and FIG. 24) of the plurality of spatial relations may be identified/indicated by a second spatial relation indicator/index of the plurality of spatial relation indicators/indexes. A third spatial relation (e.g., SRI-63 in FIG. 20, FIG. 22 and FIG. 24) of the plurality of spatial relations may be identified/indicated by a third spatial relation indicator/index of the plurality of spatial relation indicator/indexes.

The wireless device may receive (e.g., at or after time T2) DCI (e.g., corresponding to DCI format 0_0) scheduling an uplink transmission (e.g., a transport block, a PUSCH transmission) The DCI may be DCI 2020 as shown in FIG. 20, DCI 2220 as shown in FIG. 22, or DCI 2420 as shown in FIG. 24. The DCI may schedule transmission of a transport block (e.g., a PUSCH transmission 2024, 2224, or 2424). The DCI may schedule transmission of the transport block via the (active) uplink BWP. The DCI may or may not indicate a spatial relation for the transmission of the transport block. The DCI may not comprise a field (e.g., an SRI field) indicating the spatial relation. The DCI may correspond to a DCI format 0_0 (e.g., or any other DCI format that does not comprise an SRI field).

The wireless device may select/determine an uplink resource (e.g., a selected uplink resource) among the one or more uplink resources. The wireless device may select/determine the selected uplink resource for transmission of the transport block. The wireless device may select/determine the selected uplink resource to determine (e.g., calculate or compute) a transmission power for transmission of the transport block. The wireless device may select/determine the selected uplink resource to determine a spatial domain transmission filter (e.g., a transmission beam) for transmission of the transport block.

The selected uplink resource of the one or more uplink resources may be indicated/identified by a selected uplink resource indicator/index of the one or more uplink resource indicators/indexes. The selected uplink resource indicator/index may be lowest (or highest) among the one or more uplink resource indicator/indexes. The selected uplink resource may be identified/indicated by a selected uplink resource indicator/index that is lowest (or highest) among the one or more uplink resource indicator/indexes of the one or more uplink resources. The wireless device may select/determine the selected uplink resource among the one or more uplink resources based on the selected uplink resource indicator/index being lowest (or highest) among the one or more uplink resource indexes.

The selected uplink resource may indicate/comprise (e.g., be configured with) at least two spatial relations. The plurality of spatial relations may comprise the at least two spatial relations. The wireless device may determine that the selected uplink resource indicates/comprises the at least two spatial relations. As shown in FIG. 20, the selected uplink resource may be the first uplink resource (e.g., uplink resource 0). The selected uplink resource may be the first uplink resource (e.g., uplink resource 0), for example, based on the first uplink resource being associated with the lowest uplink resource indicator of the one or more uplink resource indicators. The first uplink resource may indicate/comprise (e.g., be configured with) a first spatial relation (e.g., SRI-10) and a second spatial relation (e.g., SRI-24). The at least two spatial relations may comprise the first spatial relation (e.g., SRI-10) and the second spatial relation (e.g., SRI-24). The selected uplink resource may be the third uplink resource (e.g., uplink resource 2). The selected uplink resource may be the third uplink resource (e.g., uplink resource 2), for example, based on the third uplink resource being associated with the highest uplink resource indicator of the one or more uplink resource indicators. The third uplink resource may indicate/comprise (e.g., be configured with) a first spatial relation (e.g., SRI-32) and a second spatial relation (e.g., SRI-2). The at least two spatial relations may comprise the first spatial relation (e.g., SRI-32) and the second spatial relation (e.g., SRI-2).

The one or more configuration parameters may indicate the at least two spatial relations for the selected uplink resource. The selected uplink resource may be provided with the at least two spatial relations based on the one or more configuration parameters indicating the at least two spatial relations for the selected uplink resource. The selected uplink resource indicating/comprising the at least two spatial relations may comprise the one or more configuration parameters indicating the at least two spatial relations for the selected uplink resource.

The wireless device (e.g., the wireless device 2008) may receive (e.g., at or after time T1) an activation command 2016 (e.g., aperiodic/semi-persistent SRS activation/deactivation MAC CE, PUCCH spatial relation activation/deactivation MAC CE) indicating/activating (e.g., configuring) the at least two spatial relations for the selected uplink resource. The selected uplink resource may be provided (e.g., configured) with the at least two spatial relations based on the receiving the activation command 2016 indicating/activating the at least two spatial relations for the selected uplink resource. The selected uplink resource indicating/comprising the at least two spatial relations may comprise the receiving the activation command 2016 indicating/activating the at least two spatial relations for the selected uplink resource.

The wireless device may receive (e.g., at or after time T1 in FIG. 20, FIG. 22 and FIG. 24) one or more activation commands (e.g., aperiodic/semi-persistent SRS activation/deactivation MAC CE, PUCCH spatial relation activation/deactivation MAC CE) indicating/activating a second plurality of spatial relations among the plurality of spatial relations of the one or more uplink resources. The one or more activation commands may comprise the activation command 2016, the activation command 2216, or the activation command 2416. Each activation command of the one or more activation commands may activate (e.g., select, indicate, or configure) a respective one or more spatial relations of the second plurality of spatial relations for an uplink resource of the one or more uplink resources. Each uplink resource of the one or more uplink resources may be provided by (e.g., indicated by, activated by, or configured with) respective one or more spatial relations of the second plurality of spatial relations. The one or more activation commands may comprise the activation command indicating/activating the at least two spatial relations for the selected uplink resource. For example, with reference to FIG. 20 and FIG. 22, the second plurality of spatial relations may comprise SRI-10, SRI-24, SRI-4, SRI-32 and SRI-2. With reference to FIG. 24, the second plurality of spatial relations may comprise SRI-10, SRI-4, and SRI-32. A first activation command of the one or more activation commands may activate (e.g., select, indicate, or configure) SRI-10 and SRI-24 for the first uplink resource (uplink resource 0). A second activation command of the one or more activation commands may activate (e.g., select, indicate, or configure) SRI-4 for the second uplink resource (uplink resource 4). A third activation command of the one or more activation commands may activate (e.g., select, indicate, or configure) SRI-32 and SRI-2 for the third uplink resource (uplink resource 2).

An uplink resource (e.g., each uplink resource) of the one or more uplink resources may indicate/comprise one or more spatial relations. For example, with reference to FIG. 20 and FIG. 22, the first uplink resource (uplink resource 0) and the third uplink resource (uplink resource 2) may indicate two spatial relations. The second uplink resource (uplink resource 1) may indicate a single (e.g., one) spatial relation.

The wireless device (e.g., the wireless device 2008) may select/determine a selected spatial relation among the at least two spatial relations (e.g., of the selected uplink resource). The wireless device 2008 may select/determine the selected spatial relation among the at least two spatial relations based on the determining that the selected uplink resource indicates/comprises the at least two spatial relations.

The selected spatial relation may be a first spatial relation among the at least two spatial relations (e.g., of the selected uplink resource). The first spatial relation may comprise the first element in a vector/set of the at least two spatial relations. For example, with reference to FIG. 20, the vector/set of the at least two spatial relations may be

[SRI-10, SRI-24] for the first uplink resource (uplink resource 0). The first spatial relation in the vector/set may be SRI-10 based on SRI-10 being the first element in the vector/set. The wireless device 2008 may select SRI-10 as the selected spatial relation, for example, if the selected uplink resource is the first uplink resource. The vector/set of the at least two spatial relations may be [SRI-32, SRI-2] for the third uplink resource (e.g., uplink resource 2). The first spatial relation in the vector/set may be SRI-32 based on SRI-32 being the first element in the vector/set. The wireless device 2008 may select SRI-32 as the selected spatial relation, for example, if the selected uplink resource is the third uplink resource.

The selected spatial relation may be identified by a selected spatial relation indicator/index of the plurality of spatial relation indicators/indexes. The selected spatial relation indicator/index may be lowest (or highest) among at least two spatial relation indicators/indexes of the at least two spatial relations of the selected uplink resource. The selected spatial relation may be identified/indicated by a selected spatial relation indicator/index that is lowest (or highest) among at least two spatial relation indicators/indexes of the at least two spatial relations of the selected uplink resource. The plurality of spatial relation indicators/indexes may comprise the at least two spatial relation indicators/indexes. For example, with reference to FIG. 20 the at least two spatial relations may comprise a first spatial relation (SRI-10) and a second spatial relation (SRI-24), for example, if the selected uplink resource is the first uplink resource (uplink resource 0). The wireless device 2008 may select the first spatial relation (SRI-10) as the selected spatial relation based on a first spatial relation indicator/index of the first spatial relation being lower (or higher) than a second spatial relation indicator/index of the second spatial relation (SRI-24). The at least two spatial relation indicators/indexes may comprise the first spatial relation indicator/index and the second spatial relation indicator/index. The at least two spatial relations may comprise a first spatial relation (SRI-32) and a second spatial relation (SRI-2), for example, if the selected uplink resource is the third uplink resource (uplink resource 2). The wireless device 2008 may select the second spatial relation (SRI-2) as the selected spatial relation based on a second spatial relation indicator/index of the second spatial relation being lower (or higher) than a first spatial relation indicator/index of the first spatial relation (SRI-32). The at least two spatial relation indicators/indexes may comprise the first spatial relation indicator/index and the second spatial relation indicator/index.

The wireless device 2008 may determine (e.g., compute or calculate) a transmission power for transmission of the transport block. The wireless device 2008 may determine the transmission power based on a reference signal indicated by the selected spatial relation. The wireless device 2008 may determine the transmission power based on the reference signal indicated by the selected spatial relation, for example, based on the selected spatial relation indicator/index of the selected spatial relation being lowest (or highest) among the at least two spatial relation indicators/indexes of the at least two spatial relations of the selected uplink resource.

The wireless device 2008 may send/transmit (e.g., at or after time T3) the transport block (e.g., PUSCH transmission 2224) using the transmission power. The wireless device 2008 may send/transmit the transport block using the transmission power based on the determining the transmission power. The wireless device 2008 may send/transmit, via the (active) uplink BWP of the cell, the transport block using the transmission power.

The wireless device 2008 may determine a spatial domain transmission filter (e.g., a transmission beam) for transmission of the transport block. The wireless device 2008 may determine the spatial domain transmission filter based on a reference signal indicated by the selected spatial relation. The wireless device 2008 may determine the spatial domain transmission filter based on the reference signal indicated by the selected spatial relation, for example, based on the selected spatial relation indicator/index of the selected spatial relation being lowest (or highest) among the at least two spatial relation indicators/indexes of the at least two spatial relations of the selected uplink resource.

The wireless device 2008 may send/transmit (e.g., at or after time T3) the transport block using the spatial domain transmission filter (e.g., via the transmission beam). The wireless device 2008 may send/transmit the transport block using the spatial domain transmission filter based on the determining the spatial domain transmission filter. The wireless device 2008 may send/transmit, via the (active) uplink BWP of the cell, the transport block with the spatial domain transmission filter.

The reference signal may be periodic. The reference signal may be periodic with a periodicity (e.g., 2 slots, 5 slots, 10 slots, 2 symbols, 5 symbols, or any other periodicity). The wireless device may measure RSRP (e.g., L1-RSRP, L3-RSRP, or RSRP corresponding to any other layer) of the reference signal periodically based on the reference signal being periodic.

The selected spatial relation may indicate the reference signal (e.g., CSI-RS, SS/PBCH block, SRS, DM-RS). The selected spatial relation may comprise a reference signal indicator/index (e.g., provided by a higher layer parameter referenceSignal, ssb-index, csi-RS-Index, NZP-CSI-RS-ResourceId, srs-index) identifying (or indicating or of) the reference signal. The one or more configuration parameters may indicate the reference signal indicator/index for the reference signal.

Figure 21:
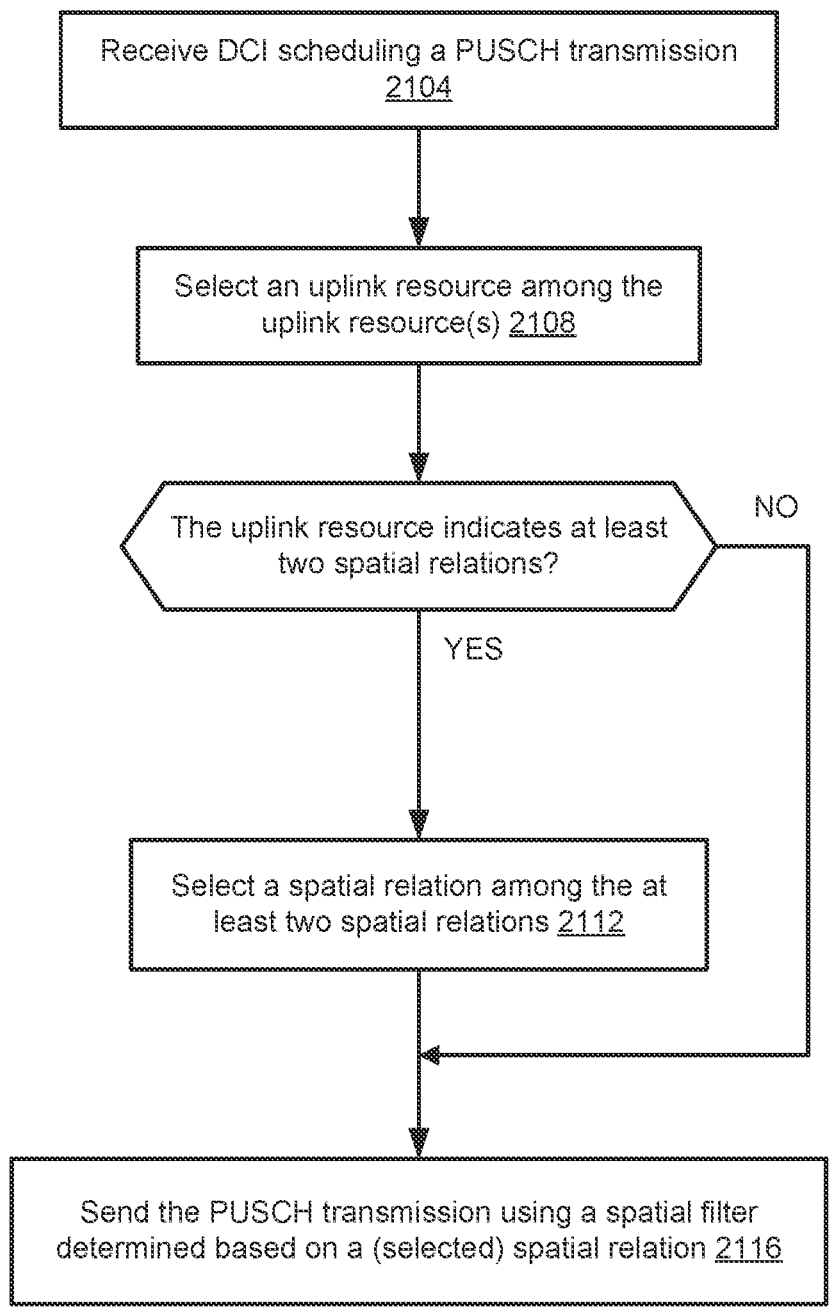
FIG. 21 shows an example method of beam management.

FIG. 21 shows an example method of beam management. The example method 2100 may be performed by a wireless device (e.g., the wireless device 2108). The wireless device may receive one or more messages. The one or more messages may comprise one or more configuration parameters for a cell. The one or more configuration parameters may indicate one or more uplink resources (e.g., one or more PUCCH resources). An active uplink BWP of the cell may comprise the one or more uplink resources. The one or more uplink resources may comprise one or more PUCCH resources.

At step 2104, the wireless device may receive DCI scheduling transmission of a transport block (e.g., a PUSCH transmission). The DCI may correspond to a DCI format 0_0 (e.g., or any other DCI format that does not indicate a spatial relation). The DCI may be fallback DCI. The DCI may not comprise an SRI field indicating a spatial relation (or spatial domain transmission filter, transmitting beam) for the transmission of the transport block.

At step 2108, the wireless device may select/determine a selected uplink resource among the one or more uplink resources. The wireless device may select/determine the selected uplink resource to determine a spatial filter (e.g., a spatial domain transmission filter) for transmission of the transport block. The wireless device may select/determine the selected uplink resource to determine a transmission power for transmission of the transport block. A selected uplink resource indicator/index of the selected uplink resource may be lowest (or highest) among one or more uplink resource indicators/indexes of the one or more uplink resources. The one or more configuration parameters may indicate the one or more uplink resource indicators/indexes for the one or more uplink resources. The selected uplink resource may be indicated/identified by a selected uplink resource indicator/index that is lowest (or highest) among the one or more uplink resource indicators/indexes of the one or more uplink resources. The wireless device may select/determine the selected uplink resource among the one or more uplink resources based on the selected uplink resource indicator/index of the selected uplink resource being lowest (or highest) among the one or more uplink resource indicators/indexes of the one or more uplink resources.

The selected uplink resource may indicate/comprise at least two spatial relations. The one or more configuration parameters may indicate the at least two spatial relations for the selected uplink resource. The wireless device may receive an activation command indicating the at least two spatial relations for the selected uplink resource.

At step 2112, the wireless device may select/determine a selected spatial relation among the at least two spatial relations, for example, if the selected uplink resource indicates/comprises the at least two spatial relations. The wireless device may select/determine the selected spatial relation among the at least two spatial relations based on the selected uplink resource indicating/comprising the at least two spatial relations. A selected spatial relation indicator/index of the selected spatial relation may be lowest (or highest) among at least two spatial relation indicators/indexes of the at least two spatial relations. The one or more configuration parameters may indicate the at least two spatial relation indicators/indexes for the at least two spatial relations. The selected spatial relation may be indicated/identified with a selected spatial relation index indicator/that is lowest among the at least two spatial relation indicators/indexes of the at least two spatial relations. The wireless device may select/determine the selected spatial relation among the at least two spatial relations based on the selected spatial relation indicators/index of the selected spatial relation being lowest (or highest) among at least two spatial relation indicators/indexes of the at least two spatial relations. The selected spatial relation may indicate a reference signal (e.g., SRS, SS/PBCH block, CSI-RS, etc.).

The wireless device may determine, for transmission of the transport block, a spatial domain transmission filter (e.g., a transmission beam). The wireless device may determine the spatial domain transmission filter based on the reference signal indicated by the selected spatial relation. The wireless device may determine the spatial domain transmission filter based on the reference signal indicated by the selected spatial relation, for example, based on the selected spatial relation indicator/index of the selected spatial relation being lowest (or highest) among the at least two spatial relation indicators/indexes of the at least two spatial relations. The wireless device may determine the spatial domain transmission filter based on a reference signal indicated by a spatial relation of the selected uplink resource, for example, if the selected uplink resource indicates/comprises only a single spatial relation.

At step 2116, the wireless device may send/transmit the transport block using the spatial domain transmission filter (e.g., via the transmission beam). The wireless device may send/transmit the transport block using the spatial domain transmission filter based on the determining the spatial domain transmission filter. The wireless device may send/transmit, via the (active) uplink BWP of the cell, the transport block using the spatial domain transmission filter The wireless device may determine a transmission power for transmission of the transport block. The wireless device may determine the transmission power based on the reference signal indicated by the selected spatial relation. The wireless device may determine the transmission power based on the reference signal indicated by the selected spatial relation, for example, based on the selected spatial relation indicator/index of the selected spatial relation being lowest (or highest) among the at least two spatial relation indicators/indexes of the at least two spatial relations. The wireless device may determine the transmission power based on a reference signal indicated by a spatial relation of the selected uplink resource, for example, if the selected uplink resource indicates/comprises only a single spatial relation.

The wireless device may send/transmit the transport block using the transmission power. The wireless device may send/transmit the transport block using the transmission power based on the determining the transmission power. The wireless device may send/transmit, via the (active) uplink BWP of the cell, the transport block using the transmission power.

A selected uplink resource of one or more uplink resources may indicate/comprise a spatial relation. A quantity of spatial relations indicated by the selected uplink may be one. The quantity of the spatial relations indicated by the selected uplink may not be more than one (e.g., two spatial relations, three spatial relations, etc.). The selected uplink resource of the one or more uplink resources may indicate/comprise one spatial relation. The selected uplink resource of the one or more uplink resources may indicate/comprise a single spatial relation. The selected uplink resource of the one or more uplink resources may not indicate/comprise at least two spatial relations. With reference to FIG. 22, the first uplink resource (uplink resource 0) may indicate at least two spatial relations (e.g., SRI-10 and SRI-24). The selected uplink resource may not be the first uplink resource based on the first uplink resource indicating the at least two spatial relations. The third uplink resource (uplink resource 2) may indicate at least two spatial relations (e.g., SRI-32 and SRI-2). The selected uplink resource may not be the third uplink resource based on the third uplink resource indicating the at least two spatial relations. The second uplink resource (uplink resource 1) may indicate a single (or one) spatial relation (e.g., SRI-4). The selected uplink resource may be the second uplink resource based on the second uplink resource indicating the single (or one) spatial relation.

The wireless device (e.g., the wireless device 2208) may select/determine the selected uplink resource among the one or more uplink resources based on the selected uplink resource indicating a single (or one) spatial relation. The wireless device 2208 may select/determine the selected uplink resource among the one or more uplink resources based on the quantity of the spatial relations indicated by the selected uplink resource being (equal to) one. The wireless device 2208 may select/determine the selected uplink resource among the one or more uplink resources based on the quantity of the spatial relations indicated by the selected uplink resource not being more than one.

The one or more uplink resources may comprise a plurality of uplink resources, each indicating a corresponding single (or one) spatial relation. The plurality of uplink resources may be indicated by a plurality of uplink resource indicators. The wireless device 2208 may select/determine the selected uplink resource among the plurality of uplink resources, for example, based on the selected uplink resource being indicated by a lowest (or highest) resource indicator of the plurality of uplink resource indicators.

The wireless device 2208 may determine a transmission power for transmission of the transport block. The wireless device 2208 may determine the transmission power based on a reference signal indicated by the spatial relation of the selected uplink resource. The wireless device 2208 may determine the transmission power based on the reference signal indicated by the spatial relation based on the selected uplink resource indicating a single (or one) spatial relation. The wireless device 2208 may determine the transmission power based on the reference signal indicated by the spatial relation based on the quantity of the spatial relations indicated by the selected uplink resource being (equal to) one.

The wireless device 2208 may send/transmit (e.g., at or after time T3) the transport block (e.g., PUSCH transmission 2224) using the transmission power. The wireless device 2208 may send/transmit the transport block using the transmission power based on the determining the transmission power. The wireless device 2208 may send/transmit, via the (active) uplink BWP of the cell, the transport block using the transmission power.

The wireless device 2208 may determine, for transmission of the transport block, a spatial domain transmission filter (e.g., a transmission beam). The wireless device 2208 may determine the spatial domain transmission filter based on a reference signal indicated by the spatial relation of the selected uplink resource. The wireless device 2208 may determine the spatial domain transmission filter based on the reference signal indicated by the spatial relation based on the selected uplink resource indicating a single (or one) spatial relation. The wireless device 2208 may determine the spatial domain transmission filter based on the reference signal indicated by the spatial relation based on the quantity of the spatial relation indicated by the selected uplink resource being (equal to) one.

The wireless device 2208 may send/transmit (e.g., at or after time T3) the transport block (e.g., the PUSCH transmission 2224) using the spatial domain transmission filter. The wireless device 2208 may send/transmit the transport block using the spatial domain transmission filter based on the determining the spatial domain transmission filter. The wireless device 2208 may send/transmit, via the (active) uplink BWP of the cell, the transport block using the spatial domain transmission filter.

The reference signal may be periodic. The reference signal may be periodic with a periodicity (e.g., 2 slots, 5 slots, 10 slots, 2 symbols, 5 symbols, or any other quantity of symbols or slots). The wireless device 2208 may measure RSRP (e.g., L1-RSRP, L3-RSRP, or RSRP corresponding to any other layer) of the reference signal periodically based on the reference signal being periodic.

The spatial relation may indicate the reference signal (e.g., CSI-RS, SS/PBCH block, SRS, DM-RS). The spatial relation may comprise a reference signal indicator/index (e.g., provided by a higher layer parameter referenceSignal, ssb-index, csi-RS-Index, NZP-CSI-RS-ResourceId, srs-index) identifying (or indicating or of) the reference signal. The one or more configuration parameters may indicate the reference signal index for the reference signal.

Figure 23:
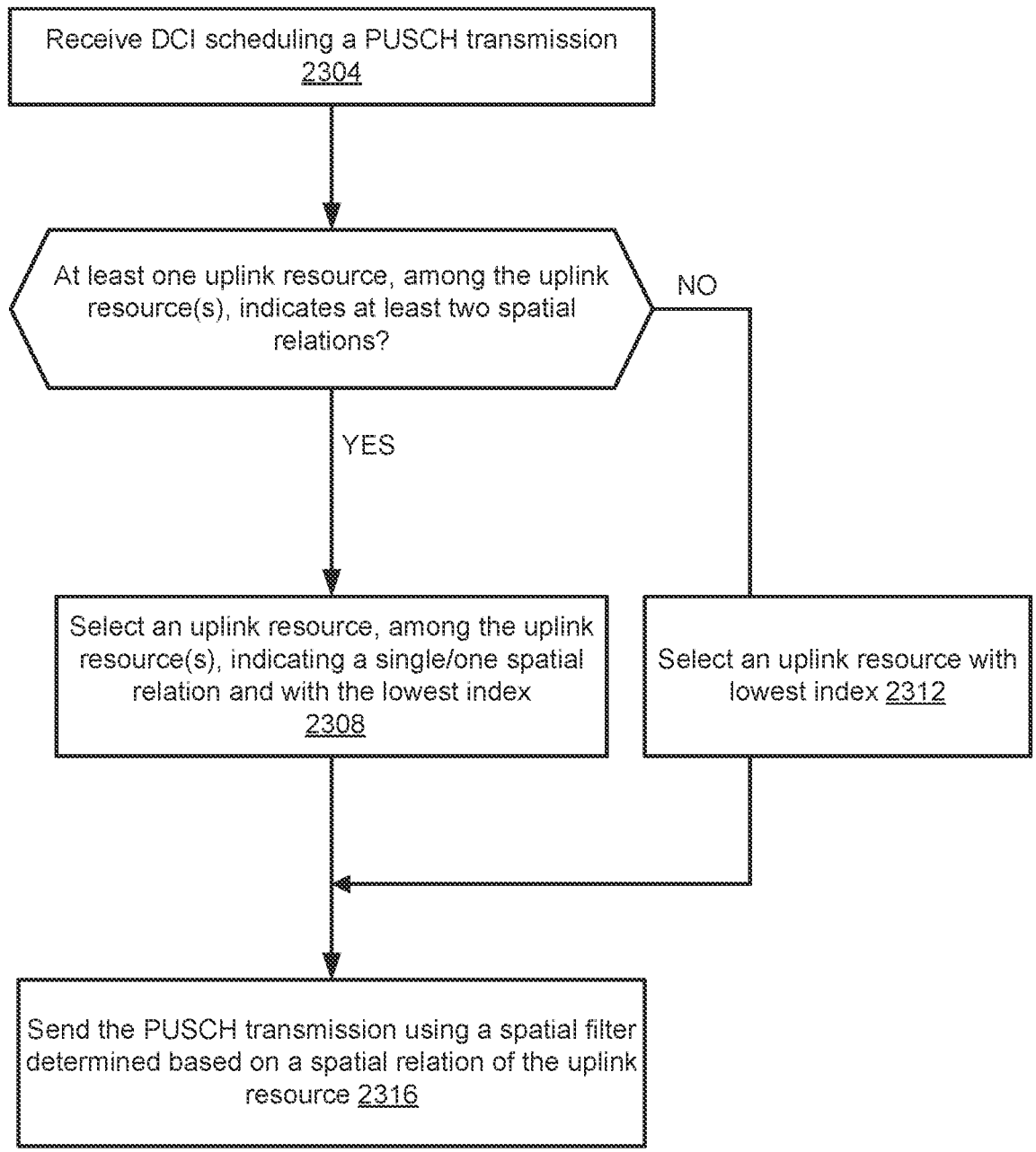
FIG. 23 shows an example method of beam management.

FIG. 23 shows an example method of beam management. The example method 2300 may be performed by a wireless device (e.g., the wireless device 2208) or any other device. The wireless device may receive one or more messages. The one or more messages may comprise one or more configuration parameters for a cell. The one or more configuration parameters may indicate one or more uplink resources (e.g., one or more PUCCH resources). An active uplink BWP of the cell may comprise the one or more uplink resources. The one or more uplink resources may comprise one or more PUCCH resources.

At step 2304, the wireless device may receive DCI scheduling transmission of a transport block (e.g., a PUSCH transmission). The DCI may correspond to a DCI format 0_0 (or any other DCI format that does not indicate a spatial relation). The DCI may be fallback DCI. The DCI may not comprise an SRI field indicating a spatial relation (or spatial domain transmission filter, transmitting beam) for the transmission of the transport block.

The wireless device may select/determine a selected uplink resource among the one or more uplink resources. The wireless device may select/determine the selected uplink resource to determine a spatial filter (e.g., a spatial domain transmission filter, a transmission beam, etc.) for transmission of the transport block. The wireless device may select/determine the selected uplink resource to determine a transmission power for transmission of the transport block.

The wireless device may determine that at least one uplink resource of the one or more uplink resources indicates/comprises at least two spatial relations. At step 2308, the wireless device may select/determine a selected uplink resource based on the determining that at least one uplink resource of the one or more uplink resources indicates/comprises at least two spatial relations.

A selected uplink resource indicator/index of the selected uplink resource may be lowest (or highest) among one or more uplink resource indicators/indexes of the one or more uplink resources. The one or more configuration parameters may indicate the one or more uplink resource indicators/indexes for the one or more uplink resources. The selected uplink resource may be indicated/identified by a selected uplink resource indicator/index that is lowest (or highest) among the one or more uplink resource indicators/indexes of the one or more uplink resources. The wireless device may select/determine the selected uplink resource among the one or more uplink resources based on the selected uplink resource indicator/index of the selected uplink resource being lowest (or highest) among the one or more uplink resource indicators/indexes of the one or more uplink resources.

The selected uplink resource may indicate/comprise a spatial relation. A quantity of spatial relations indicated by the selected uplink resource may be one. A quantity of the spatial relations indicated by the selected uplink resource may not be more than one. The at least one uplink resource, indicating/comprising the at least two spatial relations, may not comprise the selected uplink resource. The wireless device may select/determine the selected uplink resource among the one or more uplink resources based on the selected uplink resource indicating/comprising a single (or one) spatial relation. The wireless device may select/determine the selected uplink resource among the one or more uplink resources based on the quantity of the spatial relations indicated by the selected uplink resource being one. The wireless device may select/determine the selected uplink resource among the one or more uplink resources based on the quantity of the spatial relations indicated by the selected uplink resource not being more than one. The wireless device may select/determine the selected uplink resource among the one or more uplink resources based on the at least one uplink resource not comprising the selected uplink resource.

The one or more uplink resources may comprise a plurality of uplink resources, each indicating a corresponding single (or one) spatial relation. The plurality of uplink resources may be indicated by a plurality of uplink resource indicators. The wireless device may select/determine the selected uplink resource among the plurality of uplink resources, for example, based on the selected uplink resource being indicated by a lowest (or highest) resource indicator of the plurality of uplink resource indicators.

At step 2312, the wireless device may select/determine a selected uplink resource based on determining that no uplink resource of the one or more uplink resources indicates/comprises at least two spatial relations. The selected uplink resource may an uplink resource with a lowest (or highest) uplink resource indicator/index among uplink resource indicator(s) of the uplink resource(s).

The spatial relation indicated by the selected uplink resource may indicate a reference signal (e.g., SRS, SS/PBCH block, CSI-RS, etc.). The wireless device may determine a spatial domain transmission filter (e.g., a transmission beam) for transmission of the transport block. The wireless device may determine the spatial domain transmission filter based on the reference signal indicated by the spatial relation.

At step 2316, the wireless device may send/transmit the transport block (e.g., the PUSCH transmission) using the spatial domain transmission filter (e.g., via the transmission beam). The wireless device may send/transmit the transport block using the spatial domain transmission filter based on the determining the spatial domain transmission filter. The wireless device may send/transmit, via the (active) uplink BWP of the cell, the transport block using the spatial domain transmission filter The wireless device may determine a transmission power for the transmission of the transport block. The wireless device may determine the transmission power based on the reference signal indicated by the spatial relation.

The wireless device may send/transmit the transport block using the transmission power. The wireless device may send/transmit the transport block using the transmission power based on the determining/calculating/computing the transmission power. The wireless device may send/transmit, via the (active) uplink BWP of the cell, the transport block using the transmission power.

A selected uplink resource may indicate/comprise a spatial relation. The spatial relation may indicate at least two reference signals. For example, with reference to FIG. 24, the selected uplink resource may be the first uplink resource (uplink resource 0). The first uplink resource may indicate/comprise a spatial relation (SRI-10) indicating a first reference signal (RS-1) and a second reference signal (RS-2). The at least two reference signals may comprise the first reference signal and the second reference signal. The selected uplink resource may be the third uplink resource (uplink resource 2). The third uplink resource may indicate/comprise a spatial relation (SRI-32) indicating a first reference signal (RS-4) and a second reference signal (RS-5). The at least two reference signals may comprise the first reference signal and the second reference signal.

The spatial relation of the selected uplink resource may comprise at least two reference signal indicators/indexes (e.g., provided by a higher layer parameter referenceSignal, ssb-index, csi-RS-Index, NZP-CSI-RS-ResourceId, srs-index) identifying (or indicating or of) the at least two reference signals. The one or more configuration parameters (e.g., configuration parameters 2412) may indicate the at least two reference signal indicators/indexes for the at least two reference signals. The one or more configuration parameters may indicate the at least two reference signals for the spatial relation.

The wireless device 2408 may receive (e.g., at or after time T1) an activation command (e.g., an aperiodic/semi-persistent SRS activation/deactivation MAC CE, PUCCH spatial relation activation/deactivation MAC CE) indicating/activating the spatial relation for the selected uplink resource. The selected uplink resource may be provided/configured with the at least two reference signals based on the receiving, for the selected uplink resource, the activation command indicating/activating the spatial relation that indicates the at least two reference signals. The selected uplink resource indicating/comprising the at least two reference signals may comprise the receiving, for the selected uplink resource, the activation command indicating/activating the spatial relation that indicates the at least two reference signals. The selected uplink resource indicating/comprising the at least two reference signals may comprise the spatial relation of the selected uplink resource indicating/comprising the at least two reference signals.

A respective spatial relation of each uplink resource of the one or more uplink resources may indicate one or more reference signals. For example, with reference to FIG. 24, the first uplink resource (uplink resource 0) may indicate two reference signals (RS-1 and RS-2), the third uplink resource (uplink resource 2) may indicate two reference signals (RS-4 and RS-5), and the second uplink resource (uplink resource 1) may indicate a single (e.g., one) reference signal (RS-3).

The one or more configuration parameters (e.g., configuration parameters 2412) may indicate one or more reference signals for each spatial relation of the plurality of spatial relations. The one or more configuration parameters may indicate a first reference signal (RS-1) and a second reference signal (RS-2) for a first spatial relation (SRI-10) of the plurality of spatial relations. The one or more configuration parameters may indicate a first reference signal (RS-4) and a second reference signal (RS-5) for a third spatial relation (SRI-32) of the plurality of spatial relations. The one or more configuration parameters may indicate a first reference signal (RS-3) for a second spatial relation (SRI-4) of the plurality of spatial relations.

The wireless device 2408 may select/determine a selected reference signal among the at least two reference signals of the spatial relation of the selected uplink resource. The wireless device 2408 may select/determine the selected reference signal among the at least two reference signals based on the determining that the spatial relation of the selected uplink resource indicates/comprises the at least two reference signals.

The selected reference signal may be a first reference signal among the at least two reference signals. The first reference signal may comprise the first element in a vector/set of the at least two reference signals. The vector/set of the at least two reference signals may be [RS-1, RS-2] for the first uplink resource (uplink resource 0). The first reference signal in the vector/set may be RS-1 based on RS-1 being the first element in the vector/set. The first reference signal in the vector/set may be RS-1 based on RS-1 being the first element in the vector/set, for example, based on the selected uplink resource being the first uplink resource (uplink resource 0). The vector/set of the at least two reference signals may be [RS-4, RS-5] for the third uplink resource (uplink resource 2). The first reference signal in the vector/set may be RS-4 based on RS-4 being the first element in the vector/set. The first reference signal in the vector/set may be RS-4 based on RS-4 being the first element in the vector/set, for example, based on the selected uplink resource being the third uplink resource (uplink resource 2).

The selected reference signal may be indicated/identified by a selected reference signal indicator/index. The one or more configuration parameters (e.g., the configuration parameters 2412) may indicate the selected reference signal indicator/index for the selected reference signal. The selected reference signal indicator/index may be lowest (or highest) among the at least two reference signal indicators/indexes of the at least two reference signals. The selected reference signal may be identified/indicated by a selected reference signal indicator/index that is lowest (or highest) among the at least two reference signal indexes of the at least two reference signals. The at least two reference signals may comprise a first reference signal (RS-1) and a second reference signal (RS-2), for example, if the selected uplink resource is the first uplink resource. The wireless device may select the first reference signal (RS-1) as the selected reference signal based on a first reference signal indicator/index of the first reference signal being lower (or higher) than a second reference signal indicator/index of the second reference signal (RS-2). The at least two reference signal indicators/indexes may comprise the first reference signal indicator/index and the second reference signal indicator/index. The at least two reference signals may comprise a first reference signal (RS-4) and a second reference signal (RS-5), for example, if the selected uplink resource is the third uplink resource (uplink resource 2). The wireless device may select the second reference signal (RS-5) as the selected reference signal based on a second reference signal indicator/index of the second reference signal being lower (or higher) than a first reference signal indicator/index of the first reference signal (RS-4). The at least two reference signal indicators/indexes may comprise the first reference signal indicator/index and the second reference signal indicator/index.

The wireless device 2408 may determine a transmission power for transmission of the transport block (e.g., PUSCH transmission 2424). The wireless device may determine the transmission power based on the selected reference signal indicated by the spatial relation of the selected uplink resource. The wireless device may determine the transmission power based on the selected reference signal indicated by the spatial relation, for example, based on the selected reference signal indicator/index of the selected reference signal being lowest (or highest) among the at least two reference signal indicators/indexes of the at least two reference signals.

At or after time T3, the wireless device 2408 may send/transmit the transport block (e.g., the PUSCH transmission 2424) using the transmission power. The wireless device 2408 may send/transmit the transport block using the transmission power based on the determining the transmission power. The wireless device 2408 may send/transmit, via the (active) uplink BWP of the cell, the transport block using the transmission power.

The wireless device 2408 may determine a spatial domain transmission filter (e.g., a transmission beam) for transmission of the transport block (e.g., the PUSCH transmission 2424). The wireless device 2408 may determine the spatial domain transmission filter based on the selected reference signal indicated by the spatial relation of the selected uplink resource. The wireless device 2408 may determine the spatial domain transmission filter based on the selected reference signal indicated by the spatial relation, for example, based on the selected reference signal indicator/index of the selected reference signal being lowest (or highest) among the at least two reference signal indicators/indexes of the at least two reference signals.

At or after time T3, the wireless device 2408 may send/transmit the transport block (e.g., the PUSCH transmission 2424) using the spatial domain transmission filter (e.g., via the transmission beam). In an example, the wireless device may send/transmit the transport block using the spatial domain transmission filter based on the determining the spatial domain transmission filter. The wireless device 2408 may send/transmit, via the (active) uplink BWP of the cell, the transport block using the spatial domain transmission filter.

The selected reference signal may be periodic. The selected reference signal may be periodic with a periodicity (e.g., 2 slots, 5 slots, 10 slots, 2 symbols, 5 symbols, or any other quantity of slots or symbols). The wireless device 2408 may measure RSRP (e.g., L1-RSRP, L3-RSRP, or RSRP corresponding to any other layer) of the selected reference signal periodically based on the selected reference signal being periodic.

Figure 25:
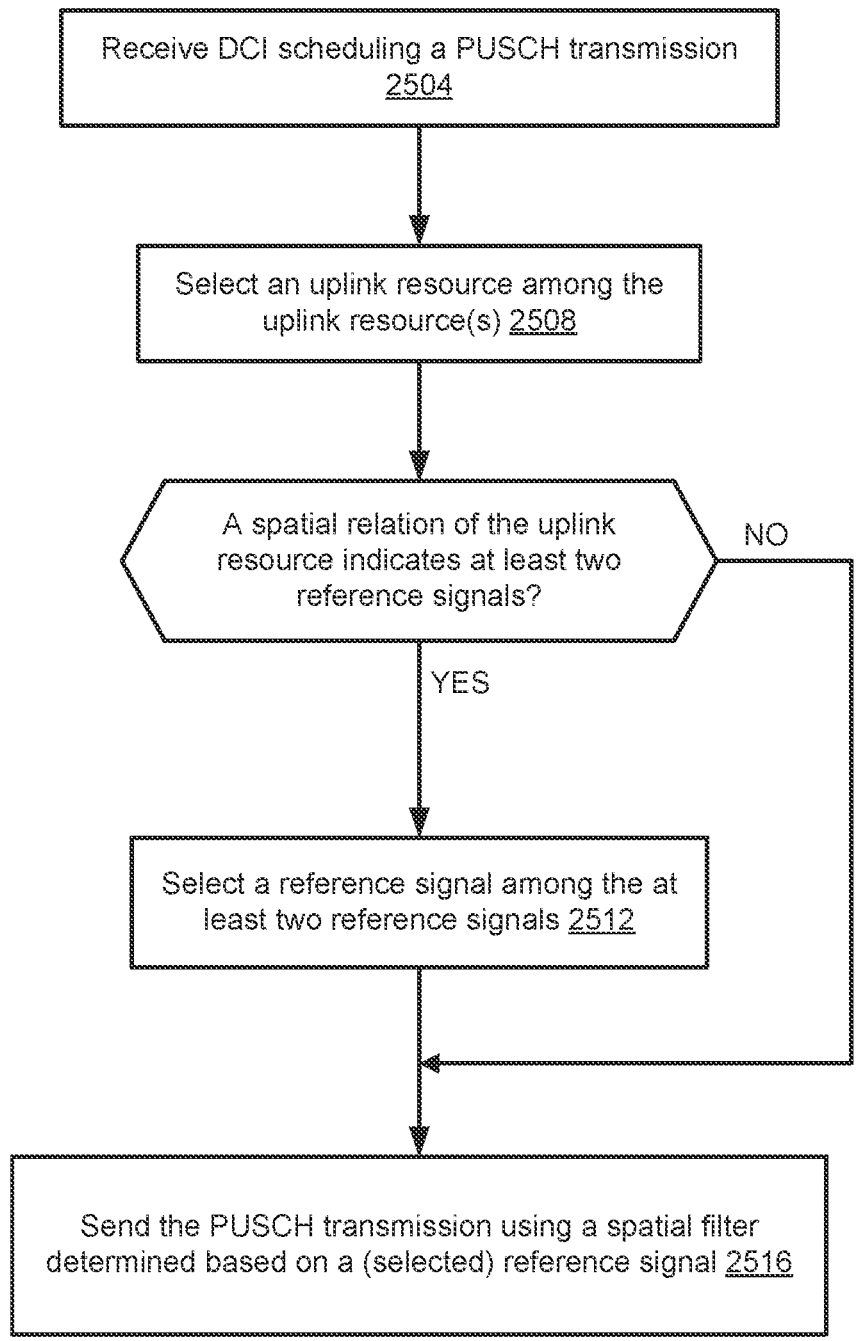
FIG. 25 shows an example method of beam.

FIG. 25 shows an example method of beam management. The example method 2500 may be performed by a wireless device (e.g., the wireless device 2412). The wireless device may receive one or more messages. The one or more messages may comprise one or more configuration parameters for a cell. The one or more configuration parameters may indicate one or more uplink resources (e.g., one or more PUCCH resources). An active uplink BWP of the cell may comprise the one or more uplink resources. The one or more uplink resources may comprise one or more PUCCH resources.

At step 2504, the wireless device may receive DCI scheduling transmission of a transport block (e.g., a PUSCH transmission). The DCI may correspond to a DCI format 0_0 (or any other DCI format that does not indicate a spatial relation). The DCI may be fallback DCI. The DCI may not comprise an SRI field indicating a spatial relation (or spatial domain transmission filter, transmitting beam) for the transmission of the transport block.

At step 2508, the wireless device may select/determine a selected uplink resource among the one or more uplink resources. The wireless device may select/determine the selected uplink resource to determine a spatial domain transmission filter for transmission of the transport block. The wireless device may select/determine the selected uplink resource to determine a transmission power for transmission of the transport block. A selected uplink resource indicator/index of the selected uplink resource may be lowest (or highest) among one or more uplink resource indexes of the one or more uplink resources. The one or more configuration parameters may indicate the one or more uplink resource indicators/indexes for the one or more uplink resources. The selected uplink resource may be indicated/identified with a selected uplink resource indicator/index that is lowest among the one or more uplink resource indicators/indexes of the one or more uplink resources. The wireless device may select/determine the selected uplink resource among the one or more uplink resources based on the selected uplink resource indicator/index of the selected uplink resource being lowest (or highest) among the one or more uplink resource indicators/indexes of the one or more uplink resources.

A spatial relation of the selected uplink resource may indicate/comprise at least two reference signals (e.g., SRS, SS/PBCH block, CSI-RS, etc.). The wireless device, may receive an activation command indicating/activating the spatial relation for the selected uplink resource. The one or more configuration parameters may indicate the spatial relation for the selected uplink resource. The one or more configuration parameters may indicate the at least two reference signals for the spatial relation.

At step 2512, the wireless device may select/determine a selected reference signal among the at least two reference signals. The wireless device may select/determine the selected reference signal among the at least two reference signals based on the spatial relation of the selected uplink resource indicating/comprising the at least two reference signals. A selected reference signal indicator/index of the selected reference signal may be lowest (or highest) among at least two reference signal indicators/indexes of the at least two reference signals. The one or more configuration parameters may indicate the at least two reference signal indicators/indexes for the at least two reference signals. The selected reference signal may be indicated/identified by a selected reference signal indicator/index that is lowest (or highest) among the at least two reference signal indicators/indexes of the at least two reference signals. The spatial relation may comprise the at least two reference signal indicators/indexes identifying/indicating the at least two reference signals. The wireless device may select/determine the selected reference signal among the at least two reference signals based on the selected reference signal indicator/index of the selected reference signal being lowest (or highest) among the at least two reference signal indicators/indexes of the at least two reference signals.

The wireless device may determine a spatial domain transmission filter (e.g., a transmission beam) for transmission of the transport block. The wireless device may determine the spatial domain transmission filter based on the selected reference signal indicated by the spatial relation. The wireless device may determine the spatial domain transmission filter based on the selected reference signal indicated by the spatial relation, for example, based on the selected reference signal indicator/index of the selected reference signal being lowest (or highest) among the at least two reference signal indicators/indexes of the at least two reference signals.

The spatial relation of the selected uplink resource may indicate/comprise a single (e.g., one) reference signal. The wireless device may determine a spatial domain transmission filter based on the single reference signal of the selected uplink resource, for example, if the spatial relation of the selected uplink resource indicates the single reference signal.

At step 2516, the wireless device may send/transmit the transport block (e.g., the PUSCH transmission) using the spatial domain transmission filter (e.g., via the transmission beam). The wireless device may send/transmit the transport block using the spatial domain transmission filter based on the determining the spatial domain transmission filter. The wireless device may send/transmit, via the (active) uplink BWP of the cell, the transport block using the spatial domain transmission filter The wireless device may determine a transmission power for transmission of the transport block. The wireless device may determine the transmission power based on the selected reference signal indicated by the spatial relation. The wireless device may determine the transmission power filter based on the selected reference signal indicated by the spatial relation, for example, based on the selected reference signal indicator/index of the selected reference signal being lowest (or highest) among the at least two reference signal indicators/indexes of the at least two reference signals.

The spatial relation of the selected uplink resource may indicate/comprise a single (e.g., one) reference signal. The wireless device may determine the transmission power based on the single reference signal indicated by the spatial relation of the selected uplink resource, for example, if the spatial relation of the selected uplink resource indicates the single reference signal.

At step 2516, the wireless device may send/transmit the transport block using the transmission power. The wireless device may send/transmit the transport block using the transmission power based on the determining the transmission power. The wireless device may transmit, via the (active) uplink BWP of the cell, the transport block using the transmission power.

The transport block (e.g., the PUSCH transmission 2024, 2224, or 2424) may not comprise a transmission (e.g., Msg 3 1313, as described with reference to FIG. 13A) for a random access procedure. The transport block may exclude the transmission for the random access procedure. The wireless device may perform the transmission using a spatial domain transmission filter (e.g., a transmission beam). The wireless device may determine the spatial domain transmission filter based on a transmission filter used for a second transmission (e.g., preamble transmission, Msg 1 1311 as described with reference to FIG. 13A) of the random access procedure. The wireless device may determine the spatial domain transmission filter based on a reference signal determined (e.g., selected/identified) for the second transmission (e.g., preamble transmission) of the random access procedure. The wireless device may perform the transmission using a transmission power. The wireless device may determine the transmission power based on a reference signal determined (e.g., selected/identified) for the second transmission (e.g., a preamble transmission) of the random access procedure.

With reference to FIGS. 20-25, the (selected) reference signal may be a downlink reference signal. The downlink reference signal may comprise a SS/PBCH block. The downlink reference signal may comprise a CSI-RS (e.g., a periodic CSI-RS, a semi-persistent CSI-RS, an aperiodic CSI-RS). The downlink reference signal may comprise a DM-RS (e.g., of PDCCH, PDSCH, etc.). The wireless device may use a spatial domain receiving filter to receive the downlink reference signal. The wireless device may send/transmit the transport block with (e.g., using) a spatial domain transmission filter that is same (or substantially same) as the spatial domain receiving filter, for example, based on the (selected) reference signal being the downlink reference signal. The wireless device may send/transmit the transport block with (e.g., using) the spatial domain receiving filter, for example, based on the (selected) reference signal being the downlink reference signal. The wireless device may transmit the transport block based on the spatial domain receiving filter, for example, based on the (selected) reference signal being the downlink reference signal.

With reference to FIGS. 20-25, the (selected) reference signal may be an uplink reference signal (e.g., a periodic SRS, a semi-persistent SRS, an aperiodic SRS, a DM-RS). The wireless device may use a spatial domain transmission filter to send/transmit the uplink reference signal. The wireless device may send/transmit the transport block with (e.g., using) a spatial domain transmission filter that is same (or substantially same) as the spatial domain transmission filter used to send/transmit the uplink reference signal. The wireless device may send/transmit the transport block based on the spatial domain transmission filter used to transmit the uplink reference signal, for example, based on the (selected) reference signal being the uplink reference signal.

A first uplink resource of the one or more uplink resources may be indicated/identified by a first uplink resource indicator/index of the one or more uplink resource indicators/indexes. The first uplink resource indicator/index may be lowest (or highest) among the one or more uplink resource indicators/indexes. The first uplink resource may be identified/indicated by a first uplink resource indicator/index that is lowest (or highest) among the one or more uplink resource indicators/indexes of the one or more uplink resources. The base station may transmit, for the first uplink resource, an activation command. The activation command may indicate/activate a spatial relation of the plurality of spatial relations. A quantity of activated spatial relations may be one. The quantity of the activated spatial relation may not be more than one (e.g., two spatial relations, three spatial relations, etc.). The first uplink resource may indicate/comprise one spatial relation based on receiving the activation command. The first uplink resource may indicate/comprise a single spatial relation based on receiving the activation command. The first uplink resource may not indicate/comprise at least two spatial relations. The activation command may not indicate/activate more than one spatial relation for the first uplink resource, for example, based on the first uplink resource indicator/index being lowest (or highest) among the one or more uplink resource indicators/indexes. The quantity of the spatial relations activated/indicated by the activation command may be one, for example, based on the first uplink resource indicator/index being lowest (or highest) among the one or more uplink resource indicators/indexes. The quantity of the spatial relations activated/indicated by the activation command may not be more than one, for example, based on the first uplink resource indicator/index being lowest (or highest) among the one or more uplink resource indicators/indexes. The quantity of the spatial relations activated/indicated by the activation command may be at most one, for example, based on the first uplink resource indicator/index being lowest (or highest) among the one or more uplink resource indicators/indexes.

A second uplink resource of the one or more uplink resources may be indicated/identified by a second uplink resource indicator/index of the one or more uplink resource indicators/indexes. The second uplink resource indicator/index may not be lowest (or highest) among the one or more uplink resource indicators/indexes. The second uplink resource may be identified/indicated by a second uplink resource indicator/index that is not lowest (or highest) among the one or more uplink resource indicators/indexes of the one or more uplink resources. The base station may transmit, for the second uplink resource, an activation command. The activation command may indicate/activate a spatial relation of the plurality of spatial relations. A quantity of the spatial relations may be at least one (e.g., one spatial relation, two spatial relations). The quantity of the spatial relations may be more than one (e.g., two spatial relations, three spatial relations, etc.). The second uplink resource may indicate/comprise the at least one spatial relation based on receiving the activation command. The second uplink resource may indicate/comprise a plurality of spatial relations based on receiving the activation command. The second uplink resource may indicate/comprise at least two spatial relations based on receiving the activation command. The activation command may indicate/activate more than one spatial relation for the second uplink resource, for example, based on the second uplink resource indicator/index not being lowest (or highest) among the one or more uplink resource indicators/indexes. The quantity of the spatial relations activated/indicated by the activation command may be at least one (e.g., one, two, three spatial relations), for example, based on the second uplink resource indicator/index not being lowest (or highest) among the one or more uplink resource indicators/indexes. The quantity of the spatial relations activated/indicated by the activation command may be more than one, for example, based on the second uplink resource indicator/index not being lowest (or highest) among the one or more uplink resource indicators/indexes. The quantity of the spatial relations activated/indicated by the activation command may be at least one, for example, based on the second uplink resource indicator/index not being lowest (or highest) among the one or more uplink resource indicators/indexes.

The base station (or the network) may ensure that an uplink resource, among the one or more uplink resources, with an uplink resource indicator/index that is lowest (or highest) among the one or more uplink resource indicators/indexes of the one or more uplink resources, is configured/activated with a single (e.g., one) spatial relation. The base station (or the network) may ensure that a quantity of spatial relations of an uplink resource, among the one or more uplink resources, with an uplink resource indicator/index that is lowest (or highest) among the one or more uplink resource indicators/indexes of the one or more uplink resources, is one. The base station (or the network) may configure/activate more than one spatial relations for an uplink resource, among the one or more uplink resources, with an uplink resource indicator/index that is not lowest (or highest) among the one or more uplink resource indicators/indexes of the one or more uplink resources. The base station (or the network) may configure an uplink resource, among the one or more uplink resources, with an uplink resource indicator/index that is not lowest (or highest) among the one or more uplink resource indicators/indexes of the one or more uplink resources, with more than one spatial relations.

A wireless device may receive one or more messages. The one or more messages may comprise one or more configuration parameters for a cell. The one or more configuration parameters may indicate a plurality of CORESETs. The one or more configuration parameters may comprise at least two PUCCH configuration parameters (e.g., provided by a higher layer parameter PUCCHConfigurationList). The at least two PUCCH configuration parameters may comprise a first PUCCH configuration parameter (e.g., a first PUCCH-Config) and a second PUCCH configuration parameter (e.g., a second PUCCH-Config).

The wireless device may use the first PUCCH configuration parameter for a first HARQ-ACK codebook. The first HARQ-ACK codebook may be associated with a PUCCH of priority indicator/index 0. The wireless device may use the second PUCCH configuration parameter for a second HARQ-ACK codebook. The second HARQ-ACK codebook may be associated with a PUCCH of priority indicator/index 1.

The wireless device may receive, via a CORESET of the plurality of CORESETs, DCI. The DCI may schedule transmission of a transport block (e.g., a PUSCH transmission). The DCI may schedule the transmission of the transport block via an uplink BWP of the cell. The uplink BWP may be an active uplink BWP of the cell. The one or more configuration parameters may indicate a first CORESET pool indicator/index for the CORESET. The DCI may correspond to a DCI format 0_0 (e.g., or any other DCI format that does not indicate a spatial relation.

The first PUCCH configuration parameter may not indicate at least one uplink resource (e.g., a PUCCH resource) for the uplink BWP. The wireless device may determine, for transmission of the transport block, a spatial domain transmission filter (e.g., a transmission beam) based on a reference signal indicated by a TCI state of a selected CORESET among the plurality of CORESETs, for example, based on the first PUCCH configuration parameter not indicating the at least one uplink resource.

The first PUCCH configuration parameter may not indicate at least one uplink resource (e.g., a PUCCH resource) for the uplink BWP. The wireless device may determine, for transmission of the transport block, a transmission power based on a reference signal indicated by a TCI state of a selected CORESET among the plurality of CORESETs, for example, based on the first PUCCH configuration parameter not indicating the at least one uplink resource.

The second PUCCH configuration parameter may indicate at least one uplink resource (e.g., a PUCCH resource) for the uplink BWP. The second PUCCH configuration parameter may not indicate at least one uplink resource (e.g., a PUCCH resource) for the uplink BWP. The second PUCCH configuration parameter may or may not indicate at least one uplink resource (e.g., a PUCCH resource) for the uplink BWP.

The first PUCCH configuration parameter may indicate one or more first uplink resources (e.g., a PUCCH resource) for the uplink BWP. The one or more first uplink resources may or may not be provided by spatial relation. An uplink resource (e.g., each uplink resource) of the one or more first uplink resources may or may not be provided by a respective spatial relation. For example, the one or more configuration parameters may or may not indicate the spatial relation for the one or more first uplink resources. For example, the first PUCCH configuration parameter may or may not indicate the spatial relation for the one or more first uplink resources. For example, the wireless device may or may not receive at least one activation command indicating the spatial relation for the one or more first uplink resources. The wireless device may or may not receive at least one activation command indicating a respective spatial relation for each uplink resource of the one or more first uplink resources.

The wireless device may determine, for transmission of the transport block, a spatial domain transmission filter based on a reference signal indicated by a TCI state of a selected CORESET among the plurality of CORESETs, for example, based on the one or more first uplink resources not being provided/indicated (e.g., by the one or more configuration parameters, or the at least one activation command) with the spatial relation. The wireless device may determine, for transmission of the transport block, a transmission power based on a reference signal indicated by a TCI state of a selected CORESET among the plurality of CORESETs, for example, based on the one or more first uplink resources not being provided/indicated (e.g., by the one or more configuration parameters; or the at least one activation command) with the spatial relation.

The second PUCCH configuration parameter may indicate one or more second uplink resources (e.g., a PUCCH resource) for the uplink BWP. The one or more second uplink resources may be provided with spatial relation(s). An uplink resource (e.g., each uplink resource) of the one or more second uplink resources may be provided by a respective spatial relation. For example, the one or more configuration parameters may indicate the spatial relation(s) for the one or more second uplink resources. For example, the wireless device may receive at least one activation command indicating the spatial relation(s) for the one or more second uplink resources.

The second PUCCH configuration parameter may indicate one or more second uplink resources (e.g., PUCCH resources) for the uplink BWP. In an example, the one or more second uplink resources may not be provided by spatial relation(s). An uplink resource (e.g., each uplink resource) of the one or more second uplink resources may not be provided by a respective spatial relation. For example, the one or more configuration parameters may not indicate the spatial relation(s) for the one or more second uplink resources. For example, the wireless device may not receive at least one activation command indicating the spatial relation(s) for the one or more second uplink resources.

The second PUCCH configuration parameter may indicate one or more second uplink resources (e.g., PUCCH resources) for the uplink BWP. The one or more second uplink resources may or may not be provided by spatial relation(s). An uplink resource (e.g., each uplink resource) of the one or more second uplink resources may or may not be provided by a respective spatial relation. For example, the one or more configuration parameters may or may not indicate the spatial relation(s) for the one or more second uplink resources. For example, the wireless device may or may not receive at least one activation command indicating the spatial relation(s) for the one or more second uplink resources.

The one or more configuration parameters may comprise an enabling parameter (e.g., enableDefaultBeamPlForPUSCH0_0). The enabling parameter may be set to enabled. The wireless device may determine the spatial domain transmission filter based on the reference signal indicated by the TCI state of the selected CORESET among the plurality of CORESETs, for example, based on the enabling parameter (e.g., enableDefaultBeamPlForPUSCH0_0) being set to enabled. The wireless device may determine the transmission power based on the reference signal indicated by the TCI state of the selected CORESET among the plurality of CORESETs, for example, based on the enabling parameter (e.g., enableDefaultBeamPlForPUSCH0_0) being set to enabled.

The one or more configuration parameters may indicate a lowest CORESET indicator/index among a plurality of CORESET indicators/indexes of the plurality of CORESETs. The one or more configuration parameters may indicate the plurality of CORESET indicators/indexes for the plurality of CORESETs. A selected CORESET indicator/index of the selected CORESET may be lowest among the plurality of CORESET indicators/indexes of the plurality of CORESETs.

The wireless device may determine the spatial domain transmission filter (e.g., transmission beam) based on the reference signal indicated by the TCI state of the selected CORESET among the plurality of CORESETs, for example, based on the selected CORESET indicator/index of the selected CORESET being lowest among the plurality of CORESET indicators/indexes of the plurality of CORESETs. The wireless device may determine the transmission power based on the reference signal indicated by the TCI state of the selected CORESET among the plurality of CORESETs, for example, based on the selected CORESET indicator/index of the selected CORESET being lowest among the plurality of CORESET indicators/indexes of the plurality of CORESETs.

The wireless device may send/transmit, via the uplink BWP, the transport block using the spatial domain transmission filter (e.g., via the transmission beam). The wireless device may send/transmit, via the uplink BWP, the transport block using the transmission power. The transmitting the transport block via the uplink BWP may comprise transmitting the transport block via an uplink resource of the uplink BWP. The uplink resource may be a PUSCH resource. The uplink resource may be a PUCCH resource. The reference signal may be periodic, aperiodic, or semi-persistent. The TCI state may indicate a QCL type for the reference signal. The QCL type may be QCL TypeD (or any other QCL type).

A wireless device may receive one or more messages. The one or more messages may comprise one or more configuration parameters for a cell. The one or more configuration parameters may comprise at least two PUCCH configuration parameters (e.g., provided by a higher layer parameter PUCCHConfigurationList). The at least two PUCCH configuration parameters may comprise a first PUCCH configuration parameter (e.g., a first PUCCH-Config) and a second PUCCH configuration parameter (e.g., a second PUCCH-Config). The first PUCCH configuration parameter may indicate one or more first uplink resources (e.g., one or more first PUCCH resources). The second PUCCH configuration parameter may indicate one or more second uplink resources (e.g., one or more second PUCCH resources). An active uplink BWP of the cell may comprise the one or more first uplink resources and the one or more second uplink resources.

The wireless device may use the first PUCCH configuration parameter for a first HARQ-ACK codebook. The first HARQ-ACK codebook may be associated with a PUCCH of priority indicator/index 0. The wireless device may use the second PUCCH configuration parameter for a second HARQ-ACK codebook. The second HARQ-ACK codebook may be associated with a PUCCH of priority indicator/index 1.

The wireless device may receive DCI scheduling transmission of a transport block (e.g., a PUSCH transmission). The DCI may correspond to a DCI format 0_0 (or any other DCI format that does not indicate a spatial relation). The DCI may be fallback DCI. The DCI may not comprise an SRI field indicating a spatial relation (or spatial domain transmission filter, transmitting beam) for the transmission of the transport block.

The one or more first uplink resources may be provided by/configured with spatial relation(s) (e.g., PUCCH-SpatialRelationInfo). An uplink resource (e.g., each uplink resource) of the one or more first uplink resources may be configured with a respective spatial relation. For example, the one or more configuration parameters may indicate the spatial relation(s) for the one or more first uplink resources. The first PUCCH configuration parameter, may indicate the spatial relation(s) for the one or more first uplink resources. The wireless device may receive at least one activation command indicating the spatial relation(s) for the one or more first uplink resources. The wireless device may receive at least one activation command indicating a respective spatial relation for each uplink resource of the one or more first uplink resources.

The wireless device may select/determine a selected uplink resource among the one or more first uplink resources. The wireless device may select/determine the selected uplink resource to determine a spatial domain transmission filter (e.g., a transmission beam) for transmission of the transport block. The wireless device may select/determine the selected uplink resource to determine a transmission power for transmission of the transport block. A selected uplink resource indicator/index of the selected uplink resource may be lowest (or highest) among one or more first uplink resource indicators/indexes of the one or more first uplink resources. The one or more configuration parameters may indicate the one or more first uplink resource indicators/indexes for the one or more first uplink resources. The first PUCCH configuration parameter may indicate the one or more first uplink resource indicators/indexes for the one or more first uplink resources. The selected uplink resource may be identified/indicated with a selected uplink resource indicator/index that is lowest (or highest) among the one or more first uplink resource indicators/indexes of the one or more first uplink resources. The wireless device may select/determine the selected uplink resource among the one or more first uplink resources based on the selected uplink resource indicator/index of the selected uplink resource being lowest (or highest) among the one or more first uplink resource indicators/indexes of the one or more first uplink resources. The wireless device may select/determine the selected uplink resource among the one or more first uplink resources based on the one or more first uplink resources being provided/indicated (e.g., by the one or more configuration parameters, or the first PUCCH configuration parameter, or the at least one activation command) with the spatial relation(s) (e.g., PUCCH-SpatialRelationInfo).

The one or more second uplink resources may or may not be provided by/configured with spatial relation(s). Each uplink resource of the one or more second uplink resources may or may not be provided by/configured with a respective spatial relation. For example, the one or more configuration parameters may or may not indicate the spatial relation(s) for the one or more second uplink resources. The second PUCCH configuration parameter, for example, may or may not indicate the spatial relation(s) for the one or more second uplink resources. The wireless device may or may not receive at least one activation command indicating the spatial relation(s) for the one or more second uplink resources. The wireless device may or may not receive at least one activation command indicating a respective spatial relation for each uplink resource of the one or more second uplink resources.

The selected uplink resource may indicate/comprise a spatial relation. The one or more configuration parameters may indicate the spatial relation for the selected uplink resource. For example, the first PUCCH configuration parameter may indicate the spatial relation for the selected uplink resource. The wireless device may receive an activation command indicating the spatial relation for the selected uplink resource. The spatial relation may indicate a reference signal (e.g., SRS, SS/PBCH, CSI-RS, etc.).

The wireless device may determine, for transmission of the transport block, a spatial domain transmission filter (e.g., a transmission beam). The wireless device may determine the spatial domain transmission filter based on the reference signal indicated by the spatial relation.

The wireless device may send/transmit the transport block using the spatial domain transmission filter (e.g., via the transmission beam). The wireless device may transmit the transport block using the spatial domain transmission filter based on the determining the spatial domain transmission filter. The wireless device may transmit, via the (active) uplink BWP of the cell, the transport block using the spatial domain transmission filter.

The wireless device may determine a transmission power for transmission of the transport block. The wireless device may determine the transmission power based on the reference signal indicated by the spatial relation.

The wireless device may transmit the transport block using the transmission power. The wireless device may transmit the transport block using the transmission power based on the determining the transmission power. The wireless device may transmit, via the (active) uplink BWP of the cell, the transport block using the transmission power.

The one or more configuration parameters may indicate one or more path loss reference signals (e.g., provided by a higher layer parameter PUSCH-PathlossReferenceRS). The one or more configuration parameters may indicate one or more path loss reference signal indicators/indexes (e.g., provided by a higher layer parameter PUSCH-PathlossReferenceRS-Id) for the one or more path loss reference signals.

The one or more first uplink resources may not be provided by/configured with spatial relation(s). Each uplink resource of the one or more first uplink resources may not be provided by/configured with a respective spatial relation. For example, the one or more configuration parameters may not indicate the spatial relation(s) for the one or more first uplink resources. The first PUCCH configuration parameter may not indicate the spatial relation(s) for the one or more first uplink resources. The wireless device may not receive at least one activation command indicating the spatial relation(s) for the one or more first uplink resources. The wireless device may not receive at least one activation command indicating a respective spatial relation for each uplink resource of the one or more first uplink resources.

The one or more second uplink resources may be provided by/configured with spatial relation(s). Each uplink resource of the one or more second uplink resources may be provided by/configured with a respective spatial relation. For example, the one or more configuration parameters may indicate the spatial relation for the one or more second uplink resources. The wireless device may receive at least one activation command indicating the spatial relation(s) for the one or more second uplink resources.

The one or more second uplink resources may not be provided by/configured with spatial relation(s). Each uplink resource of the one or more second uplink resources may not be provided by/configured with a respective spatial relation. For example, the one or more configuration parameters may not indicate the spatial relation(s) for the one or more second uplink resources. The wireless device may not receive at least one activation command indicating the spatial relation(s) for the one or more second uplink resources.

The one or more second uplink resources may or may not be provided by/configured with spatial relation(s). An uplink resource (e.g., each uplink resource) of the one or more second uplink resources may or may not be provided by/configured with a respective spatial relation. For example, the one or more configuration parameters may or may not indicate the spatial relation(s) for the one or more second uplink resources. The wireless device may or may not receive at least one activation command indicating the spatial relation(s) for the one or more second uplink resources.

The wireless device may determine, for transmission of the transport block, a spatial domain transmission filter based on a reference signal among the one or more path loss reference signals, for example, based on the one or more first uplink resources not being provided (e.g., by the one or more configuration parameters, the first PUCCH configuration parameter or the at least one activation command) with the spatial relation(s). The wireless device may determine, for transmission of the transport block, a transmission power based on a reference signal among the one or more path loss reference signals, for example, based on the one or more first uplink resources not being provided (e.g., by the one or more configuration parameters, the first PUCCH configuration parameter or the at least one activation command) with the spatial relation(s).

The one or more configuration parameters may indicate a lowest path loss reference signal indicator/index among the one or more path loss reference signal indicators/indexes of the one or more path loss reference signals. A path loss reference signal indicator/index of the reference signal may be lowest among the one or more path loss reference signal indicators/indexes of the one or more path loss reference signals. The wireless device may select the reference signal among the one or more path loss reference signals based on the path loss reference signal indicators/index of the reference signal being lowest among the one or more path loss reference signal indicators/indexes of the one or more path loss reference signals.

The wireless device may determine the transmission power based on the reference signal among the one or more path loss reference signals, for example, based on the path loss reference signal indicator/index of the reference signal being lowest among the one or more path loss reference signal indicators/indexes of the one or more path loss reference signals. The wireless device may determine the spatial domain transmission filter based on the reference signal among the one or more path loss reference signals, for example, based on the path loss reference signal indicator/index of the reference signal being lowest among the one or more path loss reference signal indicators/indexes of the one or more path loss reference signals.

A path loss reference signal indicator/index of the reference signal may be equal to a first value. The first value may be equal to zero (or any other value). The wireless device may select the reference signal among the one or more path loss reference signals based on the path loss reference signal indicator/index of the reference signal being equal to the first value (e.g., zero, or any other value).

The wireless device may determine the transmission power based on the reference signal among the one or more path loss reference signals, for example, based on the path loss reference signal indicator/index of the reference signal being equal to the first value (e.g., zero, or any other value). The wireless device may determine the spatial domain transmission filter based on the reference signal among the one or more path loss reference signals, for example, based on the path loss reference signal indicator/index of the reference signal being equal to the first value (e.g., zero, or any other value)

The wireless device may send/transmit, via the uplink BWP, the transport block using the spatial domain transmission filter. The wireless device may send/transmit, via the uplink BWP, the transport block using the transmission power.

The transmitting the transport block via the uplink BWP may comprise transmitting the transport block via an uplink resource of the uplink BWP. The uplink resource may be a PUSCH resource or a PUCCH resource. The reference signal may be periodic, aperiodic, or semi-persistent.

A wireless device may perform a method comprising multiple operations. The wireless device may receive downlink control information (DCI) scheduling transmission via a physical uplink shared channel (PUSCH) resource of a cell. The wireless device may determine a physical uplink control channel (PUCCH) resource, among one or more PUCCH resources, associated with a lowest PUCCH resource index. The wireless device may, based on the PUCCH resource being activated with at least two spatial relations, send, via the PUSCH resource, a transport block using one or more transmission parameters determined based on a first spatial relation in an ordered set comprising the at least two spatial relations. The wireless device may also perform one or more additional operations. The wireless device may determine the one or more transmission parameters based on a reference signal indicated by the first spatial relation. The reference signal may be periodic. The one or more transmission parameters may comprise a spatial domain transmission filter. The wireless device may determine the spatial domain transmission filter based on a spatial domain filter used to receive or transmit a reference signal indicated by the first spatial relation. The one or more transmission parameters may comprise a transmission power. The wireless device may determine the transmission power based on a signal strength of a received reference signal indicated by the first spatial relation. The determining the PUCCH resource may be based on determining that the DCI does not comprise an indication of a spatial relation. The wireless device may receive an activation command activating, for the PUCCH resource, the at least two spatial relations. The first spatial relation may be associated with a first transmission and reception point (TRP) of the cell. A second spatial relation in the ordered set comprising the at least two spatial relations may be associated with a second TRP of the cell. The determining the PUCCH resource may be based on determining that the DCI corresponds to a first DCI format. The wireless device may receive one or more messages comprising one or more configuration parameters for the cell. The one or more configuration parameters may indicate a plurality of spatial relations comprising the at least two spatial relations. The one or more configuration parameters indicate the one or more PUCCH resources. The one or more PUCCH resources may correspond to an active uplink bandwidth part (BWP) of the cell. The one or more configuration parameters may indicate, for the one or more PUCCH resources, one or more PUCCH resource indexes. The cell may be a primary cell or a secondary cell configured with PUCCH. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive downlink control information (DCI) scheduling transmission via a physical uplink shared channel (PUSCH) resource of a cell. The wireless device may determine a physical uplink control channel (PUCCH) resource, among one or more PUCCH resources, associated with a lowest PUCCH resource index. The wireless device may, based on the PUCCH resource being activated with at least two spatial relations, send, via the PUSCH resource, a transport block using one or more transmission parameters determined based on a spatial relation, among the at least two spatial relations, associated with a lowest spatial relation index among spatial relation indexes of the at least two spatial relations. The wireless device may also perform one or more additional operations. The spatial relation may comprise a first spatial relation in an ordered set comprising the at least two spatial relations. The wireless device may determine the one or more transmission parameters based on a reference signal indicated by the spatial relation. The one or more transmission parameters may comprise a spatial domain transmission filter. The wireless device may determine the spatial domain transmission filter based on a spatial domain filter used to receive or transmit a reference signal indicated by the spatial relation. The one or more transmission parameters may comprise a transmission power. The wireless device may determine the transmission power based on a signal strength of a received reference signal indicated by the spatial relation. The wireless device may receive an activation command activating, for the PUCCH resource, the at least two spatial relations. The spatial relation may be associated with a first transmission and reception point (TRP) of the cell. A second spatial relation among the at least two spatial relations may be associated with a second TRP of the cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive downlink control information (DCI) scheduling transmission via a physical uplink shared channel (PUSCH) resource of a cell. The wireless device may determine a physical uplink control channel (PUCCH) resource, among one or more PUCCH resources, associated with a lowest PUCCH resource index. The wireless device may, based on the PUCCH resource being activated with a spatial relation that is associated with at least two reference signals, send, via the PUSCH resource, a transport block using one or more transmission parameters determined based on a reference signal, among the at least two reference signals, associated with a lowest reference signal index among reference signal indexes of the at least two reference signals. The wireless device may also perform one or more additional operations. The PUCCH resource may be activated with at least two spatial relations comprising the spatial relation. The spatial relation may be associated with a lowest spatial relation index among spatial relation indexes of the at least two spatial relations. The one or more transmission parameters may comprise a spatial domain transmission filter. The wireless device may determine the spatial domain transmission filter based on a spatial domain filter used to receive or transmit the reference signal. The one or more transmission parameters may comprise a transmission power. The wireless device may determine the transmission power based on a signal strength of the reference signal as received by the wireless device. The reference signal may be a first reference signal in an ordered set comprising the at least two reference signals. The determining the PUCCH resource may be based on determining that the DCI does not comprise an indication of a spatial relation. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive downlink control information (DCI) scheduling transmission of a transport block via an active uplink bandwidth part (BWP) of a cell. The wireless device may determine, for transmission of the transport block, an uplink resource among one or more uplink resources of the active uplink BWP. The uplink resource may be identified by a lowest uplink resource index among one or more uplink resource indexes of the one or more uplink resources. The wireless device may, based on the uplink resource being activated with at least two spatial relations, transmit the transport block using one or more transmission parameters determined based on a first spatial relation in an ordered set of the at least two spatial relations. The wireless device may also perform one or more additional operations. The first spatial relation may be a first element in the ordered set of the at least two spatial relations. The transmitting the transport block using the one or more transmission parameters determined based on the first spatial relation may comprises transmitting the transport block using the one or more transmission parameters determined based on a reference signal indicated by the first spatial relation. The reference signal may be periodic. The one or more transmission parameters may comprise at least one of: a spatial domain transmission filter; or a transmission power. The wireless device may determine the spatial domain transmission filter based on a spatial domain filter used to receive or transmit the reference signal. The wireless device may determine the transmission power based on a reference signal received power (RSRP) of the reference signal. The DCI may correspond to a DCI format 0_0. The determining the uplink resource among the one or more uplink resources may be based on the DCI corresponding to the DCI format 0_0. The DCI may or may not comprise a sounding reference signal indicator (SRI) field. The one or more uplink resources may comprise one or more physical uplink control channel (PUCCH) resources. The wireless device may receive one or more messages comprising one or more configuration parameters for the cell. The one or more configuration parameters may indicate, for the active uplink BWP of the cell, the one or more uplink resources. The one or more configuration parameters may indicate, for the one or more uplink resources, the one or more uplink resource indexes. The one or more configuration parameters may indicate a plurality of spatial relations. The plurality of spatial relations may comprise the at least two spatial relations. The wireless device may receive an activation command activating, for the uplink resource, the at least two spatial relations. The cell may be a primary cell or a secondary cell configured with PUCCH. The first spatial relation may be associated with a first transmission and reception point (TRP) of the cell. A second spatial relation in an ordered set of the at least two spatial relations may be associated with a second TRP of the cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive one or more messages comprising one or more configuration parameters for a cell. The one or more configuration parameters may comprise a parameter that enables determination of a default spatial domain transmission filter and a default pathloss reference signal. The one or more configuration parameters may indicate one or more control resource set (CORESET) indexes for one or more CORESETs of an active downlink bandwidth part (BWP) of the cell. The wireless device may receive, via a first CORESET with a first CORESET pool index, downlink control information (DCI) scheduling transmission of a transport block via an active uplink BWP of the cell. The wireless device may, in response to the one or more configuration parameters comprising the parameter, transmit, via the active uplink BWP, the transport block using one or more transmission parameters determined based on an activated transmission configuration indicator (TCI) state of a second CORESET of the one or more CORESETs. The second CORESET may correspond to: a CORESET index that is lowest among the one or more CORESET indexes; and a second CORESET pool index that is the same as a first CORESET pool index. The wireless device may also perform one or more additional operations. The one or more transmission parameters comprise at least one of: a spatial domain transmission filter or a transmission power. The one or more configuration parameters may or may not indicate any uplink control channel resource for the active uplink BWP of the cell. The transmitting, using the one or more transmission parameters determined based on the activated TCI state, the transport block may be further based on the one or more configuration parameters not indicating any uplink control channel resource for the active uplink BWP of the cell. The one or more configuration parameters may indicate one or more uplink control channel resources for the active uplink BWP of the cell. The transmitting, using the one or more transmission parameters determined based on the activated TCI state, the transport block may be further based on each uplink control channel resource of the one or more uplink control channel resources not being associated with a respective spatial relation. The DCI may correspond to DCI format 0_0. The activated TCI state may indicate a reference signal. The reference signal may be periodic. The activated TCI state may indicate a quasi co-location type for the reference signal. The quasi co-location type may be a quasi co-location type D (QCL-TypeD). The wireless device may monitor, based on the reference signal indicated by the activated TCI state, downlink control channels via the second CORESET. The monitoring, based on the reference signal, the downlink control channels via the second CORESET may comprise at least one demodulation reference signal (DM-RS) port of downlink control channel receptions via the second CORESET being quasi co-located with the reference signal. The transmitting, using the one or more transmission parameters determined based on the activated TCI state, the transport block may comprise transmitting, using the transmission parameter determined based on the reference signal indicated by the activated TCI state, the transport block. The one or more CORESETs may comprise the first CORESET and the second CORESET. The one or more configuration parameters may indicate the first CORESET pool index for the first CORESET and the second CORESET pool index for the second CORESET. The one or more transmission parameters may comprise a spatial domain transmission filter. The wireless device may determine the spatial domain transmission filter based on a spatial domain filter used to receive a reference signal indicated by the activated TCI state. The one or more transmission parameters may comprise a transmission power. The wireless device may determine the transmission power based on a reference signal received power (RSRP) of a reference signal indicated by the activated TCI state. The wireless device may receive an activation command activating, for the second CORESET, the activated TCI state. The wireless device may be in an radio resource control (RRC) connected mode. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device, downlink control information (DCI) scheduling an uplink transmission; and
based on an uplink resource, associated with a lowest resource index, corresponding to at least two spatial relations, sending the uplink transmission using a transmission power that is based on a reference signal indicated by a spatial relation, among the at least two spatial relations, associated with a lowest spatial relation index among spatial relation indexes of the at least two spatial relations.

2. The method of claim 1, wherein the spatial relation comprises a first spatial relation in an ordered set comprising the at least two spatial relations.

3. The method of claim 1, further comprising determining one or more transmission parameters based on the reference signal indicated by the spatial relation, wherein the sending the uplink transmission comprises sending the uplink transmission using the one or more transmission parameters.

4. The method of claim 1, wherein the sending the uplink transmission comprises using a spatial domain transmission filter determined based on a spatial domain filter used to receive or transmit a reference signal indicated by the spatial relation.

5. The method of claim 1, further comprising receiving an activation command activating, for the uplink resource, the at least two spatial relations.

6. The method of claim 1, wherein:
the spatial relation is associated with a first transmission and reception point (TRP); and
a second spatial relation among the at least two spatial relations is associated with a second TRP.

7. The method of claim 1, wherein the sending the uplink transmission comprises sending the uplink transmission via a second uplink resource different from the uplink resource.

8. The method of claim 1, wherein the uplink resource is a physical uplink control channel (PUCCH) resource, and the sending the uplink transmission comprises sending the uplink transmission via a physical uplink shared channel (PUSCH) resource.

9. A wireless device comprising:
one or more processors; and
memory storing instructions that, when executed by the one or more processors, cause the wireless device to:
receive downlink control information (DCI) scheduling an uplink transmission; and
based on an uplink resource, associated with a lowest resource index, corresponding to at least two spatial relations, send the uplink transmission using a transmission power that is based on a reference signal indicated by a spatial relation, among the at least two spatial relations, associated with a lowest spatial relation index among spatial relation indexes of the at least two spatial relations.

10. The wireless device of claim 9, wherein the spatial relation comprises a first spatial relation in an ordered set comprising the at least two spatial relations.

11. The wireless device of claim 9, wherein the instructions, when executed by the one or more processors, cause the wireless device to:
determine one or more transmission parameters based on the reference signal indicated by the spatial relation, and
send the uplink transmission by causing sending the uplink transmission using the one or more transmission parameters.

12. The wireless device of claim 9, wherein the instructions, when executed by the one or more processors, cause the wireless device to send the uplink transmission by causing sending the uplink transmission using a spatial domain transmission filter determined based on a spatial domain filter used to receive or transmit a reference signal indicated by the spatial relation.

13. The wireless device of claim 9, wherein the instructions, when executed by the one or more processors, cause the wireless device to receive an activation command activating, for the uplink resource, the at least two spatial relations.

14. The wireless device of claim 9, wherein:
the spatial relation is associated with a first transmission and reception point (TRP); and
a second spatial relation among the at least two spatial relations is associated with a second TRP.

15. The wireless device of claim 9, wherein the instructions, when executed by the one or more processors, cause the wireless device to send the uplink transmission by causing sending the uplink transmission via a second uplink resource different from the uplink resource.

16. The wireless device of claim 9, wherein the uplink resource is a physical uplink control channel (PUCCH) resource, and wherein the instructions, when executed by the one or more processors, cause the wireless device to send the uplink transmission by causing sending the uplink transmission via a physical uplink shared channel (PUSCH) resource.

17. A non-transitory computer readable medium storing instructions that, when executed, cause:
receiving, by a wireless device, downlink control information (DCI) scheduling an uplink transmission; and
based on an uplink resource, associated with a lowest resource index, corresponding to at least two spatial relations, sending the uplink transmission using a transmission power that is based on a reference signal indicated by a spatial relation, among the at least two spatial relations, associated with a lowest spatial relation index among spatial relation indexes of the at least two spatial relations.

18. The non-transitory computer readable medium of claim 17, wherein the spatial relation comprises a first spatial relation in an ordered set comprising the at least two spatial relations.

19. The non-transitory computer readable medium of claim 17, wherein the instructions, when executed, cause:
   determining one or more transmission parameters based on the reference signal indicated by the spatial relation, and
   sending the uplink transmission by causing sending the uplink transmission using the one or more transmission parameters.

20. The non-transitory computer readable medium of claim 17, wherein the instructions, when executed, cause sending the uplink transmission by causing sending the uplink transmission using a spatial domain transmission filter determined based on a spatial domain filter used to receive or transmit a reference signal indicated by the spatial relation.

21. The non-transitory computer readable medium of claim 17, wherein the instructions, when executed, cause receiving an activation command activating, for the uplink resource, the at least two spatial relations.

22. The non-transitory computer readable medium of claim 17, wherein:
   the spatial relation is associated with a first transmission and reception point (TRP); and
   a second spatial relation among the at least two spatial relations is associated with a second TRP.

23. The non-transitory computer readable medium of claim 17, wherein the instructions, when executed, cause sending the uplink transmission by causing sending the uplink transmission via a second uplink resource different from the uplink resource.

24. The non-transitory computer readable medium of claim 17, wherein the uplink resource is a physical uplink control channel (PUCCH) resource, and wherein the instructions, when executed, cause sending the uplink transmission by causing sending the uplink transmission via a physical uplink shared channel (PUSCH) resource.

\* \* \* \* \*